US007471879B2

(12) United States Patent
Fuchigami et al.

(10) Patent No.: US 7,471,879 B2
(45) Date of Patent: Dec. 30, 2008

(54) RECORDING MEDIUM AND SIGNAL PROCESSING APPARATUS

(75) Inventors: Norihiko Fuchigami, Yamato (JP); Shoji Ueno, Kanagawa-ken (JP); Yoshiaki Tanaka, Fujisawa (JP)

(73) Assignee: Victor Company of Japan, Limited, Yokohama (JP)

(*) Notice: Subject to any disclaimer, the term of this patent is extended or adjusted under 35 U.S.C. 154(b) by 912 days.

(21) Appl. No.: 10/842,420

(22) Filed: May 11, 2004

(65) Prior Publication Data

US 2004/0208488 A1 Oct. 21, 2004

Related U.S. Application Data

(63) Continuation of application No. 09/276,692, filed on Mar. 26, 1999, now Pat. No. 6,788,880.

(30) Foreign Application Priority Data

Apr. 16, 1998 (JP) ................................ 10-122899
Aug. 12, 1998 (JP) ................................ 10-242553

(51) Int. Cl.
*H04N 5/91* (2006.01)
*H04N 5/00* (2006.01)

(52) U.S. Cl. ............................ 386/96; 386/95; 386/98; 386/121; 386/125; 386/126

(58) Field of Classification Search .................. 386/96, 386/95, 98, 121, 125, 126
See application file for complete search history.

(56) References Cited

U.S. PATENT DOCUMENTS 4,794,465 A 12/1988 Van Luyt et al.
5,623,424 A 4/1997 Azadegan et al.
5,734,788 A 3/1998 Nonomura et al.
5,778,142 A 7/1998 Taira et al.
5,854,873 A 12/1998 Mori et al.

(Continued)

FOREIGN PATENT DOCUMENTS

EP 0757350 2/1997

(Continued)

OTHER PUBLICATIONS

European Search Report, EP 99106936, May 15, 2002, pp. 1-3.

(Continued)

*Primary Examiner*—Thai Tran
*Assistant Examiner*—Syed Y Hasan
(74) *Attorney, Agent, or Firm*—Connolly Bove Lodge & Hutz LLP

(57) ABSTRACT

A recording medium has a first area storing an audio title set. The audio title set contains a plurality of audio objects including a first audio object and a second audio object. The first audio object consists of first packs having audio data. The second audio object includes second packs having audio data and a third pack having real-time information related to the audio data in the second packs. The recording medium has a second area storing a still-picture set. The still-picture set includes a fourth pack having still-picture data related to the audio data in the first packs and the audio data in the second packs.

3 Claims, 73 Drawing Sheets

U.S. PATENT DOCUMENTS

| | | | |
|---|---|---|---|
| 6,208,802 B1 | 3/2001 | Mori et al. | |
| 6,385,389 B1 | 5/2002 | Maruyama et al. | |
| 6,438,315 B1 | 8/2002 | Suzuki et al. | |
| 6,449,227 B1 * | 9/2002 | Heo | 369/47.15 |
| 6,529,683 B2 | 3/2003 | Mori et al. | |
| 6,556,770 B2 | 4/2003 | Ando et al. | |
| 6,560,403 B1 | 5/2003 | Tanaka et al. | |
| 6,564,006 B1 | 5/2003 | Mori et al. | |
| 6,618,551 B1 | 9/2003 | Tanaka et al. | |

FOREIGN PATENT DOCUMENTS

| | | |
|---|---|---|
| EP | 0795871 | 9/1997 |
| EP | 0797201 | 9/1997 |
| EP | 0855715 | 7/1998 |
| EP | 0856849 | 8/1998 |
| EP | 0892404 | 1/1999 |
| EP | 0918331 | 5/1999 |
| EP | 0942609 | 9/1999 |
| EP | 0949622 A2 | 10/1999 |
| WO | WO 99/34601 | 7/1999 |

OTHER PUBLICATIONS

*Outline of DVD Standard*, M. Moriya et al., National Technical Report, vol. 43, No. 3, Jun. 1997, pp. 223-229 (w/English Abstract).
*DVD-Audio Format*, E. Funasaka et al.; U.S. AES, the 3rd Convention 1997, Sep. 26-29, New York, pp. 1-8.
Communication from European Patent Office dated Apr. 3, 2008.

* cited by examiner

FIG. 5

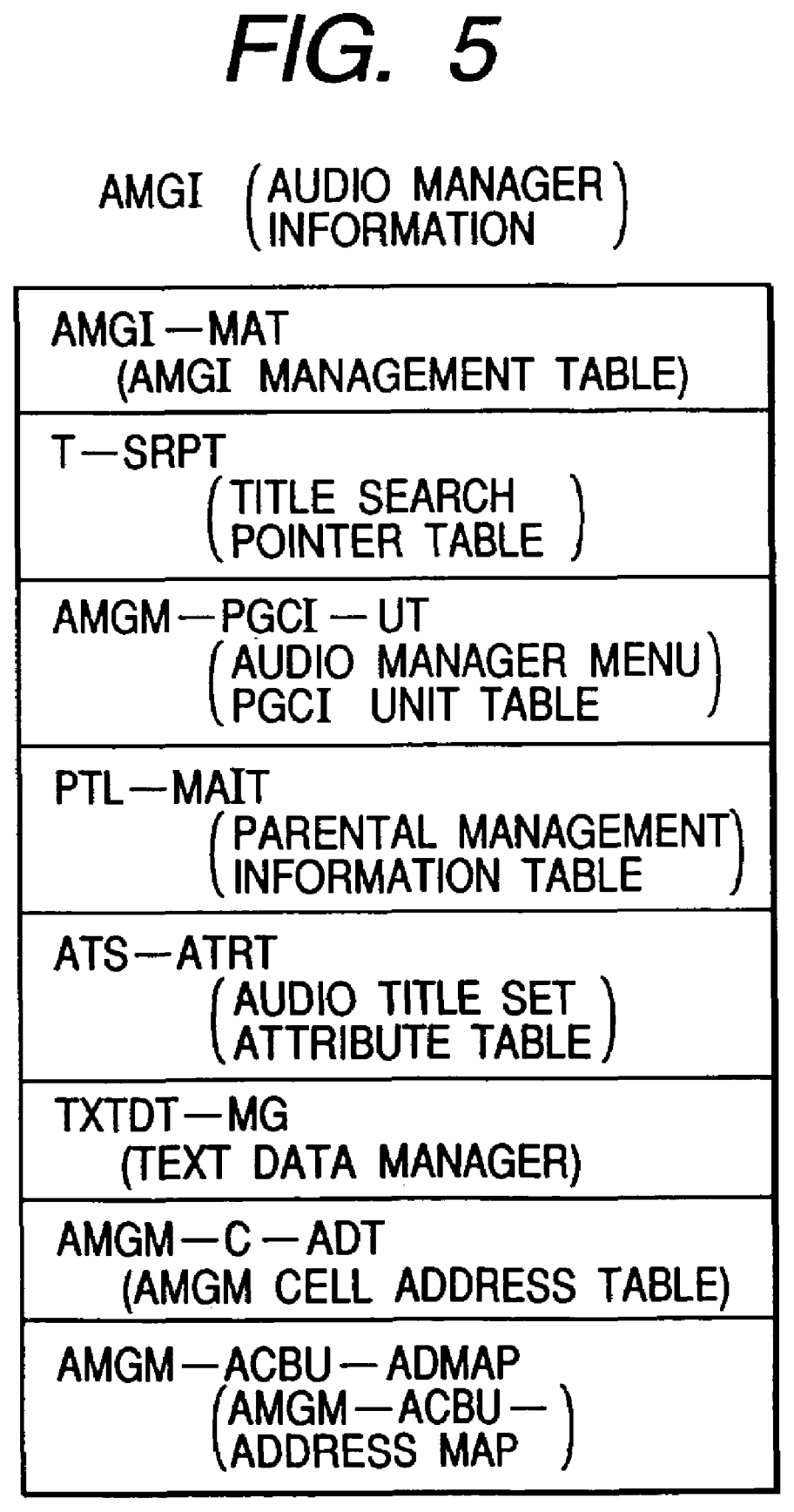

AMGI (AUDIO MANAGER INFORMATION)

| |
|---|
| AMGI—MAT (AMGI MANAGEMENT TABLE) |
| T—SRPT (TITLE SEARCH POINTER TABLE) |
| AMGM—PGCI—UT (AUDIO MANAGER MENU PGCI UNIT TABLE) |
| PTL—MAIT (PARENTAL MANAGEMENT INFORMATION TABLE) |
| ATS—ATRT (AUDIO TITLE SET ATTRIBUTE TABLE) |
| TXTDT—MG (TEXT DATA MANAGER) |
| AMGM—C—ADT (AMGM CELL ADDRESS TABLE) |
| AMGM—ACBU—ADMAP (AMGM—ACBU—ADDRESS MAP) |

ATS—ATR (ATS ATTRIBUTE)

| | |
|---|---|
| ATS—ATR—EA (END ADDRESS) | 4 BYTES |
| ATS—CAT (CATEGORY) | 4 BYTES |
| ATS—ATR I (ATS—ATR INFORMATION) | 768 BYTES |

FIG. 8

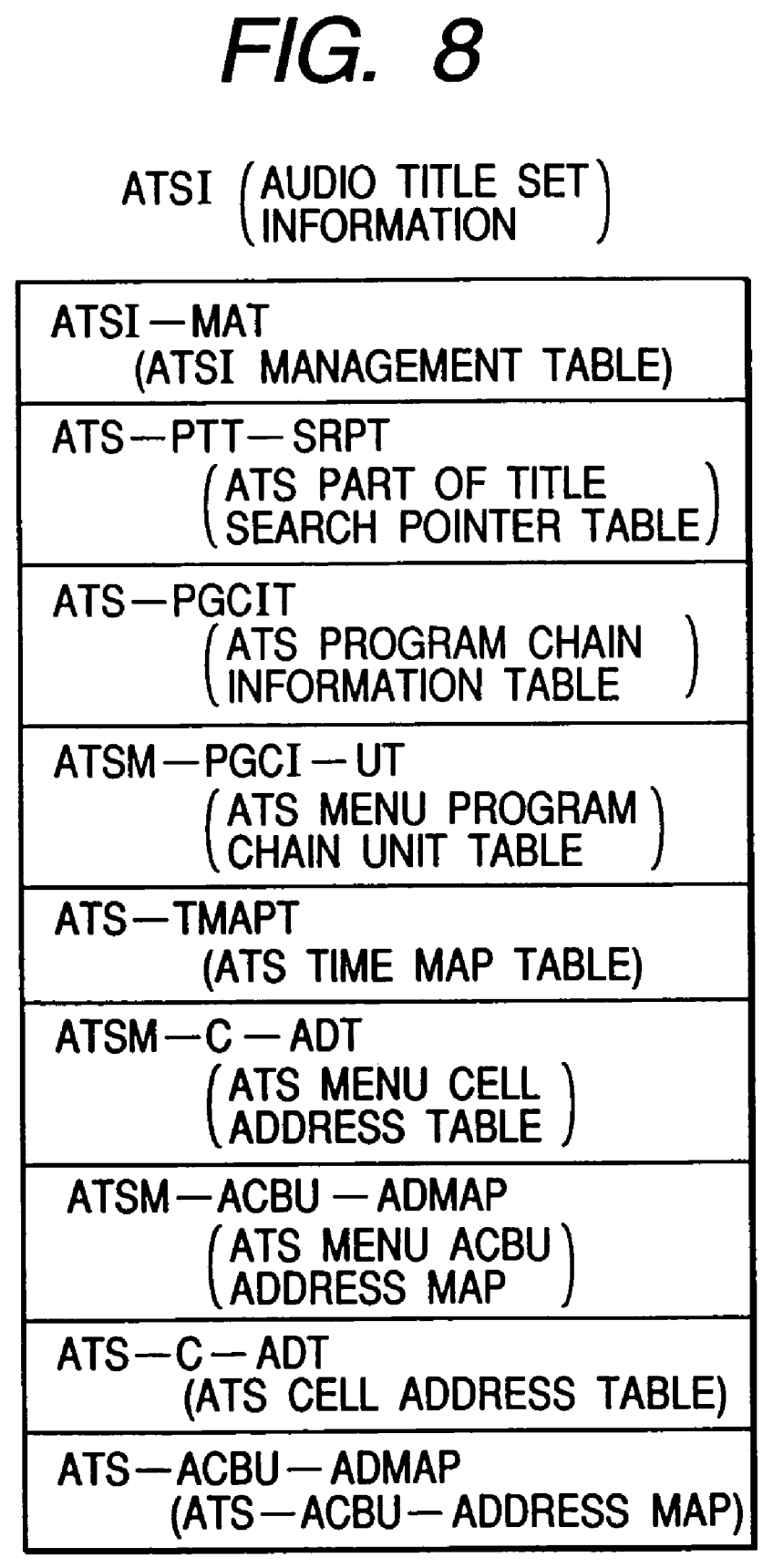

ATSI (AUDIO TITLE SET INFORMATION)

| |
|---|
| ATSI—MAT (ATSI MANAGEMENT TABLE) |
| ATS—PTT—SRPT (ATS PART OF TITLE SEARCH POINTER TABLE) |
| ATS—PGCIT (ATS PROGRAM CHAIN INFORMATION TABLE) |
| ATSM—PGCI—UT (ATS MENU PROGRAM CHAIN UNIT TABLE) |
| ATS—TMAPT (ATS TIME MAP TABLE) |
| ATSM—C—ADT (ATS MENU CELL ADDRESS TABLE) |
| ATSM—ACBU—ADMAP (ATS MENU ACBU ADDRESS MAP) |
| ATS—C—ADT (ATS CELL ADDRESS TABLE) |
| ATS—ACBU—ADMAP (ATS—ACBU—ADDRESS MAP) |

FIG. 9

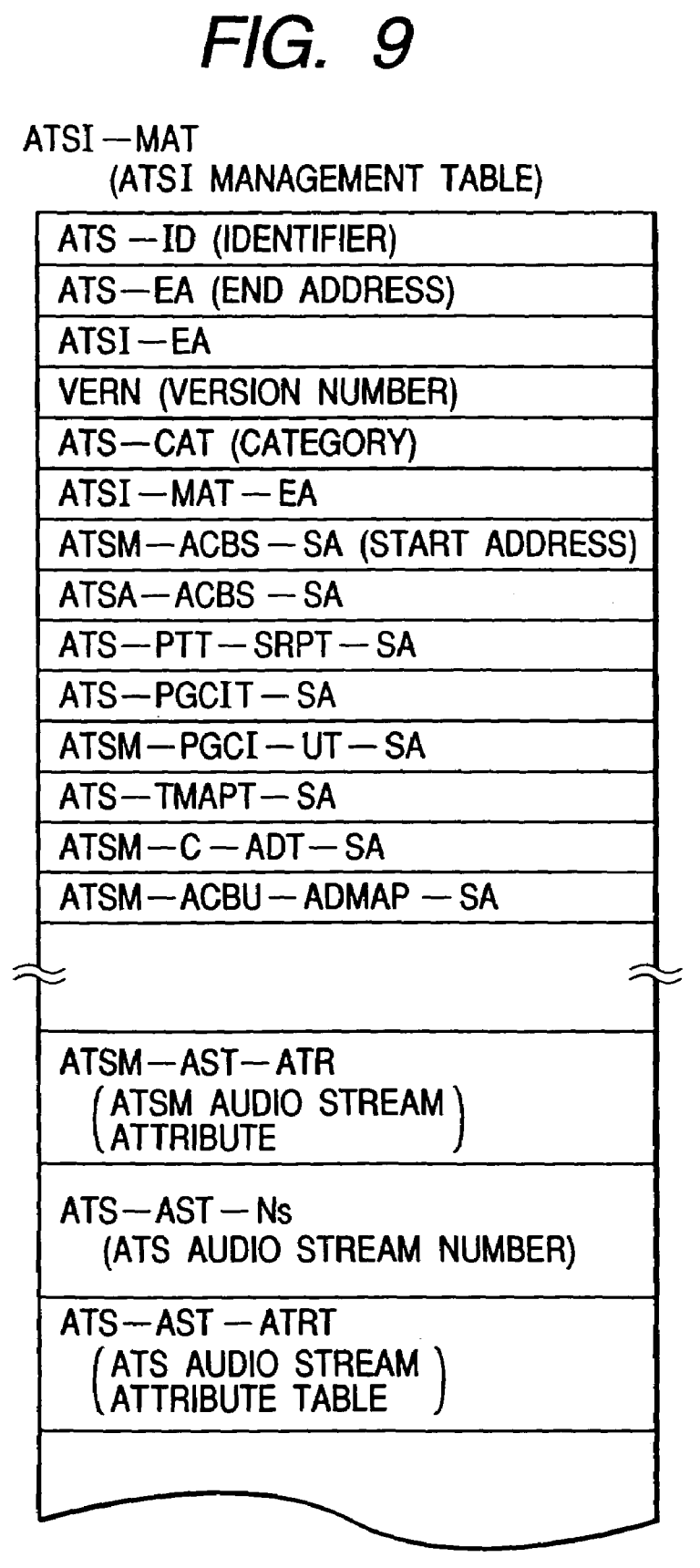

ATSI—MAT
(ATSI MANAGEMENT TABLE)

| |
|---|
| ATS—ID (IDENTIFIER) |
| ATS—EA (END ADDRESS) |
| ATSI—EA |
| VERN (VERSION NUMBER) |
| ATS—CAT (CATEGORY) |
| ATSI—MAT—EA |
| ATSM—ACBS—SA (START ADDRESS) |
| ATSA—ACBS—SA |
| ATS—PTT—SRPT—SA |
| ATS—PGCIT—SA |
| ATSM—PGCI—UT—SA |
| ATS—TMAPT—SA |
| ATSM—C—ADT—SA |
| ATSM—ACBU—ADMAP—SA |
| ≈ |
| ATSM—AST—ATR (ATSM AUDIO STREAM ATTRIBUTE) |
| ATS—AST—Ns (ATS AUDIO STREAM NUMBER) |
| ATS—AST—ATRT (ATS AUDIO STREAM ATTRIBUTE TABLE) |
| |

ATSM—AST—ATR (AUDIO TITLE SET MENU AUDIO STREAM ATTRIBUTE DATA)

FIG. 11

ATS—AST—ATRT

| | | |
|---|---|---|
| AUDIO STREAM (AST) #0 | ATS—AST—ATR | 8 BYTES |
| AUDIO STREAM (AST) #1 | ATS—AST—ATR | 8 BYTES |
| AUDIO STREAM (AST) #2 | ATS—AST—ATR | 8 BYTES |
| AUDIO STREAM (AST) #3 | ATS—AST—ATR | 8 BYTES |
| AUDIO STREAM (AST) #4 | ATS—AST—ATR | 8 BYTES |
| AUDIO STREAM (AST) #5 | ATS—AST—ATR | 8 BYTES |
| AUDIO STREAM (AST) #6 | ATS—AST—ATR | 8 BYTES |
| AUDIO STREAM (AST) #7 | ATS—AST—ATR | 8 BYTES |

ATS—AST—ATR (AUDIO TITLE SET AUDIO STREAM ATTRIBUTE DATA)

| b63 b62 b61 | b60 | b59 b58 | b57 b56 |
|---|---|---|---|
| AUDIO ENCODING MODE | ME | AUDIO TYPE | AUDIO APRICATION MODE |

| b55 b54 | b53 b52 | b51 | b50 b49 b48 |
|---|---|---|---|
| QUANTIZATION / DRC | fs | | AUDIO CHANNEL NUMBER |

| b47 b46 | b45 b44 | b40 |
|---|---|---|
| AST THINNING | LFE THINNING | | b39 ———————————————— b32 b31 ———————————————— b24 b23 ———————————————— b16 b15 ———————————————— b8 b7 ———————————————— b0

AUDIO PACK (VIDEO PACK)

FIG. 16

ACD (636 BYTES)

| | | |
|---|---|---|
| GENERAL INFORMATION | 48 BYTES | |
| NAME SPACE | 93 BYTES | 93 BYTES |
| FREE SPACE 1 | 93 BYTES | 93 BYTES |
| FREE SPACE 2 | 93 BYTES | 93 BYTES |
| DATA POINTER | 15 BYTES | 15 BYTES |
| TOTAL | 294 BYTES | 294 BYTES |
| | FIRST LANGUAGE | SECOND LANGUAGE |

FIG. 17

キョクモクカイセツ
前作のエディング曲
"FORGET-ME-NOT"

FIG. 20

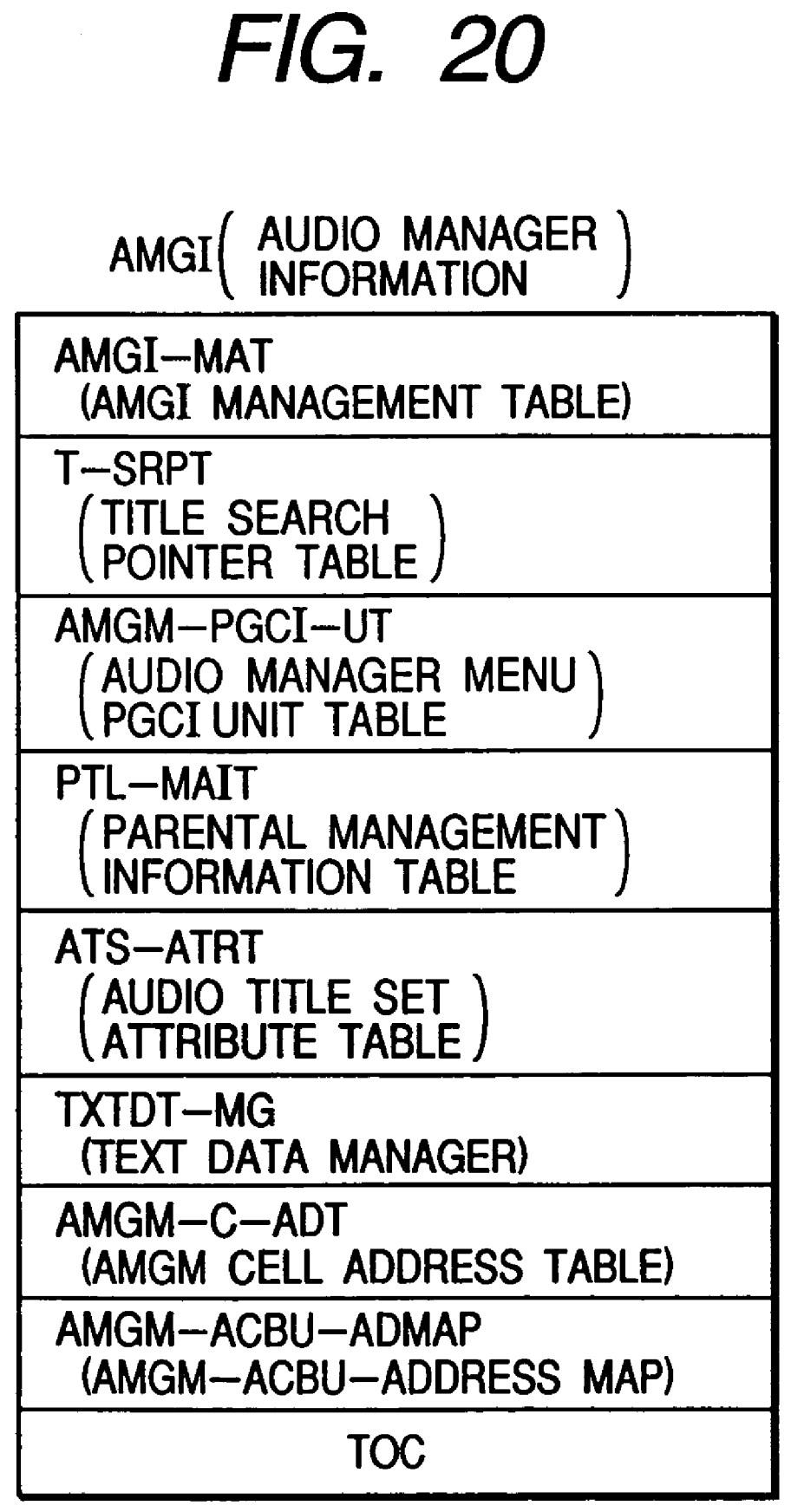

AMGI (AUDIO MANAGER INFORMATION)

| |
|---|
| AMGI-MAT (AMGI MANAGEMENT TABLE) |
| T-SRPT (TITLE SEARCH POINTER TABLE) |
| AMGM-PGCI-UT (AUDIO MANAGER MENU PGCI UNIT TABLE) |
| PTL-MAIT (PARENTAL MANAGEMENT INFORMATION TABLE) |
| ATS-ATRT (AUDIO TITLE SET ATTRIBUTE TABLE) |
| TXTDT-MG (TEXT DATA MANAGER) |
| AMGM-C-ADT (AMGM CELL ADDRESS TABLE) |
| AMGM-ACBU-ADMAP (AMGM-ACBU-ADDRESS MAP) |
| TOC |

FIG. 21

| FRAME NUMBER | POINT | PMIN, | PSEC, | PFRAME | |
|---|---|---|---|---|---|
| n | 01 | 00, | 02, | 32 | |
| n+1 | 01 | 00, | 02, | 32 | |
| n+2 | 01 | 00, | 02, | 32 | |
| n+3 | 02 | 10, | 15, | 12 | |
| n+4 | 02 | 10, | 15, | 12 | |
| n+5 | 02 | 10, | 15, | 12 | |
| n+6 | 03 | 16, | 28, | 63 | |
| n+7 | 03 | 16, | 28, | 63 | |
| n+8 | 03 | 16, | 28, | 63 | |
| n+9 | 04 | | ⋮ | ⋮ | |
| n+10 | 04 | | ⋮ | ⋮ | |
| n+11 | 04 | | ⋮ | ⋮ | |
| n+12 | 05 | | ⋮ | ⋮ | 1 SET |
| n+13 | 05 | | ⋮ | ⋮ | |
| n+14 | 05 | | ⋮ | ⋮ | |
| n+15 | 06 | 49, | 10, | 03 | |
| n+16 | 06 | 49, | 10, | 03 | |
| n+17 | 06 | 49, | 10, | 03 | |
| n+18 | A0 | 01, | 00, | 00 | |
| n+19 | A0 | 01, | 00, | 00 | |
| n+20 | A0 | 01, | 00, | 00 | |
| n+21 | A1 | 06, | 00, | 00 | |
| n+22 | A1 | 06, | 00, | 00 | |
| n+23 | A1 | 06, | 00, | 00 | |
| n+24 | A2 | 52, | 48, | 41 | |
| n+25 | A2 | 52, | 48, | 41 | |
| n+26 | A2 | 52, | 48, | 41 | |
| n+27 | 01 | 00, | 02, | 32 | |
| n+28 | 01 | 00, | 02, | 32 | |
| ⋮ | ⋮ | | ⋮ | ⋮ | |

FIG. 22

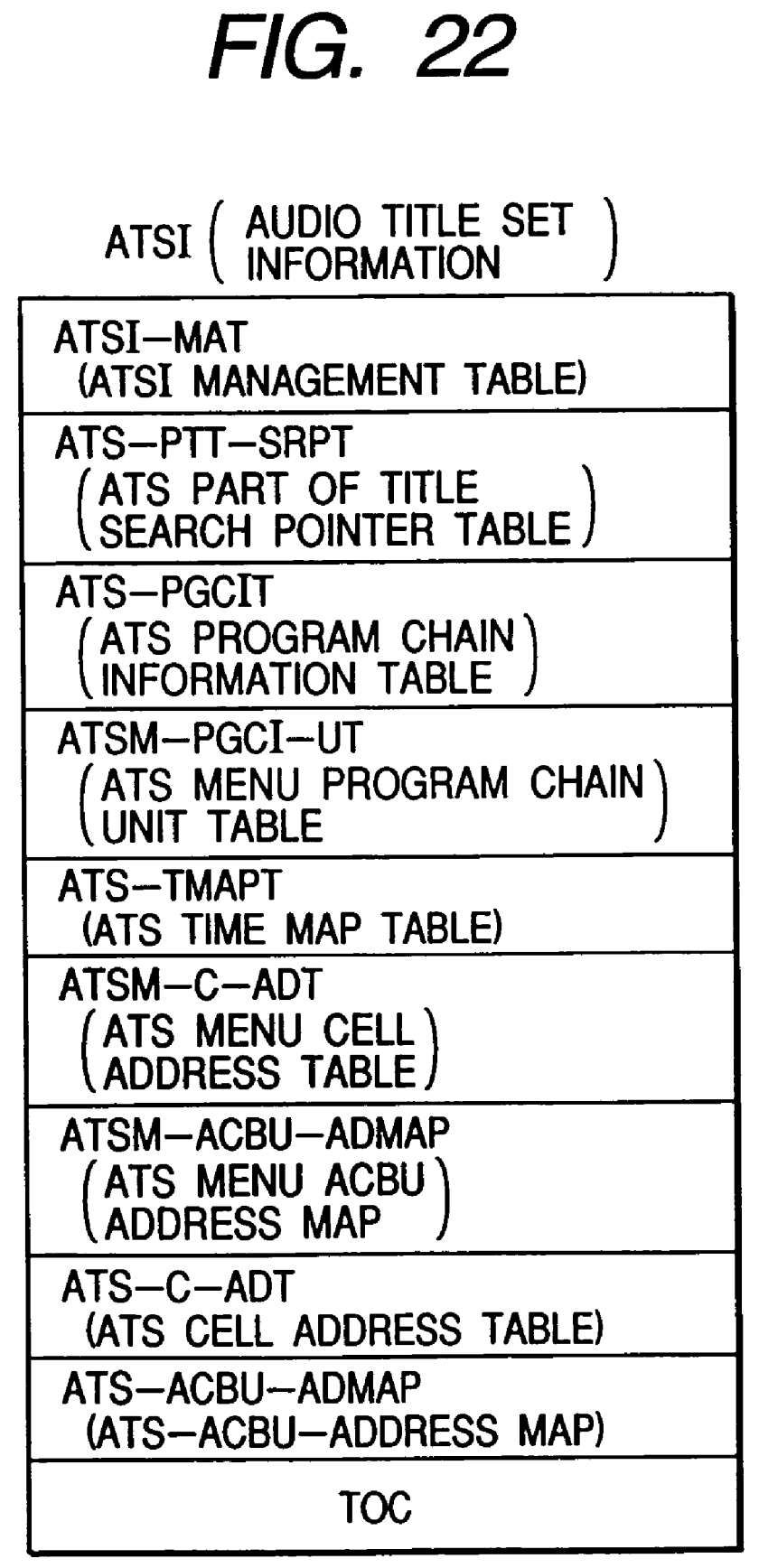

ATSI (AUDIO TITLE SET INFORMATION)

| |
|---|
| ATSI-MAT (ATSI MANAGEMENT TABLE) |
| ATS-PTT-SRPT (ATS PART OF TITLE SEARCH POINTER TABLE) |
| ATS-PGCIT (ATS PROGRAM CHAIN INFORMATION TABLE) |
| ATSM-PGCI-UT (ATS MENU PROGRAM CHAIN UNIT TABLE) |
| ATS-TMAPT (ATS TIME MAP TABLE) |
| ATSM-C-ADT (ATS MENU CELL ADDRESS TABLE) |
| ATSM-ACBU-ADMAP (ATS MENU ACBU ADDRESS MAP) |
| ATS-C-ADT (ATS CELL ADDRESS TABLE) |
| ATS-ACBU-ADMAP (ATS-ACBU-ADDRESS MAP) |
| TOC |

FIG. 28

AOTT-AOB-ATR

| b63 | b62 | b61 | b60 | b59 | b58 | b57 | b56 |
|---|---|---|---|---|---|---|---|
| AUDIO ENCODING MODE | | | | D-M | MULTICHANNEL STRUCTURE TYPE | | |

| b55 | b54 | b53 | b52 | b51 | b50 | b49 | b48 |
|---|---|---|---|---|---|---|---|
| Q1 | | | | Q2 | | | |

| b47 | b46 | b45 | b44 | b43 | b42 | b41 | b40 |
|---|---|---|---|---|---|---|---|
| fs1 | | | | fs2 | | | |

| b39 | | b37 | b36 | | | | b32 |
|---|---|---|---|---|---|---|---|
| RESERVED | | | CHANNEL ASSIGNMENT | | | | |

| b31 | | | | | | | b24 |
|---|---|---|---|---|---|---|---|
| RESERVED | | | | | | | |

| b23 | | | | | | | b16 |
|---|---|---|---|---|---|---|---|
| RESERVED | | | | | | | |

| b15 | | | | | | | b8 |
|---|---|---|---|---|---|---|---|
| RESERVED | | | | | | | |

| b7 | | | | | | | b0 |
|---|---|---|---|---|---|---|---|
| RESERVED | | | | | | | |

FIG. 29

LINEAR PCM PRIVATE HEADER

| FILED | BIT NUMBER | BYTE NUMBER |
|---|---|---|
| SUB STREAM ID | 8 | 1 |
| RESERVED | 4 | 2 |
| ISRC NUMBER | 4 | |
| ISRC DATA | 8 | |
| PRIVATE HEADER LENGTH | 8 | 1 |
| FIRST ACCESS UNIT POINTER | 16 | 2 |
| AUDIO EMPHASIS FLAG F1 | 1 | 1 |
| AUDIO EMPHASIS FLAG F2 | 1 | |
| RESERVED | 1 | |
| DOWN MIX CODE | 5 | |
| QUANTIZATION WORD LENGTH 1 | 4 | 1 |
| QUANTIZATION WORD LENGTH 2 | 4 | |
| AUDIO SAMPLING FREQUENCY fs 1 | 4 | 1 |
| AUDIO SAMPLING FREQUENCY fs 2 | 4 | |
| RESERVED | 4 | 1 |
| MULTICHANNEL TYPE | 4 | |
| CHANNEL ASSIGNMENT 1 | 4 | 1 |
| CHANNEL ASSIGNMENT 2 | 4 | |
| DYNAMIC RANGE CONTROL | 8 | 1 |
| STUFFING BYTE | — | 0—7 |

LINEAR PCM AUDIO PACK

FIG. 36

LINEAR PCM PRIVATE HEADER

| | FILED | BIT NUMBER | BYTE NUMBER |
|---|---|---|---|
| | SUB STREAM ID | 8 | 1 |
| | RESERVED | 3 | 2 |
| | UPC/EAN-ISRC NUMBER | 5 | |
| | UPC/EAN-ISRC DATA | 8 | |
| | PRIVATE HEADER LENGTH | 8 | 1 |
| | FIRST ACCESS UNIT POINTER | 16 | 2 |
| ADI | AUDIO EMPHASIS FLAG | 1 | 1 |
| | RESERVED | 1 | |
| | DOWN MIX CODE | 1 | |
| | DOWN MIX CODE EFFECTIVENESS | 1 | |
| | DOWN MIX CODE | 4 | |
| | QUANTIZATION WORD LENGTH 1 | 4 | 1 |
| | QUANTIZATION WORD LENGTH 2 | 4 | |
| | AUDIO SAMPLING FREQUENCY fs 1 | 4 | 1 |
| | AUDIO SAMPLING FREQUENCY fs 2 | 4 | |
| | RESERVED | 4 | 1 |
| | MULTICHANNEL TYPE | 4 | |
| | BIT SHFT OF CHANNEL GROUP 2 | 3 | 1 |
| | CHANNEL ASSIGNMENT | 5 | |
| | DYNAMIC RANGE CONTROL | 8 | 1 |
| | RESERVED | 8 | 2 |
| | RESERVED | 8 | |
| | STUFFING BYTE | — | 8 |

FIG. 37

| b7 | b6 | b5 | b4 | b3 | b2 | b1 | b0 |
|---|---|---|---|---|---|---|---|
| RESERVED | | COUNTRY CODE (ISRC #1) | | | | | |

FIG. 38

| b7 | b6 | b5 | b4 | b3 | b2 | b1 | b0 |
|---|---|---|---|---|---|---|---|
| RESERVED | | COUNTRY CODE (ISRC #2) | | | | | |

FIG. 39

| b7 | b6 | b5 | b4 | b3 | b2 | b1 | b0 |
|---|---|---|---|---|---|---|---|
| RESERVED | | COPYRIGHT HOLDER CODE (ISRC #3) | | | | | |

FIG. 40

| b7 | b6 | b5 | b4 | b3 | b2 | b1 | b0 |
|---|---|---|---|---|---|---|---|
| RESERVED | | COPYRIGHT HOLDER CODE (ISRC #4) | | | | | |

FIG. 41

| b7 | b6 | b5 | b4 | b3 | b2 | b1 | b0 |
|---|---|---|---|---|---|---|---|
| RESERVED | | COPYRIGHT HOLDER CODE (ISRC #5) | | | | | |

FIG. 42

| b7 | b6 | b5 | b4 | b3 | b2 | b1 | b0 |
|---|---|---|---|---|---|---|---|
| RESERVED | | | | RECORDING YEAR (ISRC #6) | | | |

FIG. 43

| b7 | b6 | b5 | b4 | b3 | b2 | b1 | b0 |
|---|---|---|---|---|---|---|---|
| RESERVED | | | | RECORDING YEAR (ISRC #7) | | | |

FIG. 48

ATSI-MAT

| RBP | | BYTE NUMBER |
|---|---|---|
| 0~11 | ATS IDENTIFIER (ATS-ID) | 12 |
| 12~15 | ATS END ADRS (ATS-EA) | 4 |
| 16~27 | RESERVED | 12 |
| 28~31 | ATSI END ADRS (ATSI-EA) | 4 |
| 32, 33 | VERSION NO (VERN) | 2 |
| 34~127 | RESERVED | 94 |
| 128~131 | ATSI-MAT END ADRS | 4 |
| 132~191 | RESERVED | 60 |
| 192~195 | AOTT VTS START ADRS | 4 |
| 196~199 | AOTT AOBS START ADRS (AOTT VOBS START ADRS) | 4 |
| 200~203 | RESERVED | 4 |
| 204~207 | ATS-PGCIT START ADRS | 4 |
| 208~255 | RESERVED | 48 |
| 256~383 | AOTT-AOB-ATR AOTT-VOB-AST-ATR | 128 |
| 384~671 | ATS-DM-COEFT#0~#15 | 288 |
| 672~703 | RESERVED | 32 |
| 704~705 | STILL PICTURE DATA ATTRIBUTE (ATS-SPCT-ART) | 2 |
| 706~2047 | RESERVED | 1342 |

FIG. 49

AOTT—AOB—ATR

| | | | | | | | |
|---|---|---|---|---|---|---|---|
| b127 | b126 | b125 | b124 | b123 | b122 | b121 | b120 |
| AUDIO ENCODING MODE | | | | | | | |
| b119 | b118 | b117 | b116 | b115 | b114 | b113 | b112 |
| RESERVED | | | | | | | |
| b111 | b110 | b109 | b108 | b107 | b106 | b105 | b104 |
| Q1 | | | | Q2 | | | |
| b103 | b102 | b101 | b100 | b99 | b98 | b97 | b96 |
| fs1 | | | | fs2 | | | |
| b95 | b94 | b93 | b92 | b91 | b90 | b89 | b88 |
| MULTICHANNEL STRUCTURE TYPE | | | CHANNEL ASSIGNMENT | | | | |
| b87 | b86 | b85 | b84 | b83 | b82 | b81 | b80 |
| RESERVED | | | | | | | |
| b79 | b78 | b77 | b76 | b75 | b74 | b73 | b72 |
| RESERVED | | | | | | | |
| b71 | b70 | b69 | b68 | b67 | b66 | b65 | b64 |
| RESERVED | | | | | | | |
| b63 | b62 | b61 | b60 | b59 | b58 | b57 | b56 |
| RESERVED | | | | | | | |
| b55 | b54 | b53 | b52 | b51 | b50 | b49 | b48 |
| RESERVED | | | | | | | |
| b47 | b46 | b45 | b44 | b43 | b42 | b41 | b40 |
| RESERVED | | | | | | | |
| b39 | b38 | b37 | b36 | b35 | b34 | b33 | b32 |
| RESERVED | | | | | | | |
| b31 | b30 | b29 | b28 | b27 | b26 | b25 | b24 |
| RESERVED | | | | | | | |
| b23 | b22 | b21 | b20 | b19 | b18 | b17 | b16 |
| RESERVED | | | | | | | |
| b15 | b14 | b13 | b12 | b11 | b10 | b9 | b8 |
| RESERVED | | | | | | | |
| b7 | b6 | b5 | b4 | b3 | b2 | b1 | b0 |
| RESERVED | | | | | | | |

FIG. 50

| CHANNEL ASSIGNMENT INFORMATION (BIT PATTERN) | CHANNEL STRUCTURE OF GROUPS 1, 2 | | | | | | CHANNEL NUMBER IN GROUP 1 | CHANNEL NUMBER IN GROUP 2 |
|---|---|---|---|---|---|---|---|---|
| | ACH0 | ACH1 | ACH2 | ACH3 | ACH4 | ACH5 | | |
| 00000b | C(mono) | none | none | none | none | none | 1 | 0 |
| 00001b | L | R | none | none | none | none | 2 | 0 |
| 00010b | Lf | Rf | S | none | none | none | 2 | 1 |
| 00011b | Lf | Rf | Ls | Rs | none | none | 2 | 2 |
| 00100b | Lf | Rf | LFE | none | none | none | 2 | 1 |
| 00101b | Lf | Rf | LFE | S | none | none | 2 | 2 |
| 00110b | Lf | Rf | LFE | Ls | Rs | none | 2 | 3 |
| 00111b | Lf | Rf | C | none | none | none | 2 | 1 |
| 01000b | Lf | Rf | C | S | none | none | 2 | 2 |
| 01001b | Lf | Rf | C | Ls | Rs | none | 2 | 3 |
| 01010b | Lf | Rf | C | LFE | none | none | 2 | 2 |
| 01011b | Lf | Rf | C | LFE | S | none | 2 | 3 |
| 01100b | Lf | Rf | C | LFE | Ls | Rs | 2 | 4 |
| 01101b | Lf | Rf | C | S | none | none | 3 | 1 |
| 01110b | Lf | Rf | C | Ls | Rs | none | 3 | 2 |
| 01111b | Lf | Rf | C | LFE | none | none | 3 | 1 |
| 10000b | Lf | Rf | C | LFE | S | none | 3 | 2 |
| 10001b | Lf | Rf | C | LFE | Ls | Rs | 3 | 3 |
| 10010b | Lf | Rf | Ls | Rs | LFE | none | 4 | 1 |
| 10011b | Lf | Rf | Ls | Rs | C | none | 4 | 1 |
| 10100b | Lf | Rf | Ls | Rs | C | LFE | 4 | 2 |
| OTHERS | RESERVED | | | | | | | |

← CHANNEL GROUP 1 | CHANNEL GROUP 2 →

FIG. 51

AOTT−VOB−AST−ATR

| | | | | | | | |
|---|---|---|---|---|---|---|---|
| b127 | b126 | b125 | b124 | b123 | b122 | b121 | b120 |
| AUDIO ENCODING MODE | | | | | | | |
| b119 | b118 | b117 | b116 | b115 | b114 | b113 | b112 |
| RESERVED | | | | | | | |
| b111 | b110 | b109 | b108 | b107 | b106 | b105 | b104 |
| Q | | | | RESERVED | | | |
| b103 | b102 | b101 | b100 | b99 | b98 | b97 | b96 |
| fs | | | | RESERVED | | | |
| b95 | b94 | b93 | b92 | b91 | b90 | b89 | b88 |
| MULTICHANNEL STRUCTURE TYPE | | | CHANNEL ASSIGNMENT | | | | |
| b87 | b86 | b85 | b84 | b83 | b82 | b81 | b80 |
| DECODING AUDIO STREAM NUMBER | | | RESERVED | | | | |
| b79 | b78 | b77 | b76 | b75 | b74 | b73 | b72 |
| MPEG AUDIO DRC | | RESERVED | | COMPRESSION AUDIO CHANNEL NUMBER | | | |
| b71 | b70 | b69 | b68 | b67 | b66 | b65 | b64 |
| RESERVED | | | | | | | |
| b63 | b62 | b61 | b60 | b59 | b58 | b57 | b56 |
| RESERVED | | | | | | | |
| b55 | b54 | b53 | b52 | b51 | b50 | b49 | b48 |
| RESERVED | | | | | | | |
| b47 | b46 | b45 | b44 | b43 | b42 | b41 | b40 |
| RESERVED | | | | | | | |
| b39 | b38 | b37 | b36 | b35 | b34 | b33 | b32 |
| RESERVED | | | | | | | |
| b31 | b30 | b29 | b28 | b27 | b26 | b25 | b24 |
| RESERVED | | | | | | | |
| b23 | b22 | b21 | b20 | b19 | b18 | b17 | b16 |
| RESERVED | | | | | | | |
| b15 | b14 | b13 | b12 | b11 | b10 | b9 | b8 |
| RESERVED | | | | | | | |
| b7 | b6 | b5 | b4 | b3 | b2 | b1 | b0 |
| RESERVED | | | | | | | |

FIG. 52

ATS—DM—COEFT#0—#15

| CONTENTS | BYTE NUMBER |
|---|---|
| DOWN MIX COEFFICIENT OF TABLE NUMBER 0 | 18 |
| DOWN MIX COEFFICIENT OF TABLE NUMBER 1 | 18 |
| DOWN MIX COEFFICIENT OF TABLE NUMBER 2 | 18 |
| DOWN MIX COEFFICIENT OF TABLE NUMBER 3 | 18 |
| DOWN MIX COEFFICIENT OF TABLE NUMBER 4 | 18 |
| DOWN MIX COEFFICIENT OF TABLE NUMBER 5 | 18 |
| DOWN MIX COEFFICIENT OF TABLE NUMBER 6 | 18 |
| DOWN MIX COEFFICIENT OF TABLE NUMBER 7 | 18 |
| DOWN MIX COEFFICIENT OF TABLE NUMBER 8 | 18 |
| DOWN MIX COEFFICIENT OF TABLE NUMBER 9 | 18 |
| DOWN MIX COEFFICIENT OF TABLE NUMBER 10 | 18 |
| DOWN MIX COEFFICIENT OF TABLE NUMBER 11 | 18 |
| DOWN MIX COEFFICIENT OF TABLE NUMBER 12 | 18 |
| DOWN MIX COEFFICIENT OF TABLE NUMBER 13 | 18 |
| DOWN MIX COEFFICIENT OF TABLE NUMBER 14 | 18 |
| DOWN MIX COEFFICIENT OF TABLE NUMBER 15 | 18 |

ATS—SPCT—ATR

| b15 | b14 | b13 | b12 | b11 | b10 | b9 | b8 |
|---|---|---|---|---|---|---|---|
| VIDEO COMPRESSION MODE | | TV SYSTEM | | ASPECT RATIO | | DISPLAY MODE | |

| b7 | b6 | b5 | b4 | b3 | b2 | b1 | b0 |
|---|---|---|---|---|---|---|---|
| RESERVED | | SOURCE PICTURE RESOLUTION | | | RESERVED | | |

FIG. 55

ATS-PGCITI

| RBP | | BYTE NUMBER |
|---|---|---|
| 0~1 | ATS-PGCI-SRP NUMBER | 2 |
| 2~3 | RESERVED | 2 |
| 4~7 | ATS-PGCIT END ADRS | 4 |

FIG. 56

ATS-PGCI-SRP

| RBP | | BYTE NUMBER |
|---|---|---|
| 0~3 | ATS-PGC CATEGORY (ATS-PGC-CAT) | 4 |
| 4~7 | ATS-PGCI END ADRS | 4 |

FIG. 57

ATS-PGC-CAT

| b31 | b30 | b29 | b28 | b27 | b26 | b25 | b24 |
|---|---|---|---|---|---|---|---|
| ENTRY TYPE | ATS-TTN | | | | | | |

| b23 | b22 | b21 | b20 | b19 | b18 | b17 | b16 |
|---|---|---|---|---|---|---|---|
| BLOCK MODE | | BLOCK TYPE | | AUDIO CHANNEL NUMBER | | | |

| b15 | b14 | b13 | b12 | b11 | b10 | b9 | b8 |
|---|---|---|---|---|---|---|---|
| AUDIO ENCODING MODE | | | | | | | |

| b7 | | | | | | | b0 |
|---|---|---|---|---|---|---|---|
| RESERVED | | | | | | | |

ATS−PGC−GI

| RBP | | BYTE NUMBER |
|---|---|---|
| 0∼3 | ATS−PGC CONTENTS (ATS−PGC−CNT) | 4 |
| 4∼7 | ATS−PGC PLAYBACK TIME (ATS−PGC−PB−TM) | 4 |
| 8∼9 | RESERVED | 2 |
| 10∼11 | ATS−PGIT START ADDRESS | 2 |
| 12∼13 | ATS−C−PBIT START ADDRESS | 2 |
| 14∼15 | RESERVED | 2 |

FIG. 62

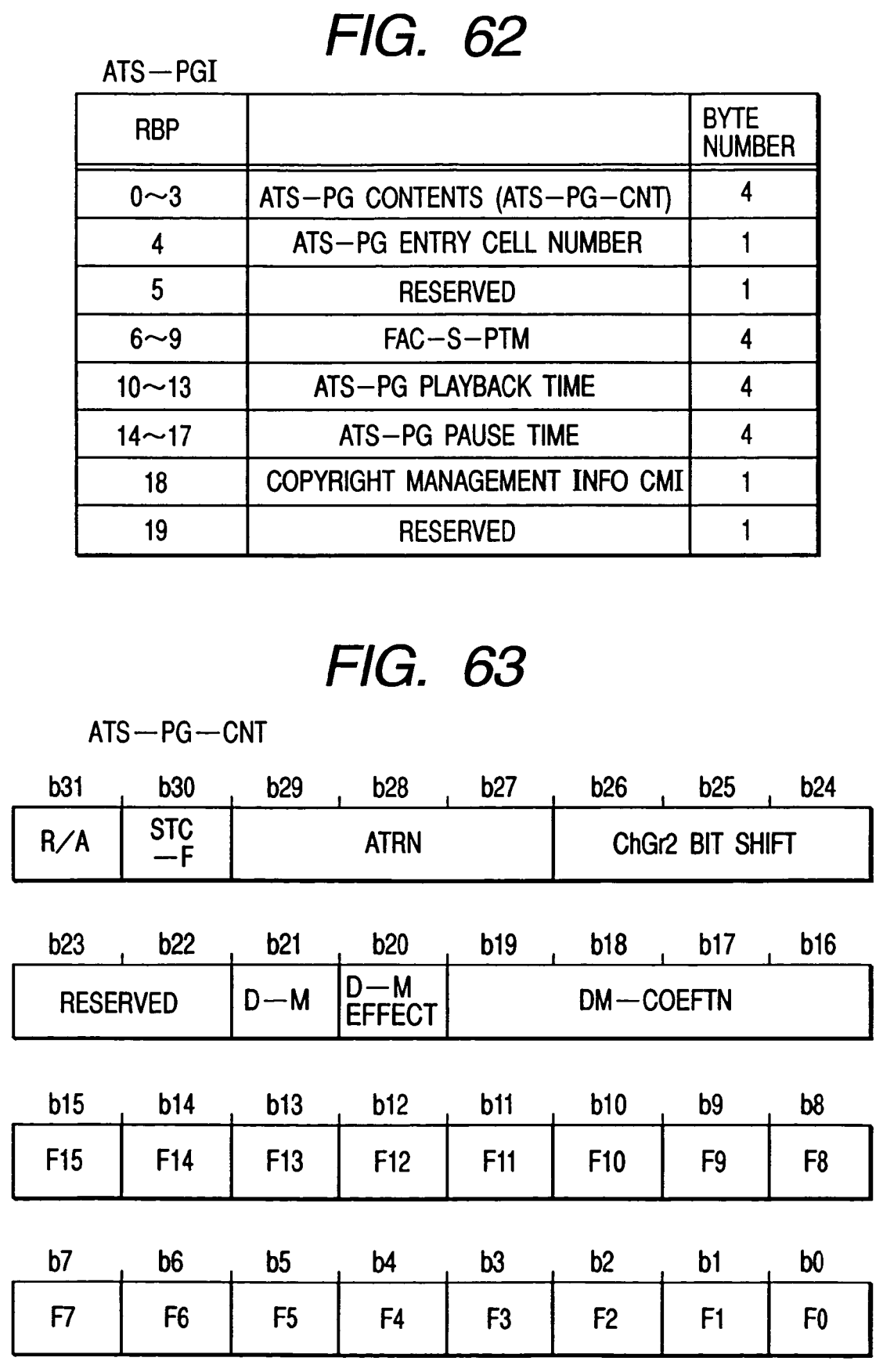

ATS—PGI

| RBP | | BYTE NUMBER |
|---|---|---|
| 0~3 | ATS—PG CONTENTS (ATS—PG—CNT) | 4 |
| 4 | ATS—PG ENTRY CELL NUMBER | 1 |
| 5 | RESERVED | 1 |
| 6~9 | FAC—S—PTM | 4 |
| 10~13 | ATS—PG PLAYBACK TIME | 4 |
| 14~17 | ATS—PG PAUSE TIME | 4 |
| 18 | COPYRIGHT MANAGEMENT INFO CMI | 1 |
| 19 | RESERVED | 1 |

FIG. 63

ATS—PG—CNT

| b31 | b30 | b29 | b28 | b27 | b26 | b25 | b24 |
|---|---|---|---|---|---|---|---|
| R/A | STC—F | ATRN | | | ChGr2 BIT SHIFT | | |

| b23 | b22 | b21 | b20 | b19 | b18 | b17 | b16 |
|---|---|---|---|---|---|---|---|
| RESERVED | | D—M | D—M EFFECT | DM—COEFTN | | | |

| b15 | b14 | b13 | b12 | b11 | b10 | b9 | b8 |
|---|---|---|---|---|---|---|---|
| F15 | F14 | F13 | F12 | F11 | F10 | F9 | F8 |

| b7 | b6 | b5 | b4 | b3 | b2 | b1 | b0 |
|---|---|---|---|---|---|---|---|
| F7 | F6 | F5 | F4 | F3 | F2 | F1 | F0 |

ATS−C−PBI

| RBP | | BYTE NUMBER |
|---|---|---|
| 0 | ATS−C INDEX NUMBER | 1 |
| 1 | ATS−C TYPE (ATS−C−TY) | 1 |
| 2～3 | RESERVED | 2 |
| 4～7 | ATS−C START ADDRESS | 4 |
| 8～11 | ATS−C END ADDRESS | 4 |

ATS−C−TY

| b7 | b6 | b5 | b4 | b3 | b2 | b1 | b0 |
|---|---|---|---|---|---|---|---|
| ATS−C−COMP | | RESERVED | | ATS−C Usage | | | |

ASVUI (AUDIO STILL VIDEO UNIT INFORMATION)

| | | |
|---|---|---|
| ASVS-ID | 12 | |
| ASVU NUMBER | 2 | |
| RESERVED | 2 | |
| ASVOBS START ADDRESS | 4 | |
| ASVOBS END ADRESS | 4 | |
| ASVU ATTRIBUTE #0 | 2 | 2×4 BYTES |
| ⋮ | | |
| ASVU ATTRIBUTE #3 | 2 | |
| ASVOBS SUB PICTURE PALLET #0 | 4 | 4×16 BYTES |
| ⋮ | | |
| ASVOBS SUB PICTURE PALLET #15 | 4 | |
| ASVU #1 GENERAL INFORMATION | 8 | 8×99 BYTES |
| ⋮ | | |
| ASVU #99 GENERAL INFORMATION | 8 | |

HLI PACK

STILL PICTURE PACK

FIG. 89

| | STILL PICTURE PACKET | BYTE NUMBER |
|---|---|---|
| PACKET HEADER | MANDATORY SPCT PACKET INFORMATION | 9 |
| | FIRST SPCT PACKET INFORMATION OF STILL PICTURE | 5 |
| | FIRST SPCT PACKET INFORMATION OF STILL PICTURE | 5 |
| | FIRST SPCT PACKET INFORMATION OF ASVOB | 3 |
| | ~ | ~ |
| | STILL PICTURE DATA | |

FIG. 91

| SUB PICTURE PACKET | BYTE NUMBER |
|---|---|
| MANDATORY SP PACKET INFORMATION | 9 |
| FIRST SP PACKET INFORMATION OF SP UNIT | 5 |
| FIRST SP PACKET INFORMATION OF ASVOB | 3 |
| ~ | ~ |
| SUB PICTURE DATA | |

SUB PICTURE PACK

FIG. 95

ATS—PG—ASV—PBI—SRP

| | BYTE NUMBER |
|---|---|
| ASVU NUMBER | 1 |
| ASV DISPLAY MODE | 1 |
| ATS—ASV—PBI START ADDRESS | 2 |
| ATS—ASV—PBI END ADDRESS | 2 |

FIG. 96

ASV DISPLAY MODE (ASV—DMOD)

| b7 | b6 | b5 | b4 | b3 | b2 | b1 | b0 |
|---|---|---|---|---|---|---|---|
| RESERVED | | | | DISPLAY TIMING MODE | | DISPLAY ORDER MODE | |

FIG. 97

ATS—ASV—PBI

| | |
|---|---|
| ASV DISPLAY LIST #1～#k | 10 BYTE×k | k≦99

FIG. 99

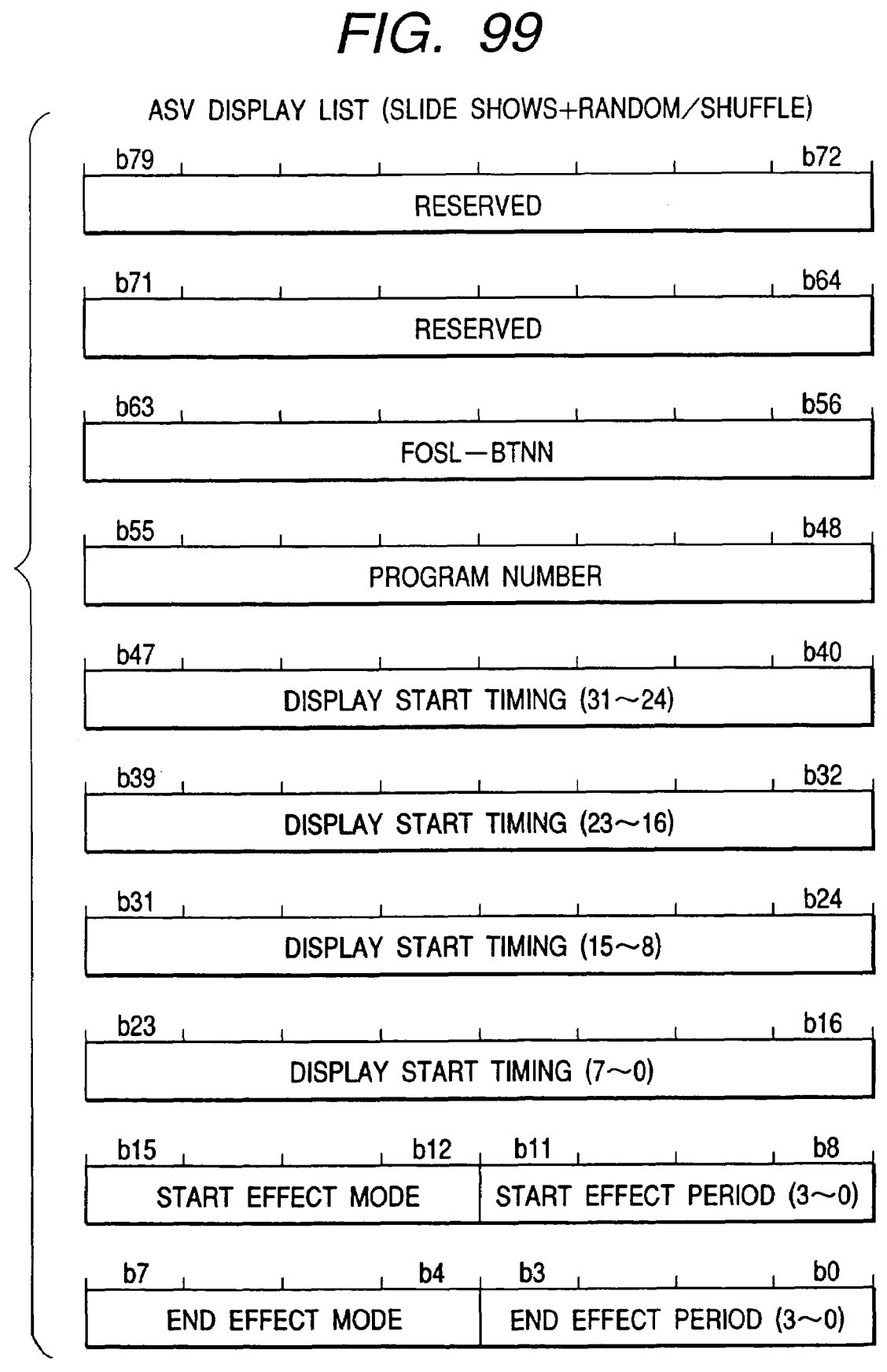

ASV DISPLAY LIST (SLIDE SHOWS+RANDOM/SHUFFLE)

| Bits | Field | Bits | Field |
|---|---|---|---|
| b79–b72 | RESERVED | | |
| b71–b64 | RESERVED | | |
| b63–b56 | FOSL-BTNN | | |
| b55–b48 | PROGRAM NUMBER | | |
| b47–b40 | DISPLAY START TIMING (31~24) | | |
| b39–b32 | DISPLAY START TIMING (23~16) | | |
| b31–b24 | DISPLAY START TIMING (15~8) | | |
| b23–b16 | DISPLAY START TIMING (7~0) | | |
| b15–b12 | START EFFECT MODE | b11–b8 | START EFFECT PERIOD (3~0) |
| b7–b4 | END EFFECT MODE | b3–b0 | END EFFECT PERIOD (3~0) |

RECORDING MEDIUM AND SIGNAL PROCESSING APPARATUS

This application is a Continuation of application Ser. No. 09/276,692, filed Mar. 26, 1999.

BACKGROUND OF THE INVENTION

1. Field of the Invention

This invention relates to a recording medium such as a digital signal recording disc, a digital video disc, a digital versatile disc, or an IC memory. Also, this invention relates to a signal encoding apparatus. Furthermore, this invention relates to a signal decoding apparatus. In addition, this invention relates to a method of signal transmission.

2. Description of the Related Art

Optical discs for storing information include digital video discs and digital versatile discs (DVD's). A standard DVD stores a combination of an audio signal and a video signal. The audio-signal recording capacity of the standard DVD is significantly smaller than the video-signal recording capacity thereof. It is difficult to manage time-related information of the audio signal recorded on the standard DVD. It is difficult to read out information of the titles of tunes represented by the audio signal recorded on the standard DVD.

In the standard DVD, each video contents block unit has a sequence of packs including a navigation control pack, video packs, and audio packs. During playback, the reproduction of information from video packs and audio packs is controlled in response to information in a navigation control pack. Accordingly, the standard DVD is not suited for a recording medium mainly storing an audio signal.

Generally, it is important to maintain a continuity of the contents of an audio signal during playback. In the standard DVD, a unit of time management corresponds to one video frame. Therefore, if an audio signal is recorded on the standard DVD, it is difficult to manage the real time concerning the contents of the audio signal. This is disadvantageous to the maintenance of a continuity of the audio contents.

SUMMARY OF THE INVENTION

It is a first object of this invention to provide an improved recording medium.

It is a second object of this invention to provide an improved signal encoding apparatus.

It is a third object of this invention to provide an improved signal decoding apparatus.

It is a fourth object of this invention to provide an improved method of signal transmission.

A first aspect of this invention provides a recording medium comprising a first area storing an audio title set containing a plurality of audio objects including a first audio object and a second audio object, the first audio object consisting of first packs having audio data, the second audio object including second packs having audio data and a third pack having real-time information related to the audio data in the second packs; and a second area storing a still-picture set including a fourth pack having still-picture data related to the audio data in the first packs and the audio data in the second packs.

A second aspect of this invention is based on the first aspect thereof, and provides a recording medium wherein the audio title set contains an audio object set having the plurality of the audio objects, and the audio title set has audio title set information in a place near a location of the audio object set, the audio title set information managing the audio object set.

A third aspect of this invention is based on the second aspect thereof, and provides a recording medium wherein the audio title set information includes an audio title set information management table.

A fourth aspect of this invention is based on the third aspect thereof, and provides a recording medium wherein the audio title set information management table includes attribute data for reproducing the audio data in the first packs and the audio data in the second packs as an analog signal.

A fifth aspect of this invention is based on the fourth aspect thereof, and provides a recording medium wherein the attribute data represents a coefficient for mixing multiple-channel audio data down into 2-channel audio data.

A sixth aspect of this invention is based on the third aspect thereof, and provides a recording medium wherein the audio title set information management table includes attribute data for indicating a still picture represented by the still-picture data in the fourth pack.

A seventh aspect of this invention is based on the second aspect thereof, and provides a recording medium wherein the audio title set information includes information for managing a still picture represented by the still-picture data in the fourth pack.

An eighth aspect of this invention is based on the second aspect thereof, and provides a recording medium wherein the audio title set information includes information for searching for a still picture represented by the still-picture data in the fourth pack.

A ninth aspect of this invention is based on the second aspect thereof, and provides a recording medium wherein the audio title set information includes information for temporally controlling a still picture represented by the still-picture data in the fourth pack.

A tenth aspect of this invention is based on the second aspect thereof, and provides a recording medium wherein the audio title set information includes mode identification information representing a mode selected from among a mode corresponding to reproduction of a still picture on a "browsable pictures" and "sequential" basis, a mode corresponding to reproduction of a still picture on a "browsable pictures" and "random" basis, a mode corresponding to reproduction of a still picture on a "slide shows" and "sequential" basis, and a mode corresponding to reproduction of a still picture on a "slide shows" and "random" basis.

An eleventh aspect of this invention is based on the second aspect thereof, and provides a recording medium wherein the audio title set information includes a audio title set program chain information table.

A twelfth aspect of this invention is based on the eleventh aspect thereof, and provides a recording medium wherein the audio title set program chain information table represents an encoding mode related to the audio data in the first packs and the audio data in the second packs.

A thirteenth aspect of this invention is based on the eleventh aspect thereof, and provides a recording medium wherein the audio title set program chain information table includes program chain information for continuous reproduction of the audio data in the first packs and the audio data in the second packs.

A fourteenth aspect of this invention is based on the eleventh aspect thereof, and provides a recording medium wherein the audio title set program chain information table includes bit shift data related to bit shift from which the audio data in the first packs and the audio data in the second packs result.

A fifteenth aspect of this invention is based on the eleventh aspect thereof, and provides a recording medium wherein the audio title set program chain information table includes information representing whether each of the audio objects corresponds to the first audio object or the second audio object.

A sixteenth aspect of this invention is based on the first aspect thereof, and provides a recording medium wherein the first packs and the second packs include attribute data for reproducing the audio data in the first packs and the audio data in the second packs as an analog signal.

A seventeenth aspect of this invention is based on the first aspect thereof, and provides a recording medium wherein one of the third pack and the fourth pack includes attribute data for managing a copyright related to a still picture represented by the still-picture data in the fourth pack.

An eighteenth aspect of this invention is based on the first aspect thereof, and provides a recording medium wherein one of the third pack and the fourth pack includes side information for page control of a still picture represented by the still-picture data in the fourth pack.

A nineteenth aspect of this invention is based on the first aspect thereof, and provides a recording medium wherein the audio data in the first packs and the audio data in the second packs represents a program stream conforming with MPEG2 standards.

A twentieth aspect of this invention provides a recording medium having an area storing a still-picture set including at least one still-picture unit, the still-picture unit including at least one still-picture object, the still-picture object having a still-picture pack including still-picture data.

A twenty-first aspect of this invention is based on the twentieth aspect thereof, and provides a recording medium wherein the still-picture set has still-picture set information in a place near a location of a still-picture object set, the still-picture set information managing the still-picture object set.

A twenty-second aspect of this invention provides a recording medium having an area storing a still-picture set including a plurality of still-picture objects including a first still-picture object and a second still-picture object, the first still-picture object having a still-picture pack, the first still-picture object being substantially void of a highlight information pack and a sub-picture pack, the second still-picture object having a highlight information pack, a sub-picture pack, and a still-picture pack.

A twenty-third aspect of this invention is based on the twenty-second aspect thereof, and provides a recording medium wherein the still-picture pack has a pack header and a still-picture packet, and the still-picture packet has a packet header and still-picture data, the packet header having information representing whether or not the still-picture pack is a first pack related to a still picture.

A twenty-fourth aspect of this invention is based on the twenty-second aspect thereof, and provides a recording medium wherein the still-picture pack has a pack header and a still-picture packet, and the still-picture packet has a packet header and still-picture data, the packet header having information representing whether or not the still-picture pack is a first pack in a still-picture object.

A twenty-fifth aspect of this invention is based on the twenty-second aspect thereof, and provides a recording medium wherein the sub-picture pack has a pack header and a sub-picture packet, and the sub-picture packet has a packet header and sub-picture data, the packet header having information representing whether or not the sub-picture pack is a first pack in a sub-picture unit.

A twenty-sixth aspect of this invention is based on the twenty-second aspect thereof, and provides a recording medium wherein the sub-picture pack has a pack header and a sub-picture packet, and the sub-picture packet has a packet header and sub-picture data, the packet header having information representing whether or not the sub-picture pack is a first pack in a sub-picture object set.

A twenty-seventh aspect of this invention is based on the first aspect thereof, and provides a recording medium wherein one of the audio title set and the still-picture set includes information of a still-picture control command.

A twenty-eighth aspect of this invention is based on the first aspect thereof, and provides a recording medium further comprising a third area storing a simple audio manager related to the audio information in the first packs and the audio information in the second packs, and a fourth area storing an audio manager related to the audio information in the first packs and the audio information in the second packs.

A twenty-ninth aspect of this invention provides a signal encoding apparatus comprising means for receiving audio data, real-time information, and still-picture data; and means for encoding the audio data, the real-time information, and the still-picture data into a data stream including an audio title set and a still-picture set, the audio title set containing a plurality of audio objects including a first audio object and a second audio object, the first audio object consisting of first packs having first portions of the audio data, the second audio object including second packs having second portions of the audio data and a third pack having a portion of the real-time information related to the second portions of the audio data in the second packs, the still-picture set including a fourth pack having a portion of the still-picture data related to the first portions of the audio data in the first packs and the second portions of the audio data in the second packs.

A thirtieth aspect of this invention provides a signal decoding apparatus comprising means for decoding a data stream into audio data, real-time information, and still-picture data; and means for outputting the audio data, the real-time information, and the still-picture data; wherein the data stream includes an audio title set and a still-picture set, the audio title set containing a plurality of audio objects including a first audio object and a second audio object, the first audio object consisting of first packs having first portions of the audio data, the second audio object including second packs having second portions of the audio data and a third pack having a portion of the real-time information related to the second portions of the audio data in the second packs, the still-picture set including a fourth pack having a portion of the still-picture data related to the first portions of the audio data in the first packs and the second portions of the audio data in the second packs.

A thirty-first aspect of this invention provides a method of signal transmission which comprises the steps of generating a data stream; transmitting the data stream through a medium; wherein the data stream includes an audio title set and a still-picture set, the audio title set containing a plurality of audio objects including a first audio object and a second audio object, the first audio object consisting of first packs having first portions of the audio data, the second audio object including second packs having second portions of the audio data and a third pack having a portion of the real-time information related to the second portions of the audio data in the second packs, the still-picture set including a fourth pack having a portion of the still-picture data related to the first portions of the audio data in the first packs and the second portions of the audio data in the second packs.

A thirty-second aspect of this invention provides a recording medium storing a computer program for encoding audio data, real-time information, and still-picture data into a data stream including an audio title set and a still-picture set, the audio title set containing a plurality of audio objects including a first audio object and a second audio object, the first audio object consisting of first packs having first portions of the audio data, the second audio object including second packs having second portions of the audio data and a third pack having a portion of the real-time information related to the second portions of the audio data in the second packs, the still-picture set including a fourth pack having a portion of the still-picture data related to the first portions of the audio data in the first packs and the second portions of the audio data in the second packs.

A thirty-third aspect of this invention provides a recording medium storing a computer program for decoding a data stream into audio data, real-time information, and still-picture data, wherein the data stream includes an audio title set and a still-picture set, the audio title set containing a plurality of audio objects including a first audio object and a second audio object, the first audio object consisting of first packs having first portions of the audio data, the second audio object including second packs having second portions of the audio data and a third pack having a portion of the real-time information related to the second portions of the audio data in the second packs, the still-picture set including a fourth pack having a portion of the still-picture data related to the first portions of the audio data in the first packs and the second portions of the audio data in the second packs.

BRIEF DESCRIPTION OF THE DRAWINGS

FIG. 5 is a diagram of the structure of an AMGI area in FIG. 3.

FIG. 8 is a diagram of the structure of an ATSI area in FIG. 4.

FIG. 9 is a diagram of the structure of an ATSI-MAT area in FIG. 8.

FIG. 11 is a diagram of the structure of an ATS-AST-ATRT area in FIG. 9.

FIG. 16 is a diagram of the structure of an ACD area in FIG. 15.

FIG. 17 is a diagram of the indication of an English-added Japanese tune name.

FIG. 20 is a diagram of the structure of an AMGI area in a second embodiment of this invention.

FIG. 21 is a diagram of the details of TOC information in FIG. 20.

FIG. 22 is a diagram of the structure of an ATSI area in a third embodiment of this invention.

FIG. 28 is a diagram of the structure of an AOTT-AOB-ATR area.

FIG. 29 is a diagram of a linear PCM audio pack private header.

FIG. 36 is a diagram of the structure of a private header in the linear PCM audio pack of FIG. 35.

FIGS. 37, 38, 39, 40, 41, 42, and 43 are diagrams of the structures of UPC/EAN-ISRC data which correspond to different UPC/EAN-ISRC numbers, respectively.

FIG. 48 is a diagram of the structure of an ATSI-MAT area.

FIG. 49 is a diagram of the structure of an AOTT-AOB-ATR area.

FIG. 50 is a diagram of channel assignment.

FIG. 51 is a diagram of the structure of an AOTT-VOB-AST-ATR area.

FIG. 52 is a diagram of the structure of a 288-byte area for multiple channel audio data down mix coefficients ATS-DM-COEFT#0-#15 in FIG. 48.

FIG. 55 is a diagram of the structure of an ATS-PGCITI area.

FIG. 56 is a diagram of the structure of an ATS-PGCI-SRP area.

FIG. 57 is a diagram of the structure of an ATS-PGC-CAT area.

FIG. 62 is a diagram of the structure of an ATS-PGI area.

FIG. 63 is a diagram of the structure of an ATS-PG-CNT area.

FIG. 89 is a diagram of the structure of the packet header of a still-picture packet.

FIG. 91 is a diagram of the structure of the packet header of a sub-picture packet.

FIG. 95 is a diagram of the structure of an ATS-PG-ASV-PBI-SRP area.

FIG. 96 is a diagram of the structure of an ASV-DMOD area.

FIG. 97 is a diagram of the structure of an ATS-ASV-PBI area.

FIG. 99 is a diagram of the structure of an ASV display list.

DESCRIPTION OF THE PREFERRED EMBODIMENTS

First Embodiment

In general, a DVD-Audio (a digital video disc-audio or a digital versatile disc-audio) according to a first embodiment of this invention stores a first audio signal and a second audio signal. The first audio signal is of a 2-channel stereophonic type. The second audio signal is of a multiple-channel type such as a 5-channel type, a 6-channel type, or an 8-channel type.

The DVD-Audio may store only the multiple-channel audio signal. During playback of information from such a DVD-Audio, a 2-channel audio signal can be generated from a reproduced multiple-channel audio signal in response to coefficients of down mix. The generated 2-channel audio signal is defined as being provided by simplified playback or simplified reproduction.

Figure 1:
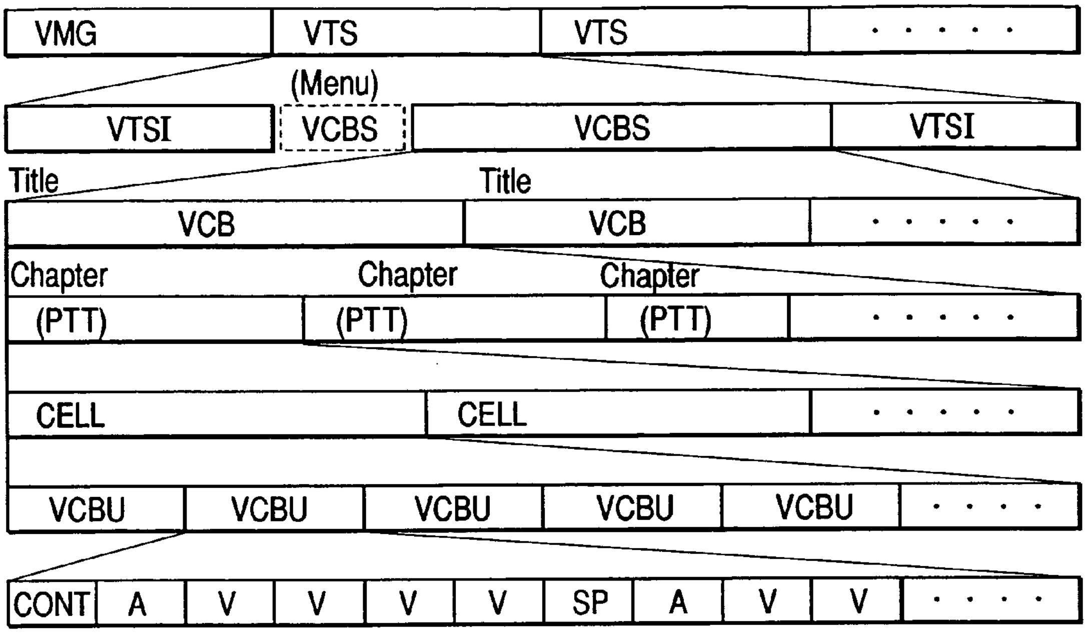
FIG. 1 is a diagram of the signal recording format of a DVD-Video.

FIG. 1 shows the signal recording format of a DVD-Video (a digital video disc-video or a digital versatile disc-video). As shown in FIG. 1, the DVD-Video has a first area assigned to a video manager VMG. The VMG area is followed by a sequence of second and later areas assigned to video title sets VTS respectively.

Each VTS area has a sequence of an area assigned to VTS information VTSI, one or more areas assigned to respective video contents block sets VCBS, and an area assigned to VTS information VTSI. The first video contents block set VCBS stores menu information for indicating a menu picture.

Each VCBS area has a sequence of areas assigned to video contents blocks VCB respectively. Each video contents block VCB corresponds to one video title.

Each VCB area has a sequence of areas corresponding to chapters respectively. Each chapter contains information representing a part of a title which is denoted by PTT.

Each chapter has a sequence of cells. Each cell has a sequence of VCB units VCBU. Each VCB unit VCBU has a sequence of packs. Each pack has 2,048 bytes.

In each VCB unit VCBU, a first pack is a control pack CONT followed by a sequence of packs including video packs V, audio packs A, and sub picture packs SP. The control pack CONT is assigned to information for controlling video packs V following the control pack CONT. The control information includes video-pack-synchronizing information. The video packs V are assigned to video data and non-audio data such as closed caption (CC) data. Each audio pack A is assigned to audio data.

Figure 2:
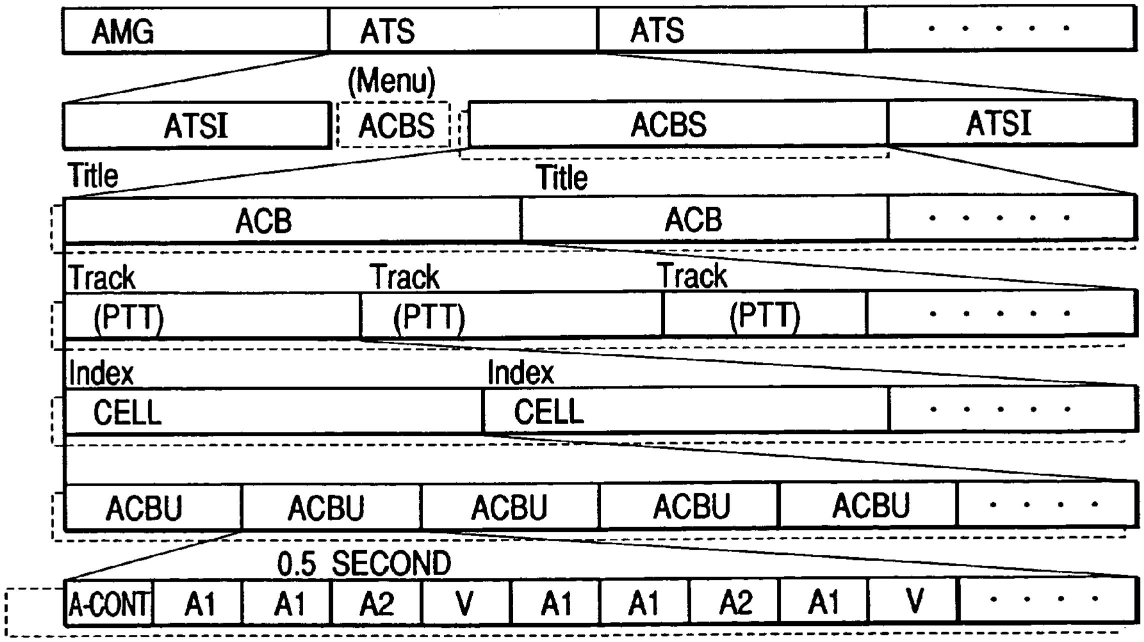
FIG. 2 is a diagram of the signal recording format of a DVD-Audio according to a first embodiment of this invention.

FIG. 2 shows the signal recording format of a DVD-Audio (a digital video disc-audio or a digital versatile disc-audio) according to the first embodiment of this invention. The DVD-Audio is compatible with a DVD-Video (see FIG. 1). As shown in FIG. 2, the DVD-Audio has a first area assigned to an audio manager AMG. The AMG area is followed by a sequence of second and later areas assigned to audio title sets ATS respectively.

Each ATS area has a sequence of an area assigned to ATS information ATSI, one or more areas assigned to respective audio contents block sets ACBS, and an area assigned to ATS information ATSI. The ATS information ATSI indicates play time lengths of respective tunes represented by audio data in the audio contents block sets ACBS. The play time lengths of the respective tunes are expressed in terms of real time. The first audio contents block set ACBS stores menu information for indicating a menu picture.

Each ACBS area has a sequence of areas assigned to audio contents blocks ACB respectively. Each audio contents block ACB corresponds to one audio title.

Each ACB area has a sequence of areas corresponding to tracks respectively. Each track contains information representing a part of a title which is denoted by PTT.

Each track has a sequence of indexes (cells). Each index has a sequence of ACB units ACBU. Each ACB unit ACBU has a sequence of packs. Each pack has 2,048 bytes.

In each ACB unit ACBU, a first pack is an audio control pack A-CONT followed by a sequence of packs including audio packs A1 and A2 and video packs V. The audio control pack A-CONT is assigned to information for managing an audio signal (audio data) in audio packs A1 and A2 following the audio control pack A-CONT. The managing information in the audio control pack A-CONT is basically similar to TOC (table of contents) information in a compact disc (CD). The managing information contains audio-pack-synchronizing information. Each audio pack A1 or A2 is assigned to audio data. The video packs V are assigned to video data and non-audio data such as closed caption (CC) data. The video packs V may be omitted from the ACB unit ACBU.

It should be noted that each ACB unit ACBU may further include a control pack CONT.

Figure 3:
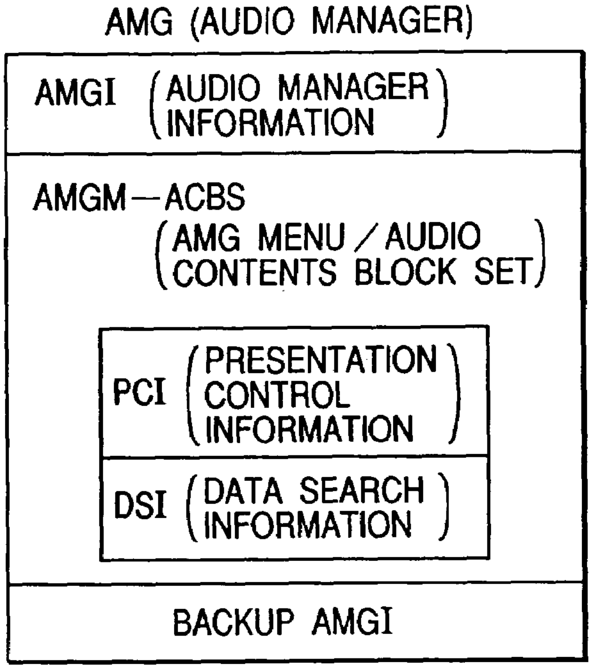
FIG. 3 is a diagram of the structure of an AMG area in FIG. 2.

As shown in FIG. 3, the AMG area (see FIG. 2) stores audio manager information AMGI, an audio contents block set AMGM-ACBS for an AMG menu, and backup audio manager information AMGI. The audio manager information AMGI may have TOC (table of contents) information. The audio contents block set AMGM-ACBS has presentation control information PCI and data search information DSI which are control information pieces respectively.

Figure 4:
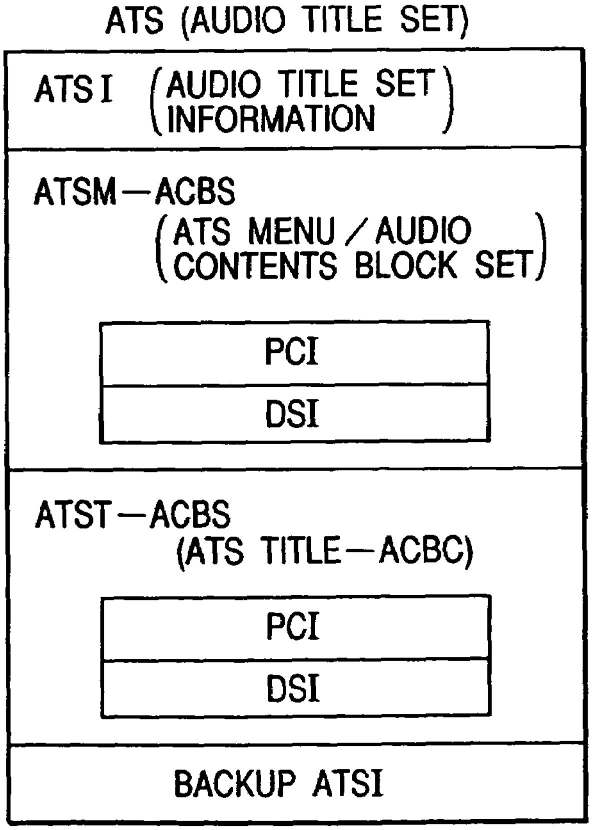
FIG. 4 is a diagram of the structure of an ATS area in FIG. 2.

As shown in FIG. 4, the ATS area (see FIG. 2) stores audio title set information ATSI, an audio contents block set ATSM-ACBS for an ATS menu, an audio contents block set ATST-ACBS for an ATS title, and backup audio title set information ATSI. The audio title set information ATSI may have TOC (table of contents) information. Each of the audio contents block sets ATSM-ACBS and ATST-ACBS has presentation control information PCI and data search information DSI.

As shown in FIG. 5, the audio manager information AMGI (see FIG. 3) has a management table AMGI-MAT therefor, a title search pointer table T-SRPT, an audio manager menu program chain information unit table AMGM-PGCI-UT, a parental management information table PTL-MAIT, an audio title set attribute table ATS-ATRT, a text data manager TXTDT-MG, an audio manager menu cell (index) address table AMGM-C-ADT, and an audio manager menu audio contents block unit address map AMGM-ACBU-ADMAP.

Figures 6, 7:
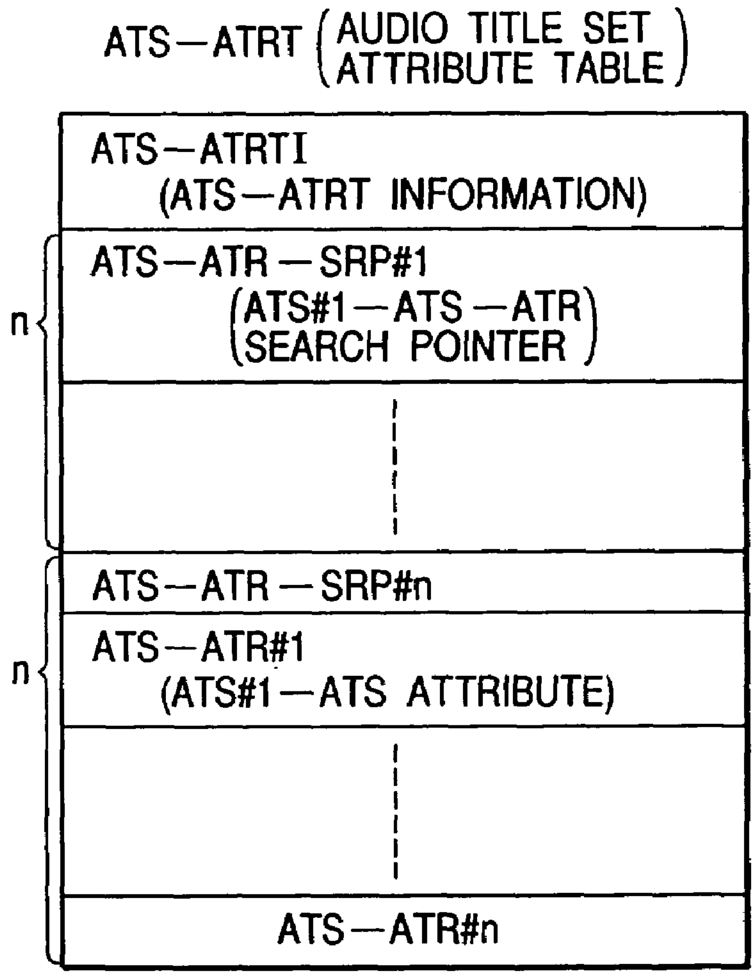
FIG. 6 is a diagram of the structure of an ATS-ATRT area in FIG. 5.
FIG. 7 is a diagram of the structure of an ATS-ATR area in FIG. 6.

As shown in FIG. 6, the audio title set attribute table ATS-ATRT (see FIG. 5) has audio title set attribute table information ATS-ATRTI, audio title set attribute search pointers ATS-ATR-SRP#1, ATS-ATR-SRP#2, . . . , ATS-ATR-SRP#n for respective "n" audio title sets ATS, and audio title set attribute data pieces ATS-ATR-#1, ATS-ATR-#2, . . . , ATS-ATR-#n for the respective "n" audio title sets ATS.

As shown in FIG. 7, each of the audio title set attribute data pieces ATS-ATR-#1, ATS-ATR-#2, . . . , ATS-ATR-#n (see FIG. 6) represents an end address ATS-ATR-EA of the audio title set attribute, a category ATS-CAT of the audio title set, and audio title set attribute information ATS-ATRI. The end address ATS-ATR-EA has 4 bytes. The category ATS-CAT has 4 bytes. The audio title set attribute information ATS-ATRI has 768 bytes.

As shown in FIG. 8, the audio title set information ATSI (see FIG. 4) has a management table ATSI-MAT for the audio title set information ATSI, a part-of-title search pointer table ATS-PTT-SRPT for the audio title set, a program chain information table ATS-PGCIT for the audio title set, a PGCI unit table ATSM-PGCI-UT for the audio title set menu, a time map table ATS-TMAPT for the audio title set, a cell (index) address table ATSM-C-ADT for the audio title set menu, an audio contents block unit address map ATSM-ACBU-ADMAP for the audio title set menu, a cell (index) address table ATS-C-ADT for the audio title set, and an audio contents block unit address map ATS-ACBU-ADMAP for the audio title set.

As shown in FIG. 9, the audio title set information management table ATSI-MAT (see FIG. 8) has an identifier ATS-ID for the audio title set, an end address ATS-EA of the audio title set, an end address ATSI-EA for the audio title set information, a version number VERN of the specifications of the DVD-Audio, a category ATS-CAT of the audio title set, an end address ATSI-MAT-EA of the audio title set information management table, a start address ATSM-ACBS-SA of the ATS menu audio contents block set, a start address ATSA-ACBS-SA of the ATS title audio contents block set, a start address ATS-PTT-SRPT-SA of the audio title set part-of-title search pointer table, a start address ATS-PGCIT-SA of the audio title set program chain information table, a start address ATSM-PGCI-UT-SA of the audio title set menu program chain information unit table, a start address ATS-TMAPT-SA of the audio title set time map table, a start address ATSM-C-ADT-SA of the audio title set menu cell address table, a start address ATSM-ACBU-ADMAP-SA of the ATS menu audio contents block unit address map, an ATS menu audio stream attribute ATSM-AST-ATR, the number ATS-AST-Ns of audio streams in the audio title set, and an ATS audio stream attribute table ATS-AST-ATRT.

Figure 10:
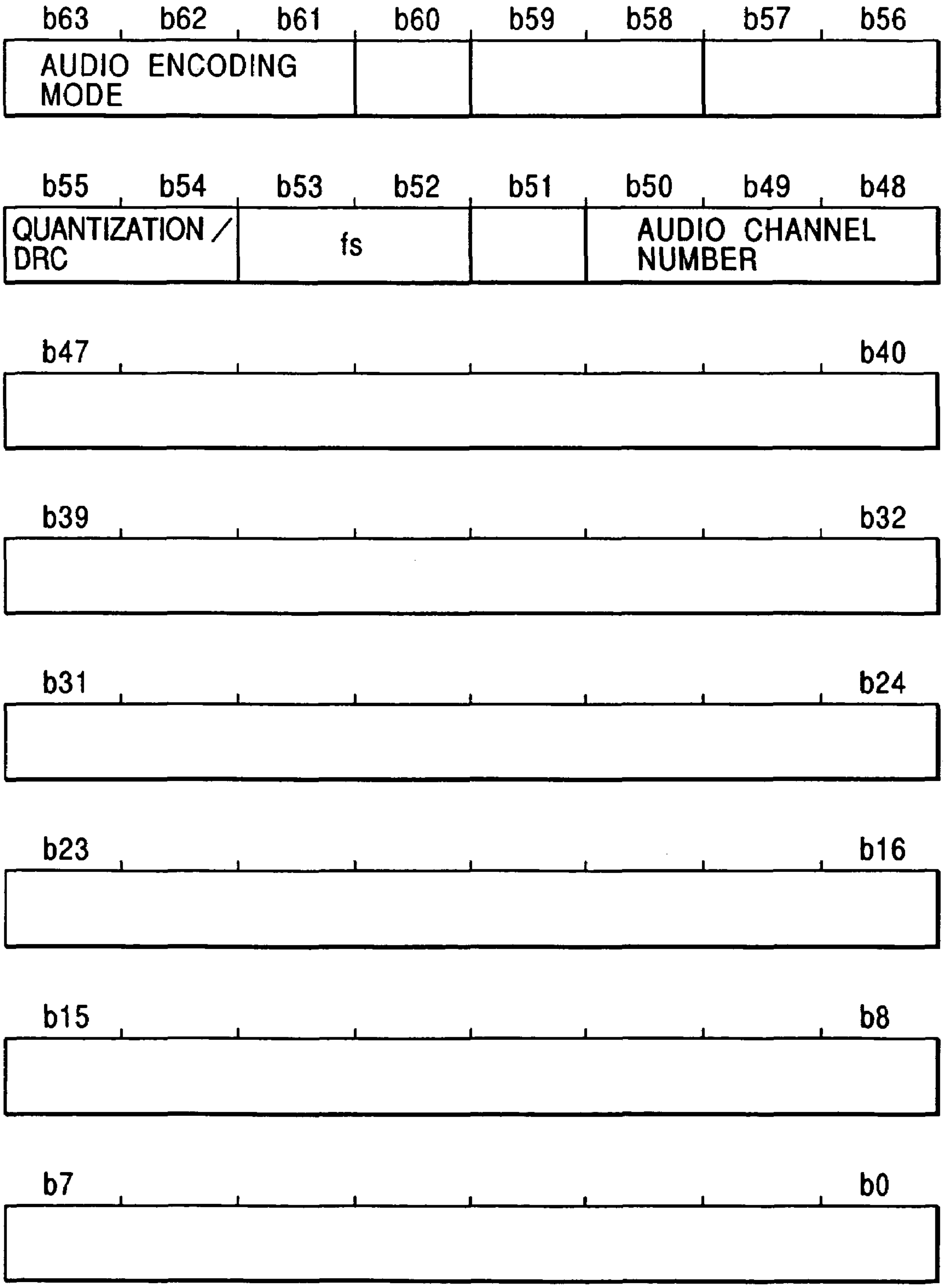
FIG. 10 is a diagram of the structure of an ATSM-AST-ATR area in FIG. 9.

As shown in FIG. 10, the ATS menu audio stream attribute ATSM-AST-ATR (see FIG. 9) has a sequence of 8 bytes, that is, 64 bits b63, b62, b61, . . . , b1, b0. A set of the bits b63, b62, and b61 represents an audio encoding mode selected from among a Dolby AC-3 encoding mode, an encoding mode corresponding to MPEG-1 or MPEG-2 without any extension bit stream, an encoding mode corresponding to MPEG-2 with an extension bit stream, a first linear PCM audio encoding mode, and a second linear PCM audio encoding mode. The second linear PCM audio encoding mode is of a type containing a sub type corresponding to 2 channels plus 5 channels, a sub type corresponding to 2 channels plus 6 channels, and a sub type corresponding to 2 channels plus 8 channels. Specifically, a bit sequence of "000" is assigned to the Dolby AC-3 encoding mode. A bit sequence of "010" is assigned to the encoding mode corresponding to MPEG-1 or MPEG-2 without any extension bit stream. A bit sequence of "011" is assigned to the encoding mode corresponding to MPEG-2 with an extension bit stream. A bit sequence of "100" is assigned to the first linear PCM audio encoding mode. A bit sequence of "101" is assigned to the second linear PCM audio encoding mode.

A set of the bits b55 and b54 in the ATS menu audio stream attribute ATSM-AST-ATR represents information of quantization/dynamic range control (DRC). When the audio encoding mode is "000", the information of quantization/DRC is set to "11". When the audio encoding mode is "010" or "011", a bit sequence of "00" which relates to the information of quantization/DRC represents the absence of dynamic control data from the MPEG audio stream. When the audio encoding mode is "010" or "011", a bit sequence of "01" which relates to the information of quantization/DRC represents the presence of dynamic control data in the MPEG audio stream. When the audio encoding mode is "100" or "101", a bit sequence of "00" which relates to the information of quantization/DRC represents that each of channels (two stereophonic channels) has 16 bits for every signal sample. When the audio encoding mode is "100" or "101", a bit sequence of "01" which relates to the information of quantization/DRC represents that each of channels (two stereophonic channels) has 20 bits for every signal sample. When the audio encoding mode is "100" or "101", a bit sequence of "10" which relates to the information of quantization/DRC represents that each of channels (two stereophonic channels) has 24 bits for every signal sample.

A set of the bits b53 and b52 in the ATS menu audio stream attribute ATSM-AST-ATR represents a sampling frequency "fs" related to each of two stereophonic channels. Specifically, a bit sequence of "00" indicates that the sampling frequency "fs" is equal to 48 kHz. A bit sequence of "01" indicates that the sampling frequency "fs" is equal to 96 kHz. A bit sequence of "10" indicates that the sampling frequency "fs" is equal to 192 kHz.

A set of the bits b50, b49, and b48 in the ATS menu audio stream attribute ATSM-AST-ATR represents the number of audio channels. Specifically, a bit sequence of "000" indicates that there is only one channel ("monaural"). A bit sequence of "001" indicates that there are two stereophonic channels. A bit sequence of "010" indicates that there are three channels. A bit sequence of "011" indicates that there are four channels. A bit sequence of "100" indicates that there are two stereophonic channels plus five channels. A bit sequence of "101" indicates that there are two stereophonic channels plus six channels. A bit sequence of "110" indicates that there are seven channels. A bit sequence of "111" indicates that there are two stereophonic channels plus eight channels.

As shown in FIG. 11, the ATS audio stream attribute table ATS-AST-ATRT (see FIG. 9) has attributes ATS-AST-ATR of respective ATS audio streams ATS-AST#0, ATS-AST#1, . . . , ATS-AST#7. Each of the ATS audio stream attributes ATS-AST-ATR has 8 bytes. Accordingly, the total number of bytes representing the ATS audio stream attribute table ATS-AST-ATRT is equal to 64.

Figure 12:
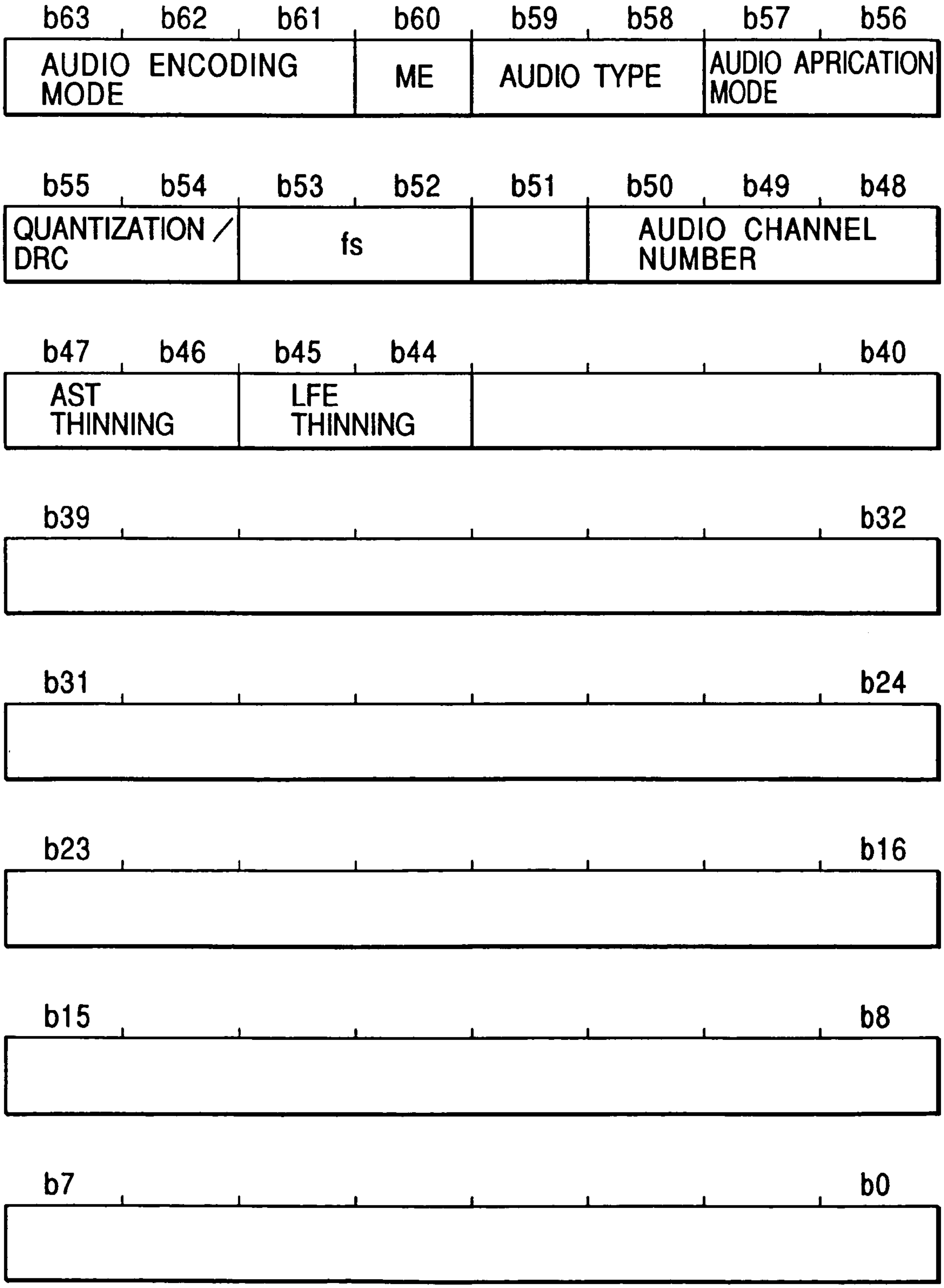
FIG. 12 is a diagram of the structure of an ATS-AST-ATR area in FIG. 11.

As shown in FIG. 12, each ATS audio stream attribute ATS-AST-ATR (see FIG. 11) has a sequence of 8 bytes, that is, 64 bits b63, b62, b61, . . . , b1, b0. A set of the bits b63, b62, and b61 in the ATS audio stream attribute ATS-AST-ATR represents an audio encoding mode as in the ATS menu audio stream attribute ATSM-AST-ATR (see FIG. 10). A set of the bits b55 and b54 in the ATS audio stream attribute ATS-AST-ATR represents information of quantization/dynamic range control (DRC) as in the ATS menu audio stream attribute ATSM-AST-ATR (see FIG. 10). A set of the bits b53 and b52 in the ATS audio stream attribute ATS-AST-ATR represents a sampling frequency "fs" as in the ATS menu audio stream attribute ATSM-AST-ATR (see FIG. 10). A set of the bits b50, b49, and b48 in the ATS audio stream attribute ATS-AST-ATR represents the number of audio channels as in the ATS menu audio stream attribute ATSM-AST-ATR (see FIG. 10).

The bit b60 in the ATS audio stream attribute ATS-AST-ATR represents information of multichannel extension ME. A set of the bits b59 and b58 in the ATS audio stream attribute ATS-AST-ATR represents an audio type.

A set of the bits b57 and b56 in the ATS audio stream attribute ATS-AST-ATR represents an audio application mode. Specifically, a bit sequence of "01" indicates a karaoke mode. A bit sequence of "10" indicates a surround mode. A bit sequence of "11" indicates a 2-channel plus surround mode. In this embodiment, the bits b57 and b56 are set to, for example, "11" indicating the 2-channel plus surround mode.

A set of the bits b47 and b46 in the ATS audio stream attribute ATS-AST-ATR represents information of thinning (decimating) the related audio stream AST. Specifically, a bit sequence of "00" indicates that thinning corresponds to "full" (1/1, absence of thinning or decimating). A bit sequence of "01" indicates that thinning or decimating corresponds to "half" (1/2). A bit sequence of "10" indicates that thinning or decimating corresponds to "quarter" (1/4).

A set of the bits b45 and b44 in the ATS audio stream attribute ATS-AST-ATR represents information of thinning (decimating) data in the related low frequency effect (LFE) channel. Specifically, a bit sequence of "00" indicates that thinning or decimating corresponds to "full" (1/1, absence of thinning or decimating). A bit sequence of "01" indicates that thinning or decimating corresponds to "half" (1/2). A bit sequence of "10" indicates that thinning or decimating corresponds to "quarter" (1/4).

For the audio stream AST#0, the bits b50, b49, and b48 in the ATS menu audio stream attribute ATSM-AST-ATR (see FIG. 10) are fixed to "001" indicating that there are two stereophonic channels. For the audio stream AST#1, the bits b50, b49, and b48 in the ATS menu audio stream attribute ATSM-AST-ATR (see FIG. 10) are fixed to "010" indicating that there are three channels.

In the case where a recorded audio signal of one title has two stereophonic channels plus six channels, 2-channel stereophonic signals are assigned to the audio stream AST#0 and 3-channel front signals among 6-channel signals are assigned to the audio stream AST#1, and 2-channel rear signals and a 1-channel LFE signal are assigned to the audio stream AST#2. In this case, a signal of "3" indicating use of three audio streams (the audio stream AST#0, AST#1, and AST#2) is placed in the management table AMGI-MAT within the audio manager information AMGI of FIG. 5 and also the management table ATSI-MAT within the audio title set information ATSI of FIG. 8.

An explanation will be given of the case where an original analog audio signal has two stereophonic channels plus six channels, and the original analog audio signal is processed into a digital audio signal under conditions indicated below before the digital audio signal is recorded. The 2-channel analog stereophonic signals are sampled at a frequency "fs" of 48 kHz, and are quantized with a quantization bit number of 20. The 3-channel analog front signals are sampled at a frequency "fs" of 96 kHz, and are quantized with a quantization bit number of 16. The 2-channel analog rear signals and the 1-channel analog LFE signal are sampled at a frequency "fs" of 48 kHz, and are quantized with a quantization bit number of 16. The resultant 8-channel digital signals are unthinned or undecimated. In this case, information pieces of attributes of stereophonic two channels are set in the ATS menu audio stream attribute ATSM-AST-ATR of FIG. 10 as follows. The bits b63, b62, and b61 in the ATS menu audio stream attribute ATSM-AST-ATR are set to "101" representing the second linear PCM audio encoding mode which is of the type containing the sub type corresponding to 2 channels plus 5 channels, the sub type corresponding to 2 channels plus 6 channels, and the sub type corresponding to 2 channels plus 8 channels. The bits b55 and b54 in the ATS menu audio stream attribute ATSM-AST-ATR are set to "01" representing that each of two stereophonic channels has 20 bits for every signal sample. The bits b53 and b52 in the ATS menu audio stream attribute ATSM-AST-ATR are set to "00" indicating that the sampling frequency "fs" is equal to 48 kHz. The bits b50, b49, and b48 in the ATS menu audio stream attribute ATSM-AST-ATR are set to "101" indicating that there are two stereophonic channels plus six channels.

In the above-mentioned case, information pieces of attributes are set in the ATS audio stream attribute ATS-AST-ATR of FIG. 12 for the audio stream AST#0 as follows. The bits b63, b62, and b61 in the ATS audio stream attribute ATS-AST-ATR are set to "101" representing the second linear PCM audio encoding mode which is of the type containing the sub type corresponding to 2 channels plus 5 channels, the sub type corresponding to 2 channels plus 6 channels, and the sub type corresponding to 2 channels plus 8 channels. The bits b55 and b54 in the ATS audio stream attribute ATS-AST-ATR are set to "01" representing that each of two stereophonic channels has 20 bits for every signal sample. The bits b53 and b52 in the ATS audio stream attribute ATS-AST-ATR are set to "00" indicating that the sampling frequency "fs" is equal to 48 kHz. The bits b50, b49, and b48 in the ATS audio stream attribute ATS-AST-ATR are set to "001" indicating that there are two stereophonic channels. The bits b57 and b56 in the ATS audio stream attribute ATS-AST-ATR are set to "11" indicating the 2-channel plus surround mode. As information of thinning or decimating the related audio stream AST#0, the bits b47 and b46 in the ATS audio stream attribute ATS-AST-ATR are set to "00" indicating that thinning or decimating corresponds to "full" (1/1, absence of thinning or decimating). As information of thinning or decimating data in the related LFE channel, the bits b45 and b44 in the ATS audio stream attribute ATS-AST-ATR are set to "00" indicating that thinning or decimating corresponds to "full" (1/1, absence of thinning or decimating).

In the above-mentioned case, information pieces of attributes are set in the ATS audio stream attribute ATS-AST-ATR of FIG. 12 for the audio stream AST#1 as follows. The bits b63, b62, and b61 in the ATS audio stream attribute ATS-AST-ATR are set to "101" representing the second linear PCM audio encoding mode which is of the type containing the sub type corresponding to 2 channels plus 5 channels, the sub type corresponding to 2 channels plus 6 channels, and the sub type corresponding to 2 channels plus 8 channels. The bits b55 and b54 in the ATS audio stream attribute ATS-AST-ATR are set to "00" representing that each channel has 16 bits for every signal sample. The bits b53 and b52 in the ATS audio stream attribute ATS-AST-ATR are set to "01" indicating that the sampling frequency "fs" is equal to 96 kHz. The bits b50, b49, and b48 in the ATS audio stream attribute ATS-AST-ATR are set to "010" indicating that there are three channels. The bits b57 and b56 in the ATS audio stream attribute ATS-AST-ATR are set to "11" indicating the 2-channel plus surround mode. As information of thinning or decimating the related audio stream AST#1, the bits b47 and b46 in the ATS audio stream attribute ATS-AST-ATR are set to "00" indicating that thinning or decimating corresponds to "full" (1/1, absence of thinning or decimating). As information of thinning or decimating data in the related LFE channel, the bits b45 and b44 in the ATS audio stream attribute ATS-AST-ATR are set to "00" indicating that thinning or decimating corresponds to "full" (1/1, absence of thinning or decimating).

In the above-mentioned case, information pieces of attributes are set in the ATS audio stream attribute ATS-AST-ATR of FIG. 12 for the audio stream AST#2 as follows. The bits b63, b62, and b61 in the ATS audio stream attribute ATS-AST-ATR are set to "101" representing the second linear PCM audio encoding mode which is of the type containing the sub type corresponding to 2 channels plus 5 channels, the sub type corresponding to 2 channels plus 6 channels, and the sub type corresponding to 2 channels plus 8 channels. The bits b55 and b54 in the ATS audio stream attribute ATS-AST-ATR are set to "00" representing that each channel has 16 bits for every signal sample. The bits b53 and b52 in the ATS audio stream attribute ATS-AST-ATR are set to "00" indicating that the sampling frequency "fs" is equal to 48 kHz. The bits b50, b49, and b48 in the ATS audio stream attribute ATS-AST-ATR are set to "010" indicating that there are three channels. The bits b57 and b56 in the ATS audio stream attribute ATS-AST-ATR are set to "11" indicating the 2-channel plus surround mode. As information of thinning or decimating the related audio stream AST#2, the bits b47 and b46 in the ATS audio stream attribute ATS-AST-ATR are set to "00" indicating that thinning or decimating corresponds to "full" (1/1, absence of thinning or decimating). As information of thinning or decimating data in the related LFE channel, the bits b45 and b44 in the ATS audio stream attribute ATS-AST-ATR are set to "00" indicating that thinning or decimating corresponds to "full" (1/1, absence of thinning or decimating).

Figure 13:
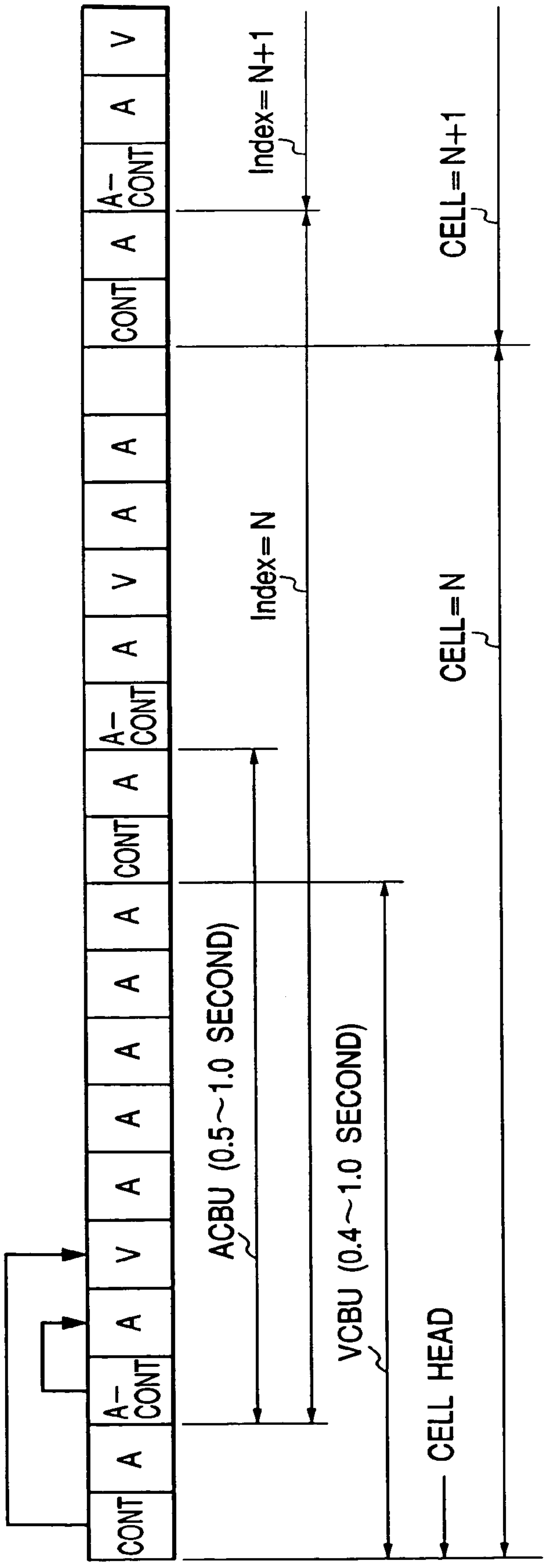
FIG. 13 is a diagram of a sequence of packs.

With reference to FIG. 13, there is a sequence of packs containing control packs CONT, audio packs A, audio control packs A-CONT, and video packs V. Audio streams are recorded in the audio packs A. Each VCB unit VCBU has a set of successive packs which corresponds to a time length of 0.4 second to 1.0 second. The total number of packs in one VCB unit VCBU is arbitrary. The first pack in each VCB unit VCBU is a control pack CONT. On the other hand, each ACB unit ACBU has a set of successive packs which corresponds to a time length of 0.5 second to 1.0 second. The total number of packs in one ACB unit ACBU is arbitrary. The first pack in each ACB unit ACBU is an audio control pack A-CONT. An audio control pack A-CONT in each ACB unit ACBU in a DVD-Audio is located at a place corresponding to a third pack in a VCB unit VCBU in a DVD-Video.

Basically, audio control packs A-CONT are spaced at intervals corresponding to 0.5 second. In the boundary between indexes (cells), audio control packs A-CONT are spaced at intervals corresponding to a time of 0.5 second to 1.0 second.

Time (GOF, group of audio frames) related to audio is represented by each audio control pack A-CONT, and a related data position is decided by an audio frame number, a first access unit pointer, and the number of frame headers. Audio packs A immediately before audio control packs A-CONT may be padded to provide 0.5-second intervals between the audio control packs A-CONT.

Audio signal segments stored in respective neighboring audio packs A have a predetermined relation with each other. In the case where a recorded audio signal is of the stereophonic type, neighboring audio packs A store a left-channel signal segment and a right-channel signal segment, respectively. In the case where a recorded audio signal is of the multiple-channel type (the 5-channel type, the 6-channel type, or the 8-channel type), neighboring audio packs A store different channel signal segments, respectively.

Each video pack V stores information of a picture which relates to audio signal segments in audio packs A near the video pack V.

Figure 14:
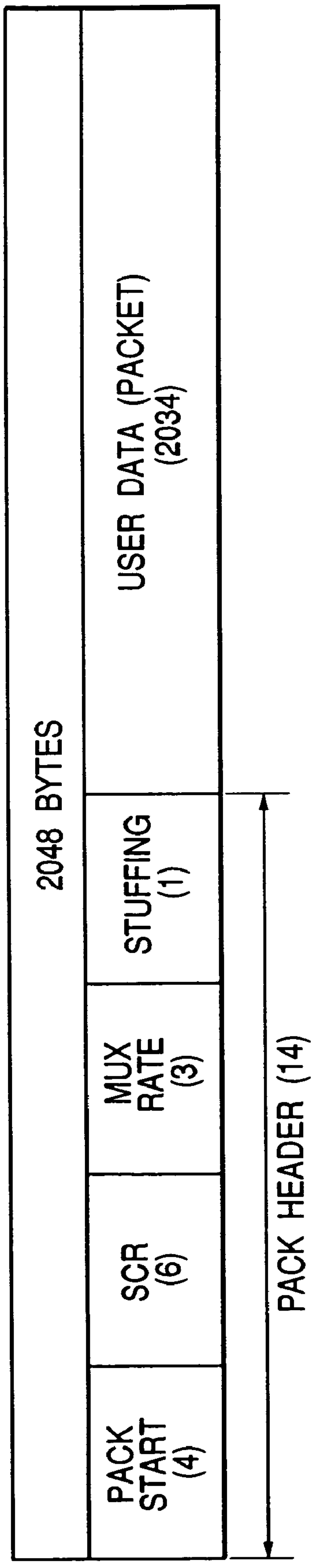
FIG. 14 is a diagram of the structure of an audio pack A or a video pack V.

As shown in FIG. 14, each of audio packs A and video packs V has a sequence of 4-byte pack start information, 6-byte SCR (system clock reference) information, 3-byte mux rate information, 1-byte stuffing data, and 2,034-byte packet-form user data. Thus, each of audio packs A and video packs V has 2,048 bytes. In each audio pack A or video pack V, pack start information, SCR information, mux rate information, and stuffing data compose a 14-byte pack header. SCR information in each audio pack A or video pack V serves as a time stamp.

A time stamp in a first audio pack A among audio packs related to one title is set to "1". Time stamps in second and later audio packs related to the same title are set to serial numbers "2", "3", "4", . . . , respectively. The serially-numbered time stamps enable management of times of audio packs A related to the same title.

Figure 15:
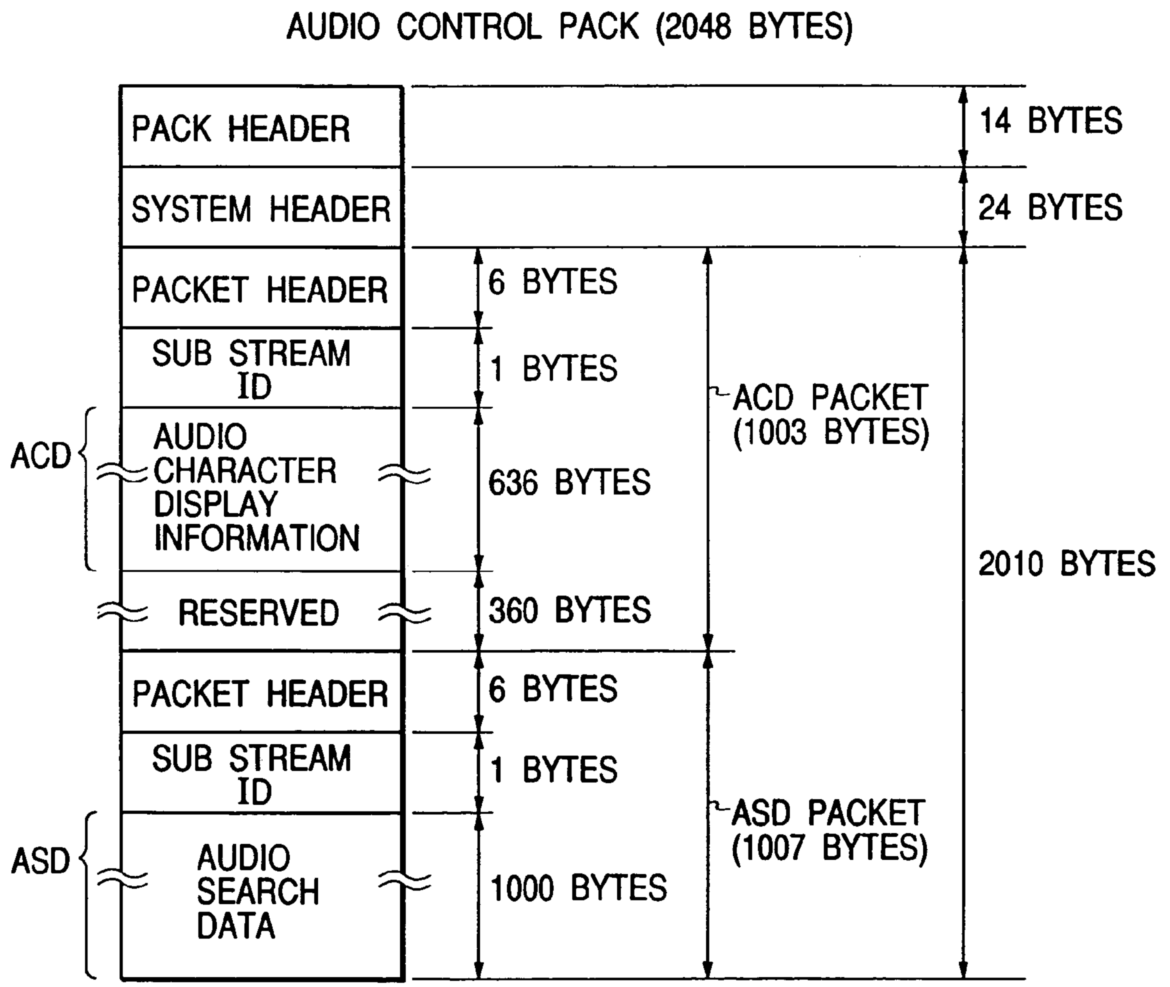
FIG. 15 is a diagram of the structure of an audio control pack A-CONT.

As shown in FIG. 15, each audio control pack A-CONT has a sequence of a 14-byte pack header, a 24-byte system header, a 1003-byte audio character display (ACD) packet, and a 1007-byte audio search data (ASD) packet. The ACD packet has a sequence of a 6-byte packet header, a 1-byte area assigned to sub stream identification (ID) information, a 636-byte area assigned to audio character display (ACD) information, and a 360-byte reserved area. The ASD packet has a sequence of a 6-byte packet header, a 1-byte area assigned to sub stream identification (ID) information, and a 1000-byte area assigned to audio search data (ASD).

As shown in FIG. 16, the 636-byte ACD information area has a 48-byte area assigned to general information, a 294-byte area for a first language, and a 294-byte area for a second language. The 294-byte area for the first language is divided into a 93-byte name space area, a first 93-byte free space area, a second 93-byte free space area, and a 15-byte data pointer area. Similarly, the 294-byte area for the second language is divided into a 93-byte name space area, a first 93-byte free space area, a second 93-byte free space area, and a 15-byte data pointer area. In the case where the first language is Japanese, the 93-byte name space area for the first language stores data representing an English-added Japanese tune name as shown in FIG. 17. In the case where the second language is English, the 93-byte name space area for the second language stores data representing an English tune name. The first and second languages may be decided by the publisher of the present DVD-Audio.

The 48-byte general information area in the ACD information area of FIG. 16 has a 16-byte area assigned to service level information, a 12-byte area assigned to language code information, a 6-byte area assigned to character set code information, a 6-byte area assigned to display item information, a 2-byte area assigned to information of the difference from the previous ACD information, and a 6-byte reserved area. The 16-byte service level information represents a display size, a display type, a discrimination among audio, video, and sub picture SP, and a stream. Characters designated by the 48-byte general information are mandatory while bit maps designated thereby are optional. The 12-byte language code information has a first 2-byte information piece designating the first language, and a second 2-byte information piece designating the second language. Eight or less languages can be designated in one file. Regarding the first and second languages, the English language is mandatory.

The 6-byte character set code information represents 15 or less character code words corresponding to language code words. The 6-byte character set code information has a 1-byte information piece representing whether the first and second languages are present or absent, and also representing the types of the first and second languages. For example, a first language code word corresponds to the "ISO646" standards and a second language code word corresponds to the "ISO8859-1" standards while a third language code word corresponds to the "MS-JIS" standards.

The 6-byte display item information represents whether the free spaces (see FIG. 16) for the first and second languages and the data pointers (see FIG. 16) for the first and second languages are present or absent. The 6-byte display item information contains related ID (identification) information. It should be noted that the name spaces (see FIG. 16) for the first and second languages are mandatory. An information piece of a title name, an information piece of a music name, and an information piece of an artist name are stored in the name space areas for the first and second languages.

Figure 18:
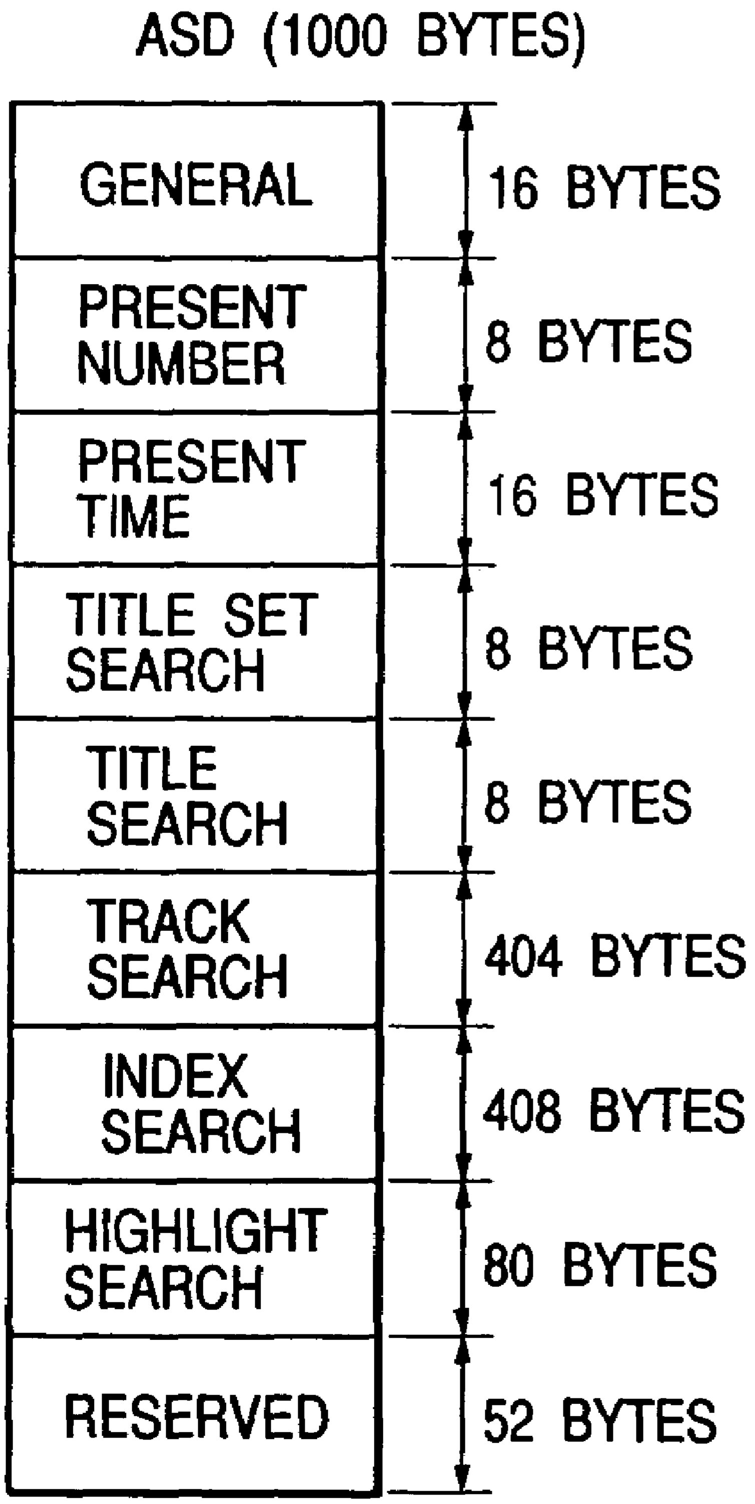
FIG. 18 is a diagram of the structure of an ASD area in FIG. 15.

As shown in FIG. 18, the 1000-byte audio search data (ASD) area (see FIG. 15) is divided into a 16-byte area assigned to general information, an 8-byte area assigned to information of the present number, a 16-byte area assigned to information of the present time, an 8-byte area assigned to title set search information, an 8-byte area assigned to title search information, a 404-byte area assigned to track search information, a 408-byte area assigned to index search information, an 80-byte area assigned to highlight search information, and a 52-byte reserved area.

The 8-byte present number information area in FIG. 18 is divided into a 2-byte area assigned to BCD information of the present title number of the related title set, a 2-byte area assigned to BCD information of the present track number of the related title set, a 2-byte area assigned to BCD information of the present index number of the related track, and a 2-byte reserved area.

The 16-byte present time information area in FIG. 18 is divided into a 4-byte area assigned to BCD information of a playback time of the related track, a 4-byte area assigned to BCD information of a remaining playback time of the related track, a 4-byte area assigned to BCD information of an absolute time of the related title, and a 4-byte area assigned to BCD information of a remaining absolute time of the related title.

The 8-byte title set search information area in FIG. 18 is divided into a 4-byte area assigned to information of an order number of a first sector regarding the related title set, and a 4-byte area assigned to information of an order number of a final sector regarding the related title set.

The 8-byte title search information area in FIG. 18 is divided into a 4-byte area assigned to information of an order number of a first sector in the related title, and a 4-byte area assigned to information of an order number of a final sector in the related title.

The 404-byte track search information area in FIG. 18 is divided into a 4-by-99-byte area assigned to information of order numbers of sectors and order numbers of tracks in the related title, a 4-byte area assigned to information of an order number of a first track in the related title, and a 4-byte area assigned to information of an order number of a final track in the related title.

The 408-byte index search information area in FIG. 18 is divided into a 4-by-100-byte area assigned to information of order numbers of sectors and order numbers of indexes in the related track, a 4-byte area assigned to information of an order number of a first index in the related track, and a 4-byte area assigned to information of an order number of a final index in the related track.

The 80-byte highlight search information area in FIG. 18 is divided into a 4-by-10-byte area assigned to information of order numbers of in-sectors in the related track, and a 4-by-10-byte area assigned to information of order numbers of out-sectors in the related track.

With reference back to FIGS. 2 and 13, in the DVD-Audio, an audio control pack A-CONT precedes a plurality of audio packs A. The audio control pack A-CONT stores information for managing audio signal segments stored in the following audio packs A. The managing information may be similar to TOC information in a CD. In the DVD-Audio, audio data can be independent of video data. The DVD-Audio has a greater audio recording capacity than that of the DVD-Video. Audio control packs A-CONT in the DVD-Audio enable management of audio-related time. Character information representing, for example, a tune name, can be read out from an audio control pack A-CONT.

In the DVD-Audio, each audio control pack A-CONT stores managing information (TOC information) representing a title, a start address, and a play time. During playback of the audio signal from the DVD-Audio, information requested by the user can be read out from audio control packs A-CONT and be indicated on a display of a DVD-Audio player. The user can decide a desired position of restart of playback by referring to the indicated information. Playback can be restarted from the desired position in response to user's request.

In the DVD-Audio, audio manager information AMGI and audio title set information ATSI have TOC information. Before playback of the audio signal from the DVD-Audio, the TOC information can be read out from the DVD-Audio and be stored into a memory within a DVD-Audio player. TOC information requested by the user can be read out from the memory and be indicated on a display of the DVD-Audio player. The user can decide a desired position of start of playback by referring to the indicated TOC information. Playback can be started from the desired position in response to user's request.

Regarding the DVD-Audio, it is possible to implement a search for and a random access to a title, a tune, and an index. In addition, it is possible to implement a random access, a time search, and a tune-head search in unit of GOF (group of audio frames). Furthermore, it is possible to manage title-related time, tune-related time, and index-related time on a real-time basis.

Video packs V in the DVD-Audio make it possible to manage and indicate the present time and the remaining play time of a tune or a title.

Concerning video data (video information) in the DVD-Audio, it is possible to implement a search for and a random access to a title, a part-of-title PTT, and a cell. In addition, it is possible to implement a random access, a time search, and a video-head search in unit of video frame. Furthermore, it is possible to manage title-related time, PTT-related time, and cell-related time on a real-time basis. Also, it possible to manage and indicate the present time and the remaining play time of a part-of-title PTT or a title.

Figure 19:
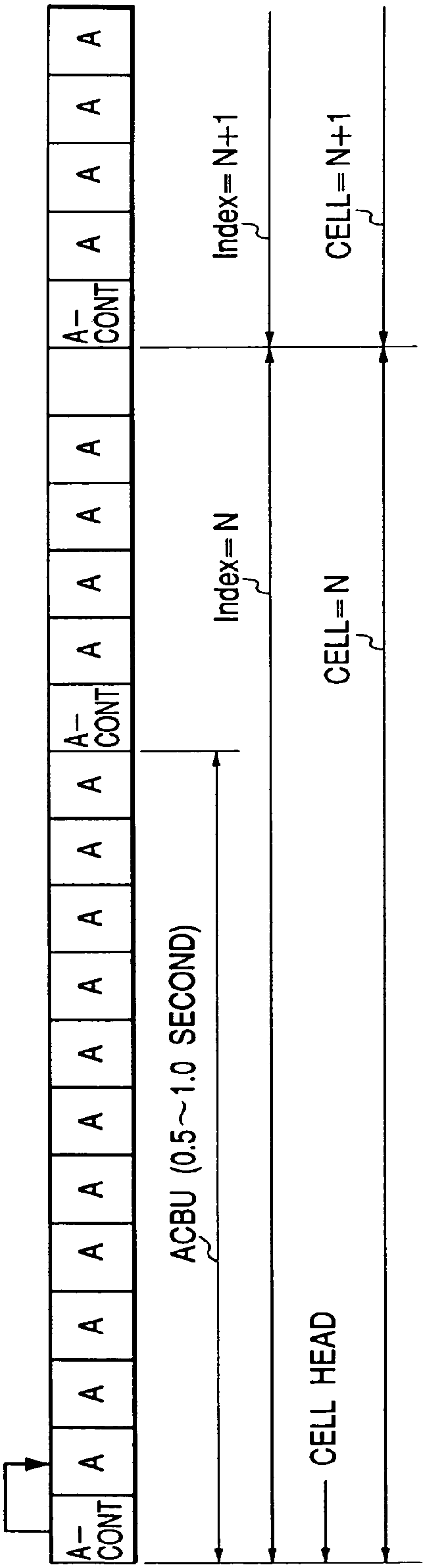
FIG. 19 is a diagram of a sequence of packs.

It should be noted that the pack sequence of FIG. 13 may be replaced by a pack sequence of FIG. 19 from which video packs V and control packs CONT are omitted.

Second Embodiment

A DVD-Audio in a second embodiment of this invention is similar to a DVD-Audio in the embodiment of FIGS. 2-19 except for the following design change. The DVD-Audio in the second embodiment of this invention is loaded with audio manager information AMGI which contains TOC (table of contents) information as shown in FIG. 20.

FIG. 21 shows an example of the details of the TOC information. In the TOC information, a point of "00" to a point of "99" are assigned to different tunes (or different movements) respectively. For each point, that is, for each movement, the absolute time of its head is denoted by "minute" PMIN, "second" PSEC, and "frame" PFRAME. A point of "A0" corresponds to the first movement. At the point of "A0", "second" PSEC and "frame" PFRAME are "0". A point of "A1" corresponds to the last movement. At the point of "A1", "second" PSEC and "frame" PFRAME are "0". A point of "A2" corresponds to the absolute time of a starting end of a lead-out area which is denoted by "minute" PMIN, "second" PSEC, and "frame" PFRAME. The TOC information in FIG. 21 indicates that six tunes identified by a point of "01" to a point of "06" are recorded on the DVD-Audio.

Third Embodiment

A DVD-Audio in a third embodiment of this invention is similar to a DVD-Audio in the embodiment of FIGS. 2-19 except for the following design change. The DVD-Audio in the third embodiment of this invention is loaded with audio title set information ATSI which contains TOC (table of contents) information as shown in FIG. 22.

Fourth Embodiment

A DVD-Audio in a fourth embodiment of this invention is similar to a DVD-Audio in the embodiment of FIGS. 2-19 except for the following design change. The DVD-Audio in the fourth embodiment of this invention stores audio control packs A-CONT in which TOC (table of contents) information is recorded on a 360-byte reserved area in each ACD packet.

Fifth Embodiment

Figure 23:
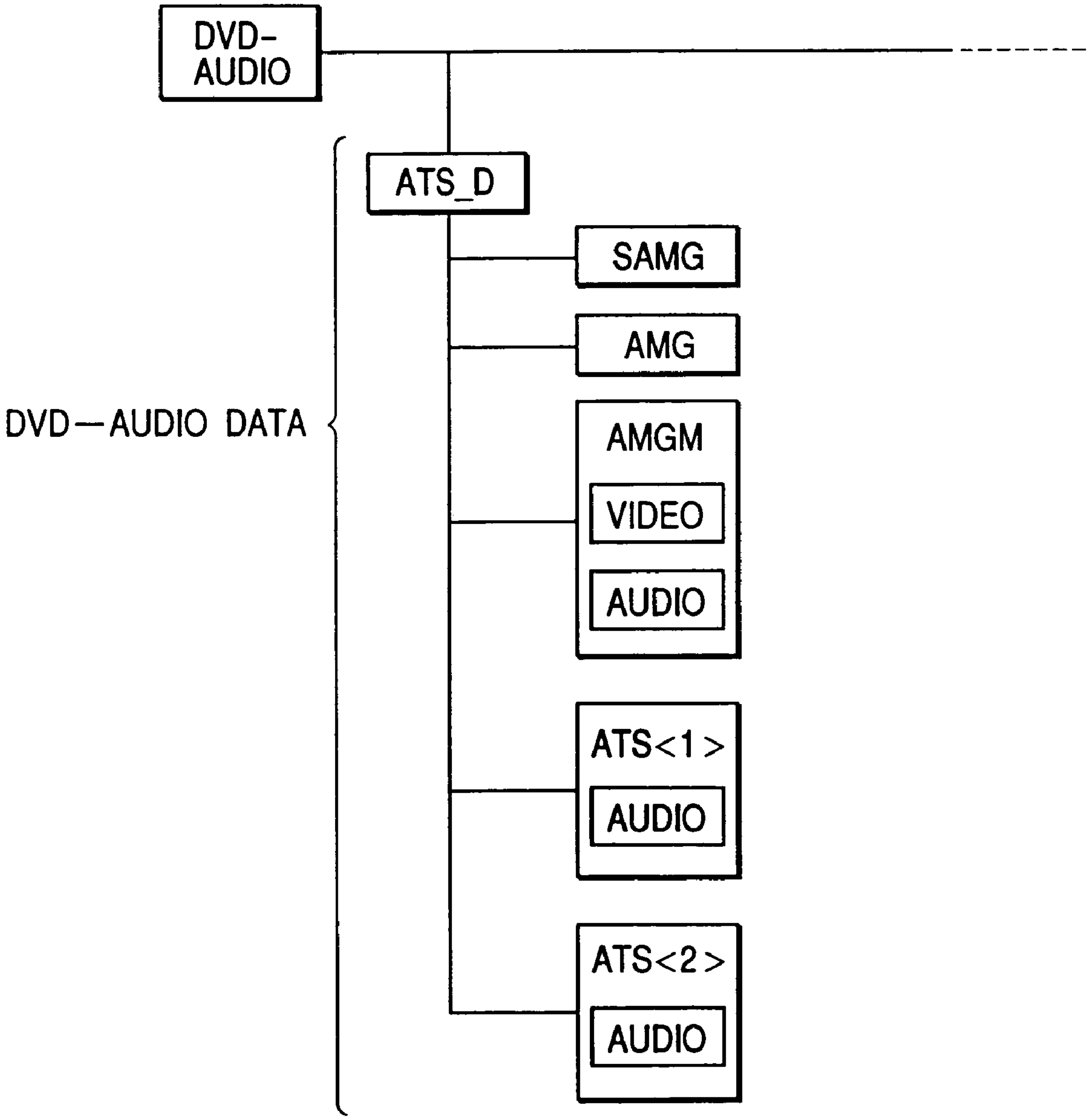
FIG. 23 is a diagram of the signal recording format of a DVD-Audio according to a fifth embodiment of this invention.

FIG. 23 shows the signal recording format of a DVD-Audio (digital video disc-audio) according to a fifth embodiment of this invention. The DVD-Audio in FIG. 23 has an area assigned to an audio title set directory ATS_D including a number of audio title sets ATS. The DVD-Audio in FIG. 23 does not have any area assigned to a video title set VTS.

The ATS_D area has an area assigned to a structure of simple audio manager which is denoted by SAMG, an area assigned to an audio manager AMG, an area assigned to an audio manager menu AMGM, an area assigned to a first audio title set ATS<1>, and an area assigned to a second audio title set ATS<2>. The audio manager AMG contains audio manager information AMGI for managing the audio title sets ATS<1> and ATS<2>. The audio manager AMG has a structure similar to that in FIG. 3.

The audio title sets ATS<1> and ATS<2> are similar in structure. Thus, only the audio title set ATS<1> will be explained hereinafter.

Figure 24:
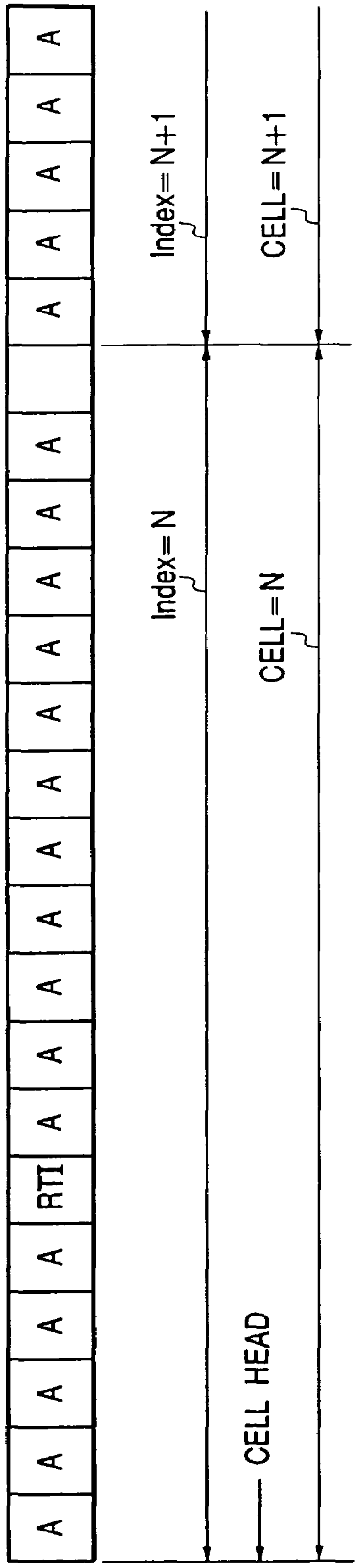
FIG. 24 is a diagram of a sequence of packs.

As shown in FIG. 24, the audio title set ATS<1> has a sequence of packs including audio packs A and real-time information packs RTI. The pack sequence in the audio title set ATS<1> does not have any audio control pack A-CONT. There is about one real-time information pack RTI during every interval corresponding to 0.5 second. Still-picture packs SPCT may be located at given positions in the pack sequence. The still-picture packs SPCT are, for example, video packs V of a given type. As will be indicated later regarding an embodiment of FIG. 32, the still-picture packs SPCT may be located in a still picture set SPS. Each of the still-picture packs SPCT has a sequence of a pack header, a packet header, and data representative of a still picture. For example, the real-time information packs RTI correspond to ACD packets in audio control packs A-CONT, respectively. Each of the real-time information packs RTI has a sequence of a pack header, a packet header, sub stream identification information, ISRC information, private header length information, identification information for real-time information, stuffing bytes, and data representative of real time (audio character display data).

With reference back to FIG. 23, a SAPP table containing TOC information is repetitively recorded on the structure-of-simple audio manager SAMG eight times to enable a search for the heads of the audio title sets ATS<1> and ATS<2>. The structure-of-simple audio manager SAMG is defined as an independent file.

Figure 25:
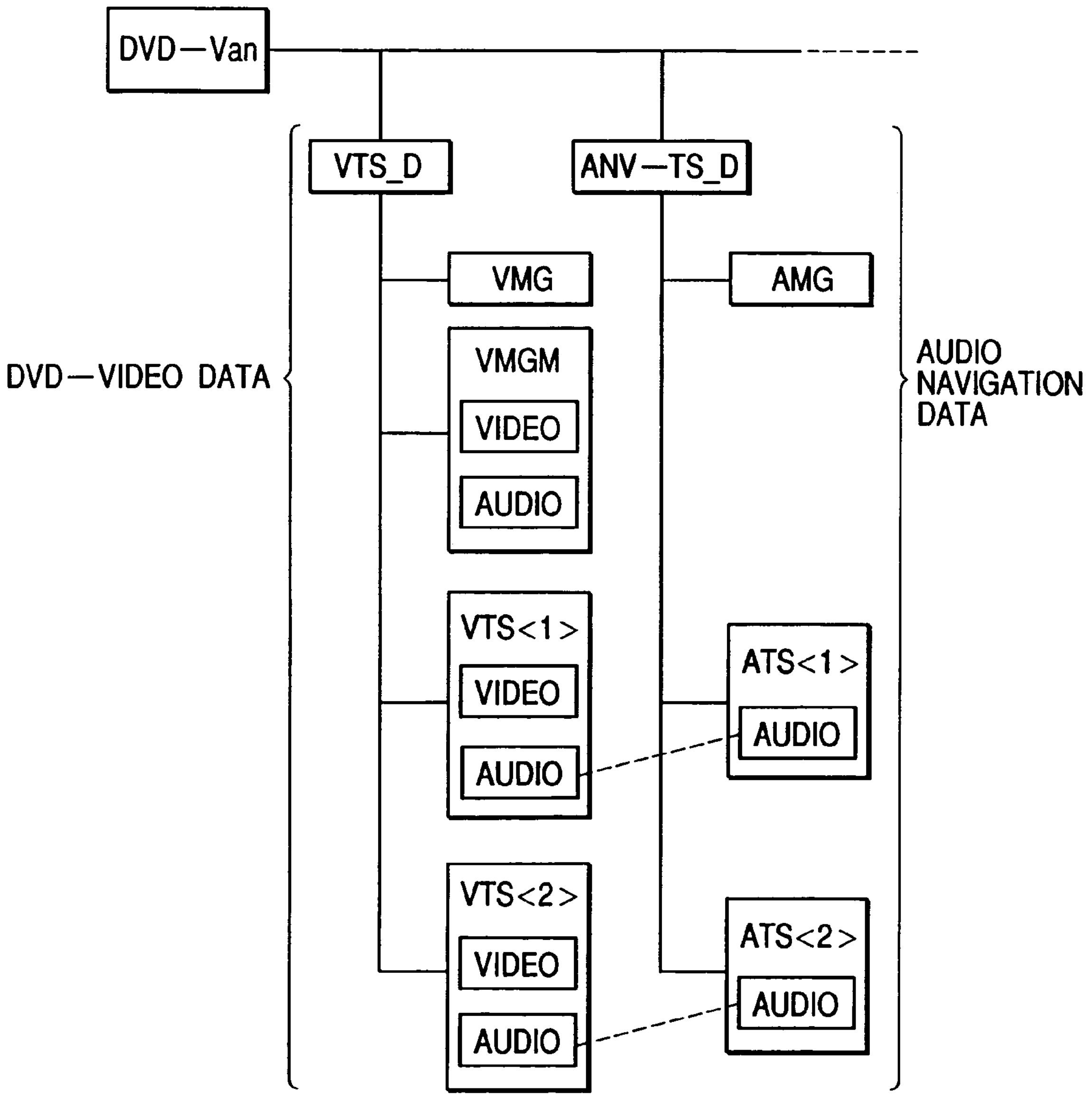
FIG. 25 is a diagram of the signal recording format of a DVD-Van.

FIG. 25 shows the signal recording format of a DVD-Van (digital video disc-video plus audio navigation). The DVD-Van in FIG. 25 has an area assigned to a video title set directory VTS_D including a number of video title sets VTS, and an area assigned to an audio navigation title set directory ANV-TS_D. The video title set VTS corresponds to DVD video data while the audio navigation title set ANV-TS corresponds to audio navigation data. The video title set VTS has a structure similar to that in FIG. 1.

The VTS_D area in FIG. 25 has an area assigned to a video manager VMG, an area assigned to a video manager menu VMGM, an area assigned to a first video title set VTS<1>, and an area assigned to a second video title set VTS<2>. The video manager VMG contains video manager information VMGI for managing the video title sets VTS<1> and VTS<2>. Each of the video title sets VTS<1> and VTS<2> has a sequence of packs including video packs V and audio packs A.

The ANV-TS_D area in FIG. 25 has an area assigned to an audio manager AMG, an area assigned to a first audio title set ATS<1>, and an area assigned to a second audio title set ATS<2>. The audio manager AMG contains audio manager information AMGI for managing the audio title sets ATS<1> and ATS<2>. The audio manager AMG has a structure similar to that in FIG. 3. Each of the audio title sets ATS<1> and ATS<2> has a sequence of packs including audio packs A. The first audio title set ATS<1> forms a pair with the first video title set VTS<1>. The second audio title set ATS<2> forms a pair with the second video title set VTS<2>.

Figure 26:
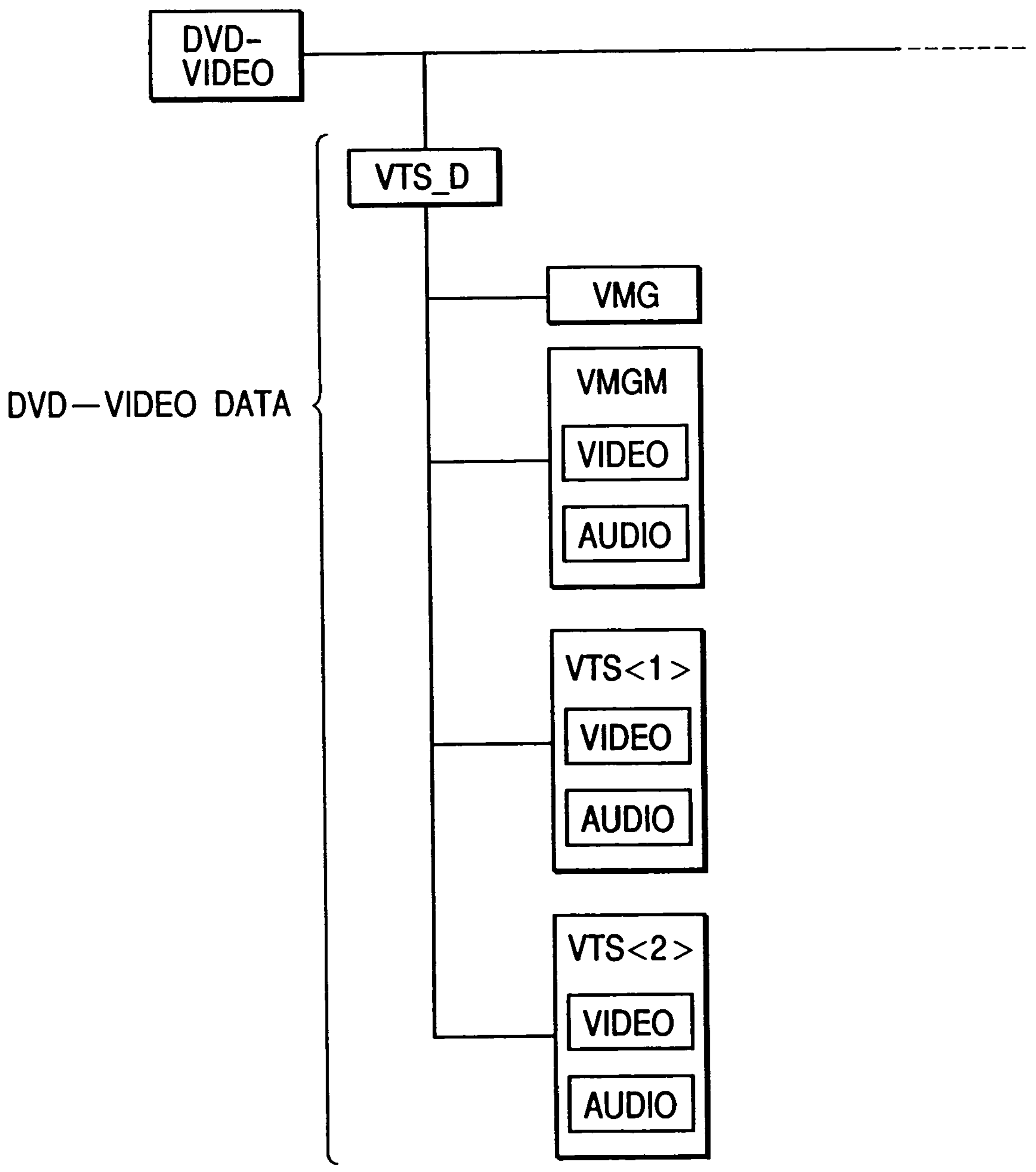
FIG. 26 is a diagram of the signal recording format of a DVD-Video.

FIG. 26 shows the signal recording format of a DVD-Video (digital video disc-video). The DVD-Video in FIG. 26 has an area assigned to a video title set directory VTS_D. The video title set VTS corresponds to DVD video data. The video title set VTS has a structure similar to that in FIG. 1. The DVD-Video in FIG. 26 does not have any area assigned to an audio title set directory ATS_D. The DVD-Video in FIG. 26 does not have any area assigned to an audio navigation title set directory ANV-TS_D.

The VTS_D area in FIG. 26 has an area assigned to a video manager VMG, an area assigned to a video manager menu VMGM, an area assigned to a first video title set VTS<1>, and an area assigned to a second video title set VTS<2>. The video manager VMG contains video manager information VMGI for managing the video title sets VTS<1> and VTS<2>. Each of the video title sets VTS<1> and VTS<2> has a sequence of packs including video packs V and audio packs A.

Figure 27:
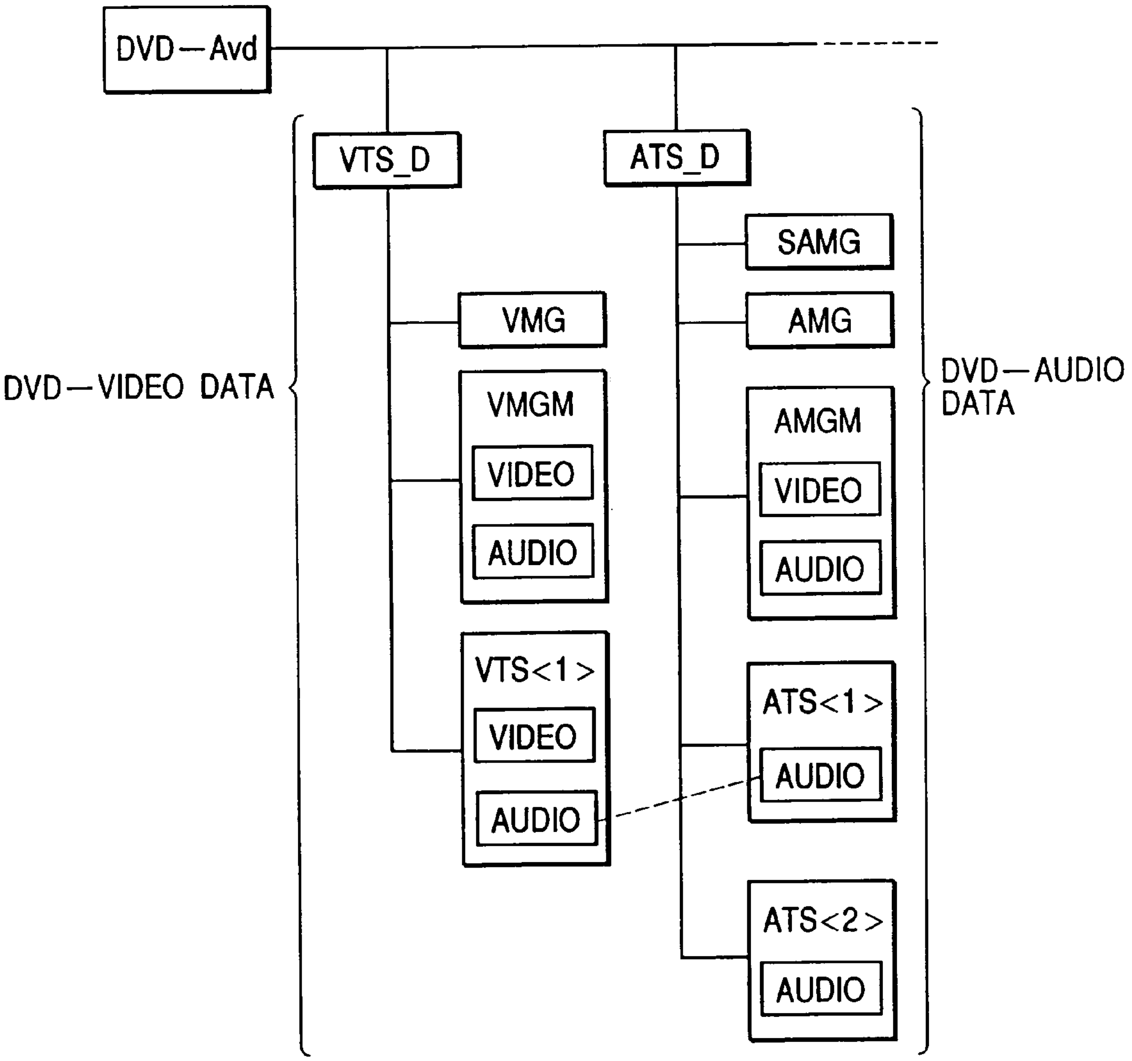
FIG. 27 is a diagram of the signal recording format of a DVD-Avd.

FIG. 27 shows the signal recording format of a DVD-Avd (digital video disc-audio plus AV data). The DVD-Avd in FIG. 27 has an area assigned to a video title set directory VTS_D, and an area assigned to an audio title set directory ATS_D. The video title set directory VTS_D corresponds to DVD video data while the audio title set directory ATS_D corresponds to DVD audio data.

The VTS_D area in FIG. 27 has an area assigned to a video manager VMG, an area assigned to a video manager menu VMGM, and an area assigned to a video title set VTS<1>. The video manager VMG contains video manager information VMGI for managing the video title set VTS<1>. The video manager VMG has a structure similar to that in FIG. 1. The video title set VTS<1> has a sequence of packs including video packs V and audio packs A.

The ATS_D area in FIG. 27 has an area assigned to a structure of simple audio manager which is denoted by SAMG, an area assigned to an audio manager AMG, an area assigned to an audio manager menu AMGM, an area assigned to a first audio title set ATS<1>, and an area assigned to a second audio title set ATS<2>. The audio manager AMG contains audio manager information AMGI for managing the audio title sets ATS<1> and ATS<2>. The audio manager AMG has a structure similar to that in FIG. 3. The first audio title set ATS<1> has a sequence of packs including audio packs A. The first audio title set ATS<1> forms a pair with the video title set VTS<1>. The second audio title set ATS<2> has a sequence of packs including audio packs A and real-time information packs RTI as shown in FIG. 24. The pack sequence in the second audio title set ATS<2> may include still-picture packs SPCT. The pack sequence in the second audio title set ATS<2> does not have any audio control pack A-CONT.

Each of the audio title sets ATS<1> and ATS<2> in the DVD-Audio of FIG. 23 contains audio title set information ATSI. The audio title set information ATSI contains a management table ATSI-MAT having an audio-only-title audio-object attribute AOTT-AOB-ATR.

As shown in FIG. 28, the audio-only-title audio-object attribute AOTT-AOB-ATR has a sequence of 8 bytes, that is, 64 bits b63, b62, b61, . . . , b1, b0. A set of the bits b63, b62, b61, and b60 represents an audio encoding mode. The bit b59 represents a down mix (D-M) mode. A set of the bits b58, b57, and b56 represents a multiple channel type. A set of the bits b55, b54, b53, and b52 represents a quantization bit number Q1 of a channel group "1". A set of the bits b51, b50, b49, and b48 represents a quantization bit number Q2 of a channel group "2". A set of the bits b47, b46, b45, and b44 represents a sampling frequency fs1 of the channel group "1". A set of the bits b43, b42, b41, and b40 represents a sampling frequency fs2 of the channel group "2". A set of the bits b36, b35, b34, b33, and b32 represents channel assignment. The other bits form reserved areas. The bits b31, b30, . . . , b1, b0 in the reserved area may be used for attribute data of the respective channels.

The audio encoding mode represented by the bits b63, b62, b61, and b60 in FIG. 28 can be selected from among a linear PCM audio encoding mode, a Dolby digital encoding mode, an MPEG-2 encoding mode without any extension, an MPEG-2 encoding mode with an extension, a DTS encoding mode, and an SDDS encoding mode. Specifically, a bit sequence of "0000" is assigned to the linear PCM audio encoding mode. A bit sequence of "0001" is assigned to the Dolby digital encoding mode. A bit sequence of "0010" is assigned to the MPEG-2 encoding mode without any extension. A bit sequence of "0011" is assigned to the MPEG-2 encoding mode with an extension. A bit sequence of "0100" is assigned to the DTS encoding mode. A bit sequence of "0101" is assigned to the SDDS encoding mode.

Normally, the bits b63, b62, b61, and b60 in FIG. 28 are set to "0000" representing the linear PCM audio encoding mode.

The down mix mode represented by the bit b59 in FIG. 28 can be changed between the allowance of down mix stereophonic output and the inhibition of down mix stereophonic output. Specifically, a bit of "0" is assigned to the allowance of down mix stereophonic output. A bit of "1" is assigned to the inhibition of down mix stereophonic output.

Normally, the bits b58, b57, and b56 in FIG. 28 are set to "000" representing that the multiple channel type agrees with a type "1".

The quantization bit number Q1 of the channel group "1" which is represented by the bits b55, b54, b53, and b52 in FIG. 28 can be changed among 16 bits, 20 bits, and 24 bits. Specifically, a bit sequence of "0000" is assigned to 16 bits. A bit sequence of "0001" is assigned to 20 bits. A bit sequence of "0010" is assigned to 24 bits.

The quantization bit number Q2 of the channel group "2" which is represented by the bits b51, b50, b49, and b48 in FIG. 28 can be changed among 16 bits, 20 bits, and 24 bits. Specifically, a bit sequence of "0000" is assigned to 16 bits. A bit sequence of "0001" is assigned to 20 bits. A bit sequence of "0010" is assigned to 24 bits.

The state of the set of the bits b51, b50, b49, and b48 has the following relation with the state of the set of the bits b55, b54, b53, and b52. When the set of the bits b55, b54, b53, and b52 is "0000", the set of the bits b51, b50, b49, and b48 is also "0000". In other words, when the quantization bit number Q1 for the channel group "1" is equal to 16 bits, the quantization bit number Q2 for the channel group "2" is also equal to 16 bits. When the set of the bits b55, b54, b53, and b52 is "0001", the set of the bits b51, b50, b49, and b48 is "0000" or "0001". In other words, when the quantization bit number Q1 for the channel group "1" is equal to 20 bits, the quantization bit number Q2 for the channel group "2" is equal to 16 bits or 20 bits. When the set of the bits b55, b54, b53, and b52 is "0010", the set of the bits b51, b50, b49, and b48 is "0000", "0001", or "0010". In other words, when the quantization bit number Q1 for the channel group "1" is equal to 24 bits, the quantization bit number Q2 for the channel group "2" is equal to 16 bits, 20 bits, or 24 bits.

The sampling frequency fs1 of the channel group "1" which is represented by the bits b47, b46, b45, and b44 can be changed among 48 kHz, 96 kHz, 192 kHz, 44.1 kHz, 88.2 kHz, and 176.4 kHz. Specifically, a bit sequence of "0000" is assigned to 48 kHz. A bit sequence of "0001" is assigned to 96 kHz. A bit sequence of "0010" is assigned to 192 kHz. A bit sequence of "1000" is assigned to 44.1 kHz. A bit sequence of "1001" is assigned to 88.2 kHz. A bit sequence of "1010" is assigned to 176.4 kHz.

The sampling frequency fs2 of the channel group "2" which is represented by the bits b43, b42, b41, and b40 can be changed among 48 kHz, 96 kHz, 192 kHz, 44.1 kHz, 88.2 kHz, and 176.4 kHz. Specifically, a bit sequence of "0000" is assigned to 48 kHz. A bit sequence of "0001" is assigned to 96 kHz. A bit sequence of "0010" is assigned to 192 kHz. A bit sequence of "1000" is assigned to 44.1 kHz. A bit sequence of "1001" is assigned to 88.2 kHz. A bit sequence of "1010" is assigned to 176.4 kHz.

The state of the set of the bits b43, b42, b41, and b40 has the following relation with the state of the set of the bits b47, b46, b45, and b44. When the set of the bits b47, b46, b45, and b44 is "0000", the set of the bits b43, b42, b41, and b40 is also "0000". In other words, when the sampling frequency "fs" of the channel group "1" is equal to 48 kHz, the sampling frequency "fs" of the channel group "2" is also equal to 48 kHz. When the set of the bits b47, b46, b45, and b44 is "0001", the set of the bits b43, b42, b41, and b40 is "0000" or "0001". In other words, when the sampling frequency "fs" of the channel group "1" is equal to 96 kHz, the sampling frequency "fs" of the channel group "2" is equal to 48 kHz or 96 kHz. When the set of the bits b47, b46, b45, and b44 is "0010", the set of the bits b43, b42, b41, and b40 is "0000", "0001", or "0010". In other words, when the sampling frequency "fs" of the channel group "1" is equal to 192 kHz, the sampling frequency "fs" of the channel group "2" is equal to 48 kHz, 96 kHz, or 192 kHz. When the set of the bits b47, b46, b45, and b44 is "1000", the set of the bits b43, b42, b41, and b40 is also "1000". In other words, when the sampling frequency "fs" of the channel group "1" is equal to 44.1 kHz, the sampling frequency "fs" of the channel group "2" is also equal to 44.1 kHz. When the set of the bits b47, b46, b45, and b44 is "1001", the set of the bits b43, b42, b41, and b40 is "1000" or "1001". In other words, when the sampling frequency "fs" of the channel group "1" is equal to 88.2 kHz, the sampling frequency "fs" of the channel group "2" is equal to 44.1 kHz or 88.2 kHz. When the set of the bits b47, b46, b45, and b44 is "1010", the set of the bits b43, b42, b41, and b40 is "1000", "1001", or "1010". In other words, when the sampling frequency "fs" of the channel group "1" is equal to 176.4 kHz, the sampling frequency "fs" of the channel group "2" is equal to 44.1 kHz, 88.2 kHz, or 176.4 kHz.

In general, the linear PCM audio encoding mode is used by the DVD-Audio in FIG. 23. According to the linear PCM audio encoding mode, each audio pack A has a private header. As shown in FIG. 29, the linear PCM audio pack private header includes an 8-bit area assigned to sub stream identification (ID) information, a 4-bit area assigned to an ISRC number, an 8-bit area assigned to ISRC data, an 8-bit area assigned to a private header length, a 16-bit area assigned to a first access unit pointer, a 1-bit area assigned to an audio emphasis flag F1, and a 1-bit area assigned to an audio emphasis flag F2.

When the sampling frequency "fs" is equal to 96 kHz or 88.2 kHz, the audio emphasis flag F1 is set to "0" representing an emphasis off state. When the sampling frequency "fs" is equal to other values, the audio emphasis flag F1 is set to "1" representing an emphasis on state.

When the sampling frequency "fs" is equal to 192 kHz or 176.4 kHz, the audio emphasis flag F2 is set to "0" representing an emphasis off state. When the sampling frequency "fs" is equal to other values, the audio emphasis flag F2 is set to "1" representing an emphasis on state.

Sixth Embodiment

Figure 30:
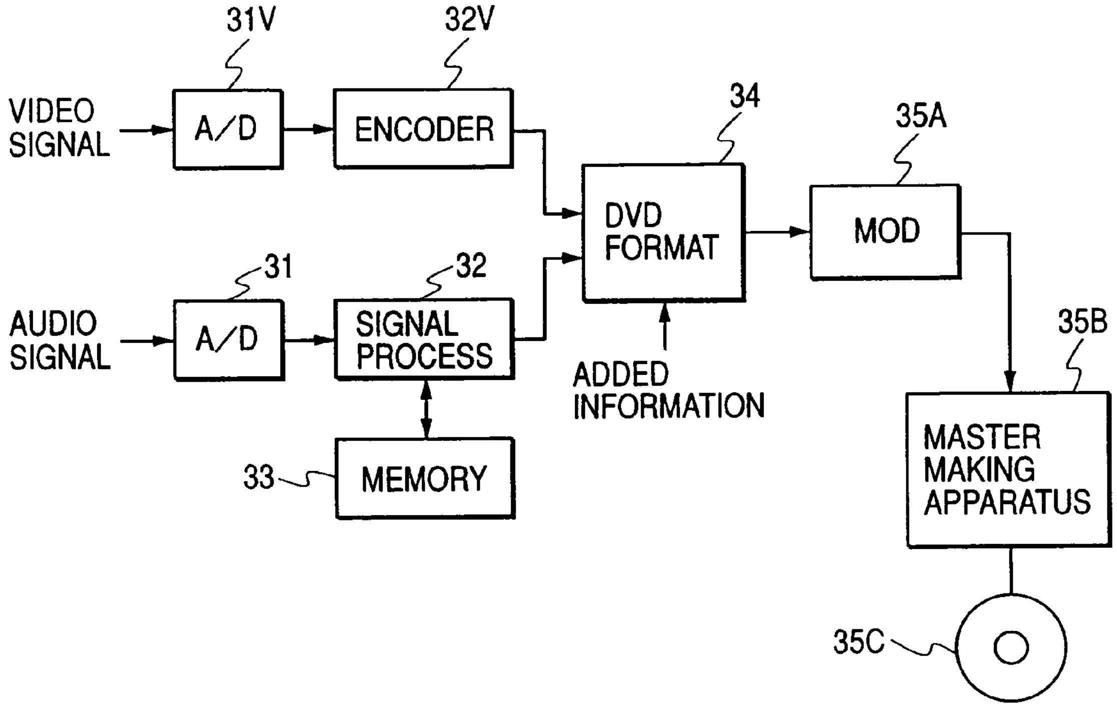
FIG. 30 is a block diagram of an audio-signal encoding apparatus according to a sixth embodiment of this invention.

FIG. 30 shows an audio-signal encoding apparatus according to a sixth embodiment of this invention. The apparatus of FIG. 30 includes analog-to-digital (A/D) converters 31 and 31V, a signal processing circuit 32, a video encoder 32V, a memory 33, and a DVD formatting section 34.

An analog video signal is applied to the A/D converter 31V. The A/D converter 31V is followed by the video encoder 32V. The video encoder 32V is followed by the DVD formatting section 34.

An analog audio signal is applied to the A/D converter 31. In general, the analog audio signal has multiple channels including, for example, front and rear channels. The analog audio signal may be of the monaural type. The A/D converter 31 is followed by the signal processing circuit 32. The signal processing circuit 32 is followed by the DVD formatting section 34. The memory 33 is connected to the signal processing circuit 32. The signal processing circuit 32 and the memory 33 cooperate to implement desired signal processing. The memory 33 may be incorporated in the signal processing circuit 32 similarly to a conventional design.

The DVD formatting section 34 is successively followed by a modulation circuit 35A and a master making apparatus 35B.

Figure 31:
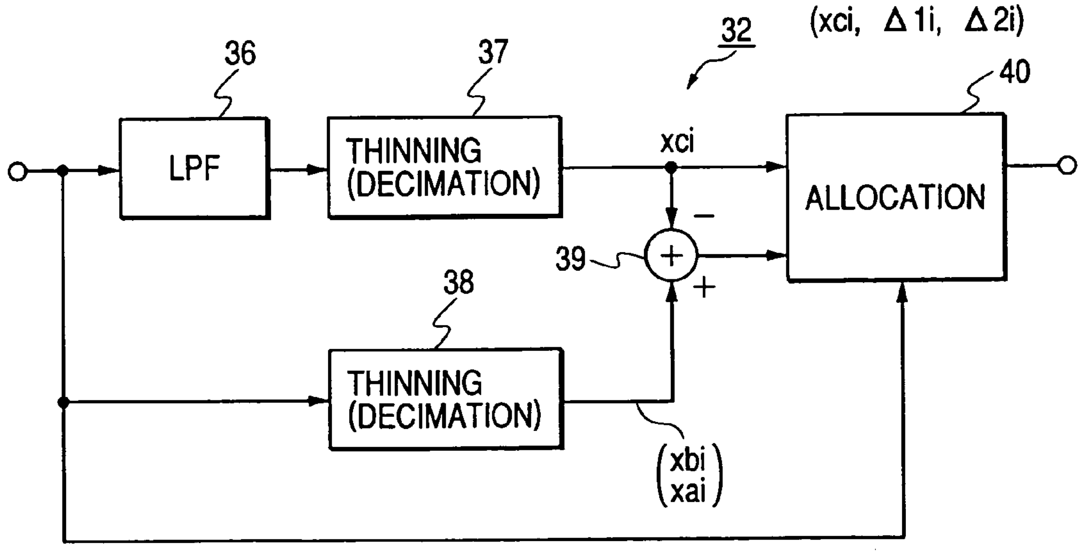
FIG. 31 is a block diagram of a signal processing circuit in FIG. 30.

As shown in FIG. 31, the signal processing circuit 32 includes a low pass filter (LPF) 36, thinning circuits 37 and 38, a subtracter 39, and an allocation circuit 40. The thinning circuits 37 and 38 may be decimating circuits. The low pass filter 36, the thinning circuit 38, and the allocation circuit 40 follow the A/D converter 31 (see FIG. 30). The low pass filter 36 is followed by the thinning circuit 37. A first input terminal of the subtracter 39 is connected to the output terminal of the thinning circuit 37. A second input terminal of the subtracter 39 is connected to the output terminal of the thinning circuit 38. The output terminal of the subtracter 39 is connected to the allocation circuit 40. The output terminal of the thinning circuit 37 is connected to the allocation circuit 40. The allocation circuit 40 is followed by the DVD formatting section 34 (see FIG. 30).

The A/D converter 31 samples the analog audio signal at a given sampling frequency "fs", and changes every sample of the analog audio signal into a corresponding digital sample. Thus, the A/D converter 31 changes the analog audio signal into a corresponding digital audio signal (for example, a PCM audio signal) with a given quantization bit number. In other words, the A/D converter 31 quantizes the analog audio signal into the corresponding digital audio signal. The quantization implemented by the A/D converter 31 may vary from channel to channel. For example, the A/D converter 31 quantizes front-channel components of the analog audio signal at a first predetermined sampling frequency and a first predetermined quantization bit number. The A/D converter 31 quantizes rear-channel components of the analog audio signal at a second predetermined sampling frequency and a second predetermined bit number which are equal to or different from the first predetermined sampling frequency and the first predetermined quantization bit number respectively. The A/D converter 31 outputs the digital audio signal to the signal processing circuit 32.

Operation of the signal processing circuit 32 can be changed between first and second modes which correspond to the absence and the presence of thinning respectively.

During operation of the signal processing circuit 32 in the first mode (the absence of thinning), the digital audio signal is directly transmitted from the A/D converter 31 to the allocation circuit 40. The device 40 allocates the digital audio signal to audio data which can be placed in audio packs A (see FIG. 14). The allocation circuit 40 outputs the audio data to the DVD formatting section 34.

During operation of the signal processing circuit 32 in the second mode (the presence of thinning), the digital audio signal is transmitted from the A/D converter 31 to the low pass filter 36 and the thinning circuit 38. The low pass filter 36 conducts only a half of the frequency band of the digital audio signal. The low pass filter 36 outputs the resultant signal to the thinning circuit 37. The thinning circuit 37 selects one fourth of samples of the output signal of the low pass filter 36. The thinning circuit 37 outputs only the selected signal samples to the subtracter 39 and the allocation circuit 40. The selected samples are spaced at 4-sample intervals.

During operation of the signal processing circuit 32 in the second mode (the presence of thinning), the thinning circuit 38 selects alternate ones of samples of the digital audio signal. The thinning circuit 38 outputs only the selected signal samples to the subtracter 39.

A sequence of samples of the output signal from the thinning circuit 37 is now expressed as:

$$xc1, xc2, xc3, \ldots, xci, \ldots$$

On the other hand, a sequence of samples of the output signal from the thinning circuit 38 is expressed as:

$$xb1, xa1, xb2, xa2, \ldots, xbi, xai, \ldots$$

During operation of the signal processing circuit 32 in the second mode (the presence of thinning), the subtracter 39 calculates differences Δ1i and Δ2i between the output signals of the thinning circuits 37 and 38. The differences Δ1i and Δ2i are given as follows.

$$\Delta 1i = xbi - xci$$

$$\Delta 2i = xai - xci$$

The subtracter 39 informs the allocation circuit 40 of the calculated differences Δ1i and Δ2i.

During operation of the signal processing circuit 32 in the second mode (the presence of thinning), the allocation circuit 40 combines the output signal of the thinning circuit 37 and the information of the differences Δ1i and Δ2i into audio user data which can be placed in audio packs A (see FIG. 14). The allocation circuit 40 outputs the audio user data to the DVD formatting section 34.

The A/D converter 31V changes the analog video signal into a corresponding digital video signal. The A/D converter 31V outputs the digital video signal to the video encoder 32V. The video encoder 32V changes the digital video signal into an MPEG-format signal. The video encoder 32V packs the MPEG-format signal into video user data which can be placed in video packs V. The video encoder 32V outputs the video user data to the DVD formatting section 34.

The DVD formatting section 34 receives control data from suitable devices (not shown). The control data represents character information, display time information, sampling-frequency information, quantization-bit-number information, thinning information, and other information to be added. The DVD formatting section 34 packs the audio data (or the audio user data), the video user data, and the added information into a composite signal of a DVD-Audio format corresponding to the signal recording format of the DVD-Audio in FIG. 2 or the signal recording format of the DVD-Audio in FIG. 23. The DVD formatting section 34 outputs the composite signal of the DVD-Audio format to the modulation circuit 35A. It should be noted that the DVD formatting section 34 may output the composite signal of the DVD-Audio format to a transmission line or a communication line. The modulation circuit 35A subjects the composite signal of the DVD-Audio format to given modulation (for example, EFM modulation) suited to a DVD-Audio. The modulation circuit 35A outputs the modulation-resultant signal to the master making apparatus 35B. The apparatus 35B makes a master disc 35C in response to the output signal of the modulation circuit 35A. The maser disc 35C stores the output signal of the modulation circuit 35A. DVD-Audios are made by a DVD making apparatus (not shown) on the basis of the master disc 35C.

The audio-signal encoding apparatus of FIG. 30 may be formed by a computer-based apparatus which operates in accordance with a computer program stored in an internal memory. In this case, a recording medium may be prepared which stores the control program. The internal memory of the computer-based apparatus is loaded with the computer program from the recording medium, and then the computer-based apparatus is started to implement a desired encoding process in accordance with the computer program.

Seventh Embodiment

Figure 32:
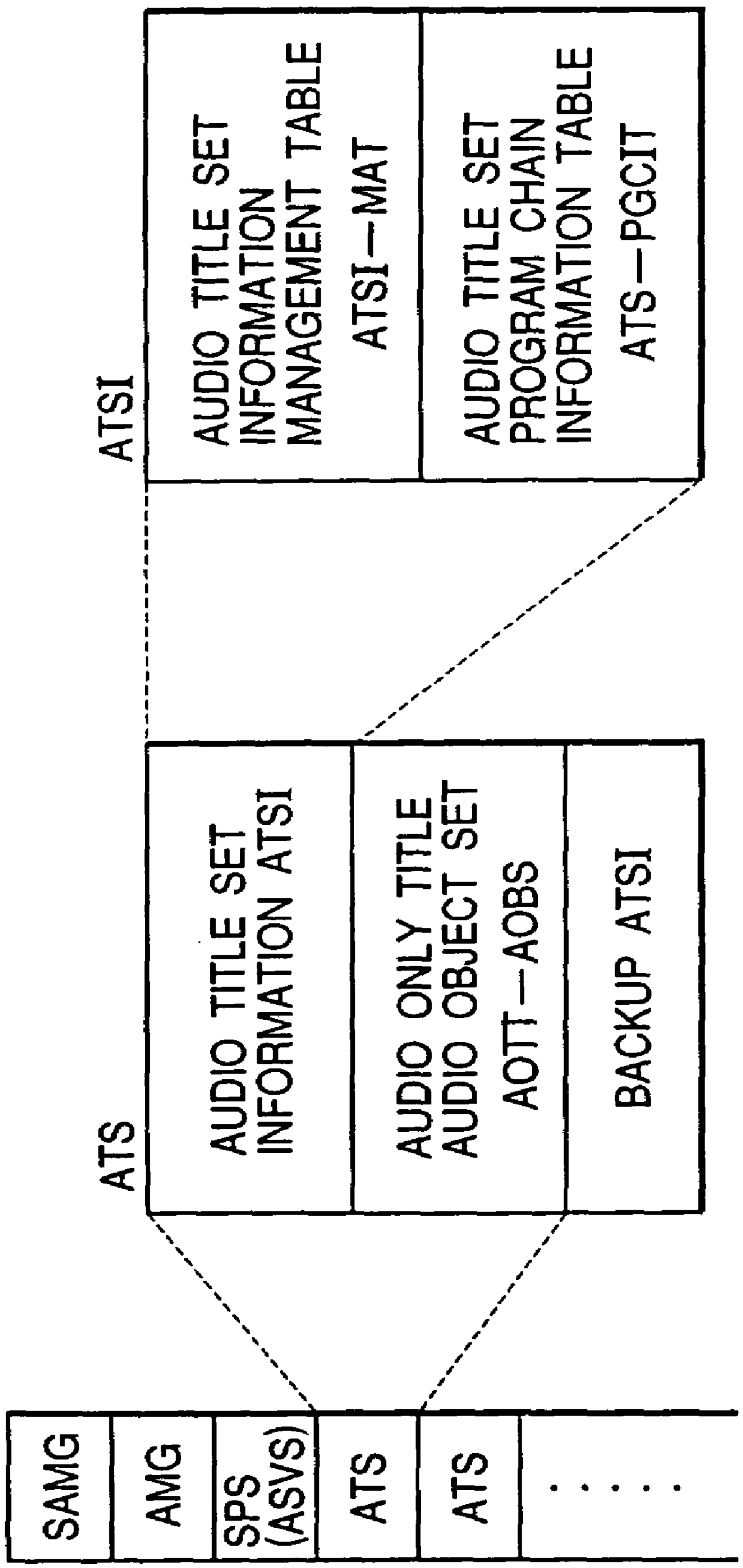
FIG. 32 is a diagram of the structure of an ATS area in a seventh embodiment of this invention.

FIG. 32 shows the structure of data recorded on a DVD-Audio according to a seventh embodiment of this invention. The data structure in FIG. 32 includes a sequence of a structure-of-simple audio manager SAMG, an audio manager AMG, a still picture set SPS, and plural audio title sets ATS. The still picture set SPS is also referred to as the audio still video set ASVS.

The audio manager AMG has audio manager information AMGI, an audio manager menu AMGM, and backup audio manager information AMGI. The still picture set SPS has a sequence of still-picture address information SPAI and still picture units SPU.

Each audio title set ATS has a sequence of audio title set (ATS) information ATSI, an audio only title audio object set AOTT-AOBS, and backup audio title set information ATSI. The audio title set information ATSI has a sequence of an audio title set information management table ATSI-MAT, and an audio title set program chain information table ATS-PGCIT.

Figure 33:
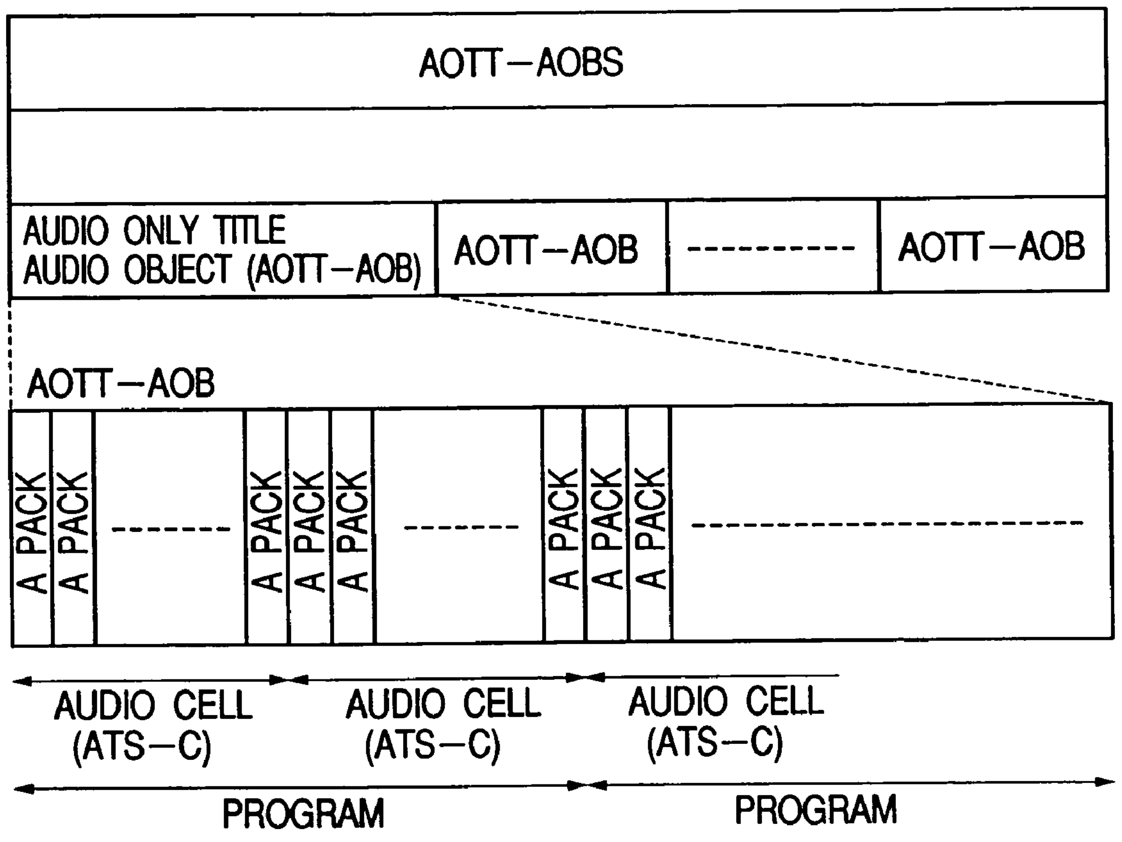
FIG. 33 is a diagram of the structure of an AOTT-AOBS area.

As shown in FIG. 33, the audio only title audio object set AOTT-AOBS has a sequence of audio only title audio objects AOTT-AOB. Each of the audio only title audio objects AOTT-AOB is formed by a plurality of programs (tunes or movements) PG. Each of the programs PG is formed by a plurality of cells ATS-C.

Generally, audio only title audio objects AOTT-AOB are of first and second types. Each audio only title audio object AOTT-AOB of the first type contains only audio data. Each audio only title audio object AOTT-AOB of the second type contains not only audio data but also real-time information data (RTI data). Audio only title audio objects AOTT-AOB of at least one type are stored in the DVD-Audio or a tune therein.

With reference to FIG. 33, each program PG in an audio only title audio object AOTT-AOB of the first type is formed by a plurality of audio cells ATS-C. Each of the audio cells ATS-C is composed of only audio packs A.

Figure 34:
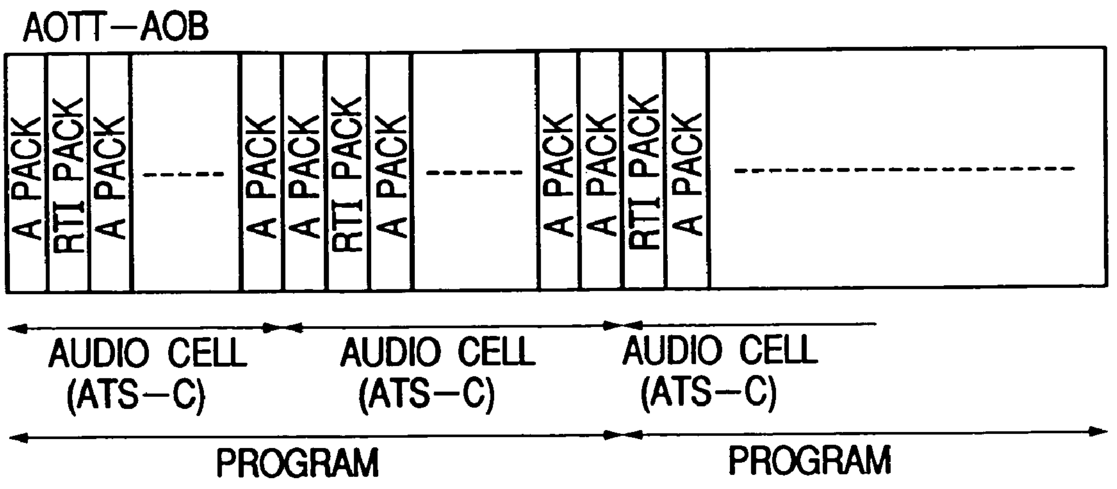
FIG. 34 is a diagram of a sequence of packs in an AOTT-AOB area.

As shown in FIG. 34, each program PG in an audio only title audio object AOTT-AOB of the second type is formed by a plurality of audio cells ATS-C. Each of the audio cells ATS-C has a pack sequence of a real-time information pack RTI and audio packs A. Regarding the pack sequence in each audio cell ATS-C, the real-time information pack RTI occupies the second place while the audio packs A occupy the other places.

According to the linear PCM audio encoding mode, every audio pack A has 2,048 bytes or less.

Figure 35:
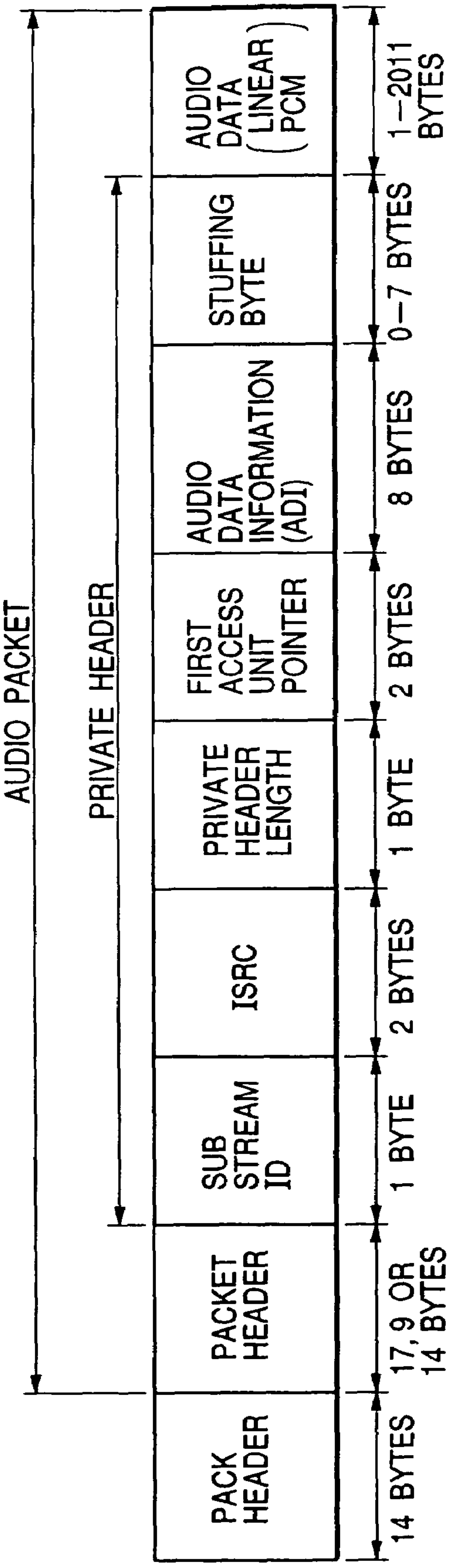
FIG. 35 is a diagram of the structure of a linear PCM audio pack.

As shown in FIG. 35, a linear PCM audio pack A has a 14-byte pack header and an audio packet. The pack header is followed by the audio packet. The audio packet has a sequence of a packet header, a private header, and audio data (linear PCM audio data). The packet header has 9 bytes, 14 bytes, or 17 bytes. The audio data has 1 byte to 2,011 bytes.

As shown in FIGS. 35 and 36, the private header has a sequence of 8-bit sub stream ID (identification) information, a 3-bit reserved area, 5-bit information of an UPC/EAN-ISRC (Universal Product Code/European Article Number-International Standard Recording Code) number, 8-bit information of UPC/EAN-ISRC data, 8-bit information of the private header length, a 16-bit first access unit pointer, 8-byte audio data information ADI, and 0 to 8 stuffing bytes.

As shown in FIG. 36, the audio data information ADI (see FIG. 35) has a sequence of a 1-bit audio emphasis flag, a 1-bit reserved area, 1-bit information of a down mix mode, 1-bit information of down mix code effectiveness, a 4-bit down mix code, 4-bit information of the quantization word length (the quantization bit number) in the channel group “1”, 4-bit information of the quantization word length (the quantization bit number) in the channel group “2”, 4-bit information of the audio sampling frequency fs1 in the channel group “1”, 4-bit information of the audio sampling frequency fs2 in the channel group “2”, a 4-bit reserved area, 4-bit information of a multiple channel type, 3-bit information of a bit shift in the channel group “2”, 5-bit channel assignment information, 8-bit dynamic-range control information, and a 16-bit reserved area.

With reference to FIG. 36, the 8-bit UPC/EAN-ISRC data is changed among eight different states in accordance with the UPC/EAN-ISRC number. The 8 bits representing the UPC/EAN-ISRC data are denoted by b7, b6, b5, b4, b3, b2, b1, and b0 respectively.

In the case where the UPC/EAN-ISRC number is equal to “1”, the bits b7 and b6 of the UPC/EAN-ISRC data are reserved while the other bits b5-b0 thereof are assigned to a country code (ISRC #1) as shown in FIG. 37.

In the case where the UPC/EAN-ISRC number is equal to “2”, the bits b7 and b6 of the UPC/EAN-ISRC data are reserved while the other bits b5-b0 thereof are assigned to a country code (ISRC #2) as shown in FIG. 38.

In the case where the UPC/EAN-ISRC number is equal to “3”, the bits b7 and b6 of the UPC/EAN-ISRC data are reserved while the other bits b5-b0 thereof are assigned to a copyright holder code (ISRC #3) as shown in FIG. 39.

In the case where the UPC/EAN-ISRC number is equal to “4”, the bits b7 and b6 of the UPC/EAN-ISRC data are reserved while the other bits b5-b0 thereof are assigned to a copyright holder code (ISRC #4) as shown in FIG. 40.

In the case where the UPC/EAN-ISRC number is equal to “5”, the bits b7 and b6 of the UPC/EAN-ISRC data are reserved while the other bits b5-b0 thereof are assigned to a copyright holder code (ISRC #5) as shown in FIG. 41.

In the case where the UPC/EAN-ISRC number is equal to “6”, the bits b7-b4 of the UPC/EAN-ISRC data are reserved while the other bits b3-b0 thereof are assigned to a recording year (ISRC #6) as shown in FIG. 42.

In the case where the UPC/EAN-ISRC number is equal to “7”, the bits b7-b4 of the UPC/EAN-ISRC data are reserved while the other bits b3-b0 thereof are assigned to a recording year (ISRC #7) as shown in FIG. 43.

Preferably, the number of bits of signal samples of audio channels in the group “2” is reduced in comparison with the number of bits of signal samples of audio channels in the group “1” to implement data compression. Thus, the word length of signal samples of audio channels in the group “2” is reduced in comparison with the word length of signal samples of audio channels in the group “1”. Regarding every linear PCM audio pack (see FIG. 35), reduction-resultant linear PCM audio data for the channel group “2” is located in the audio data area.

Figure 44:
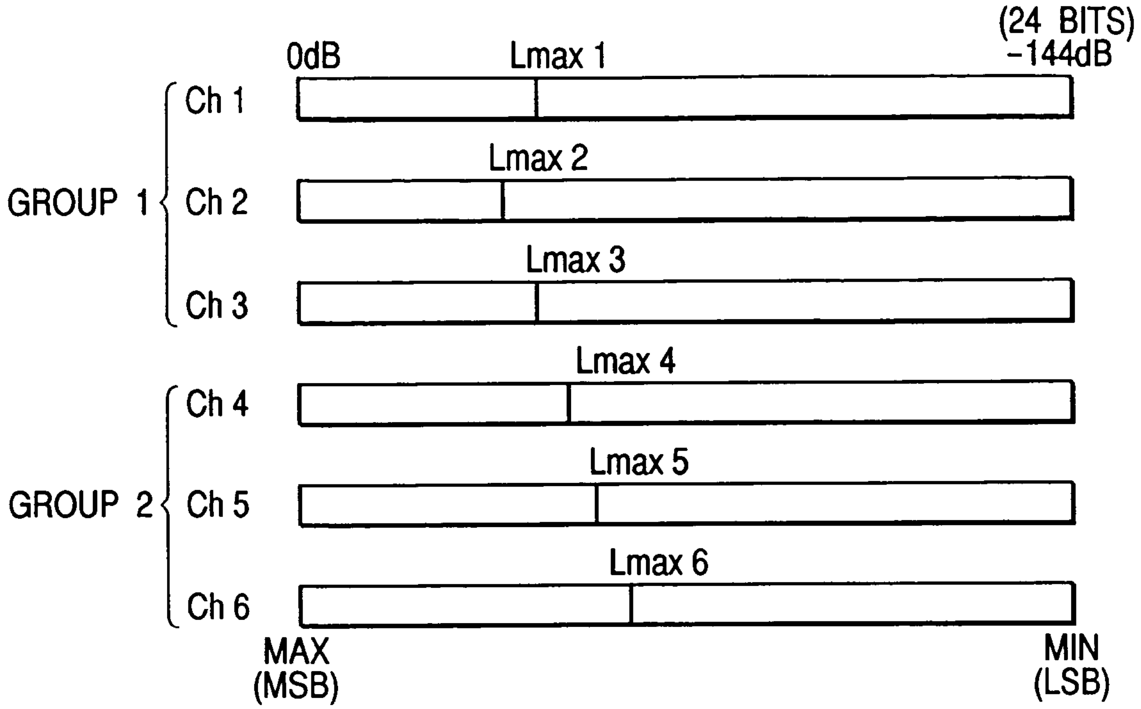
FIG. 44 is a diagram of an unreduced state of 24-bit signal samples in audio channels Ch1, Ch2, Ch3, Ch4, Ch5, and Ch6.

FIG. 44 shows an unreduced state of 24-bit signal samples in audio channels Ch1, Ch2, Ch3, Ch4, Ch5, and Ch6. The channels Ch1, Ch2, and Ch3 are in the group “1” while the channels Ch4, Ch5, and Ch6 are in the group “2”. The signal levels represented by signal samples of the channels Ch1, Ch2, Ch3, Ch4, Ch5, and Ch6 are equal to or less than upper limits Lmax1, Lmax2, Lmax3, Lmax4, Lmax5, and Lmax6 respectively. According to the unreduced state in FIG. 44, the upper level limits Lmax1, Lmax2, Lmax3, Lmax4, Lmax5, and Lmax6 have the following relation.

$$Lmax2>Lmax1=Lmax3>Lmax4>Lmax5>Lmax6$$

In this case, each of signal samples in the channels Ch4, Ch5, and Ch6 in the group “2” is shifted up and reduced by an amount corresponding to a given bit number depending on the upper limit level Lmax2.

Figure 45:
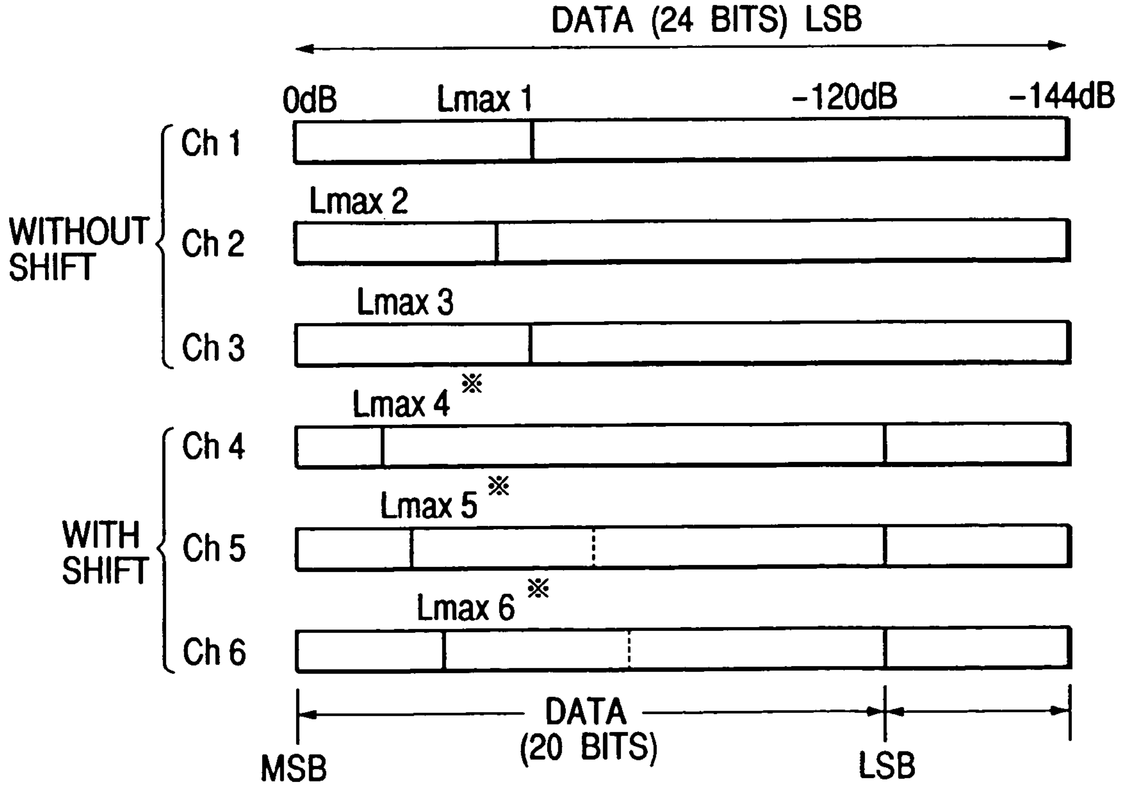
FIG. 45 is a diagram of a reduction-resultant state of signal samples which originates from the unreduced state in FIG. 44.

FIG. 45 shows a reduction-resultant state of signal samples which originates from the unreduced state in FIG. 44. With reference to FIG. 45, each of signal samples in the channels Ch4, Ch5, and Ch6 in the group "2" results from up shift by 4 bits, and thus has 20 bits.

Figure 46:
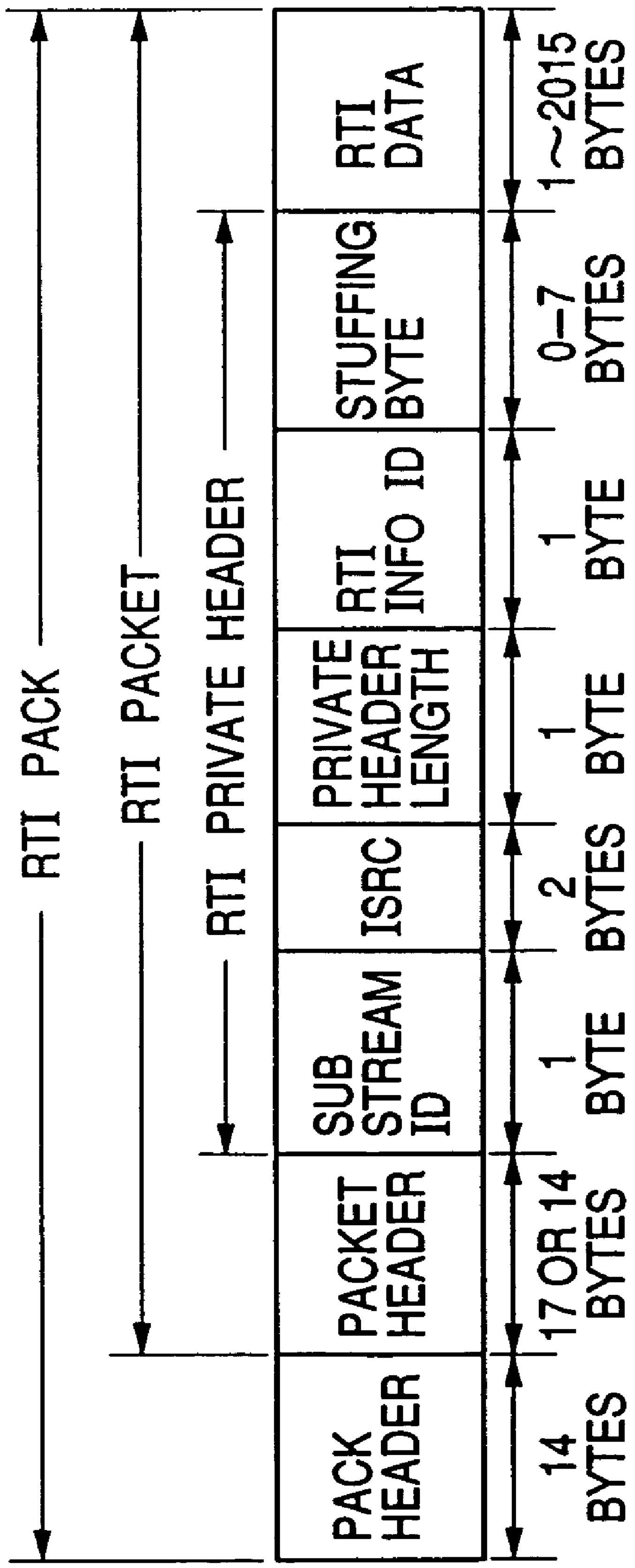
FIG. 46 is a diagram of the structure of a real-time information pack.

As shown in FIG. 46, a real-time information pack RTI has a 14-byte pack header and a real-time information packet. The pack header is followed by the real-time information packet. The real-time information packet has a sequence of a packet header, a private header, and real-time information data. The packet header has 14 bytes or 17 bytes. The real-time information data has 1 byte to 2,015 bytes. The real-time information contains reproduction control information and character information related to audio data.

As shown in FIG. 46, the private header of the real-time information packet has a sequence of 1-byte sub stream ID (identification) information, 2-byte ISRC information, 1-byte information of the private header length, 1-byte real-time information identification (ID) data, and 0 to 7 stuffing bytes. The 2-byte ISRC information contains information of an UPC/EAN-ISRC (Universal Product Code/European Article Number-International Standard Recording Code) number, and information of UPC/EAN-ISRC data. The UPC/EAN-ISRC number and data relate to the copyright on still pictures represented by still-picture packs SPCT which will be explained later.

Figure 47:
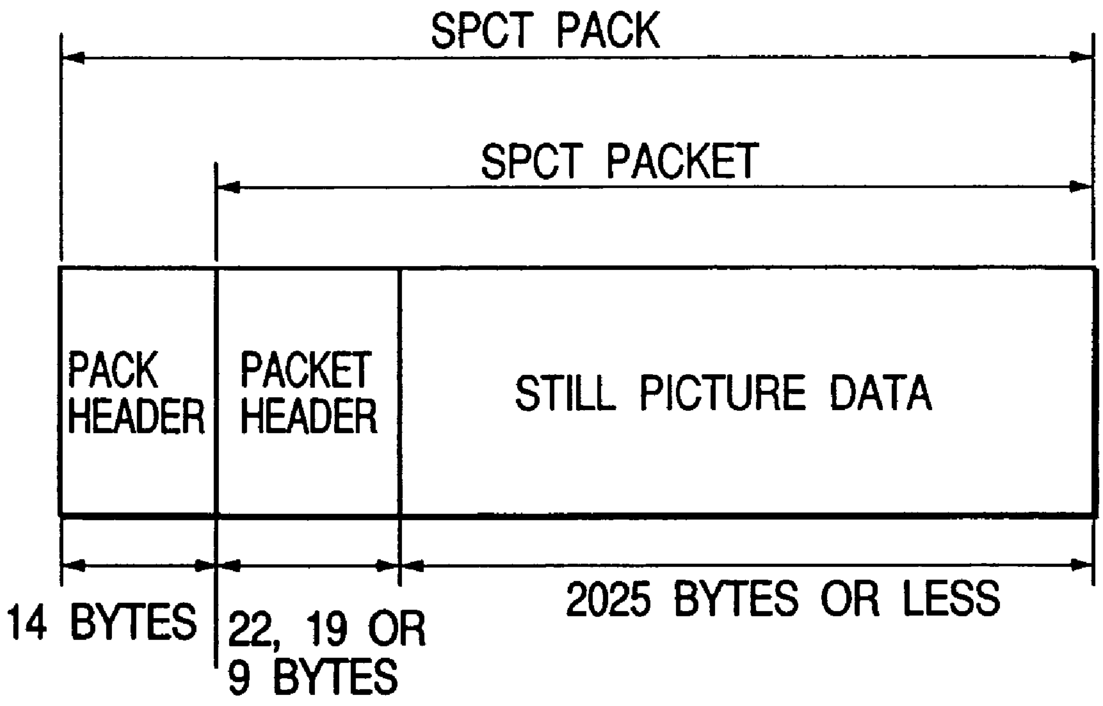
FIG. 47 is a diagram of the structure of a still-picture pack.

The still picture set SPS (the audio still video set ASVS) in FIG. 32 includes a sequence of still-picture packs SPCT. As shown in FIG. 47, each still-picture pack SPCT has a 14-byte pack header and a still-picture packet. The pack header is followed by the still-picture packet. The still-picture packet has a sequence of a packet header and still-picture data. The packet header has 9 bytes, 19 bytes, or 22 bytes. The still-picture data has 1 byte to 2,025 bytes. Here, each still picture is represented by an intra-coded picture resulting from data compression according to the MPEG-1 standards or the MPEG-2 standards. Data representing a still picture is divided into pieces (still-picture data pieces) located in still-picture packs SPCT respectively. The UPC/EAN-ISRC number and data related to the copyright on a still picture may be contained in the packet header of a still-picture pack SPCT.

FIG. 48 shows the details of the audio title set information management table ATSI-MAT in FIG. 32. As shown in FIG. 48, the audio title set information management table ATSI-MAT has 2,048 bytes in relative byte positions RBP0-RBP2047. Specifically, the audio title set information management table ATSI-MAT has a sequence of a 12-byte ATS identifier ATS-ID, a 4-byte ATS end address ATS-EA, a 12-byte reserved area, a 4-byte ATSI end address ATSI-EA, a 2-byte version number VERN, a 94-byte reserved area, a 4-byte ATSI-MAT end address, a 60-byte reserved area, a 4-byte AOTT VTS start address, a 4-byte AOTT AOBS start address or a 4-byte AOTT VOBS start address, a 4-byte reserved area, a 4-byte ATS-PGCIT start address, a 48-byte reserved area, a 128-byte AOTT AOB attribute AOTT-AOB-ATR or a 128-byte AOTT VOB audio stream attribute AOTT-VOB-AST-ATR, a 288-byte area for multiple channel audio data down mix coefficients ATS-DM-COEFT#0-#15, a 32-byte reserved area, a 2-byte AOTT AOBS still-picture data attribute ATS-SPCT-ATR, and a 1342-byte reversed area.

As shown in FIG. 48, the ATS identifier ATS-ID occupies the relative byte positions RBP0-RBP11. The ATS end address ATS-EA occupies the relative byte positions RBP12-RBP15. The relative byte positions RBP16-RBP27 are reserved. The ATSI end address ATSI-EA occupies the relative byte positions RBP28-RBP31. The version number VERN occupies the relative byte positions RBP32 and RBP33. The relative byte positions RBP34-RBP127 are reserved. The ATSI-MAT end address occupies the relative byte positions RBP128-RBP131. The relative byte positions RBP132-RBP191 are reserved. The AOTT VTS start address occupies the relative byte positions RBP192-RBP195. The AOTT AOBS start address or the AOTT VOBS start address occupies the relative byte positions RBP196-RBP199. The relative byte positions RBP200-RBP203 are reserved. The ATS-PGCIT start address occupies the relative byte positions RBP204-RBP207. The relative byte positions RBP208-RBP255 are reserved. The AOTT AOB attribute AOTT-AOB-ATR or the AOTT VOB audio stream attribute AOTT-VOB-AST-ATR occupies the relative byte positions RBP256-RBP383. The multiple channel audio data down mix coefficients ATS-DM-COEFT#0-#15 occupies the relative byte positions RBP384-RBP671. The relative byte positions RBP672-RBP703 are reserved. The AOTT AOBS still-picture data attribute ATS-SPCT-ATR occupies the relative byte positions RBP704-RBP705. The relative byte positions RBP706-RBP2047 are reserved.

As previously mentioned, one of the AOTT AOB attribute AOTT-AOB-ATR and the AOTT VOB audio stream attribute AOTT-VOB-AST-ATR is used, being located in the area having the relative byte positions RBP256-RBP383 in the audio title set information management table ATSI-MAT of FIG. 48. When the related audio title set has an audio only title audio object set AOTT-AOBS, the AOTT AOB attribute AOTT-AOB-ATR is used.

As shown in FIG. 49, the AOTT AOB attribute (the audio-only-title audio-object attribute) AOTT-AOB-ATR contains a sequence of 16 bytes, that is, 128 bits b127, b126, b125, . . . , b1, b0. A set of the bits b127, b126, b125, b124, b123, b122, b121, and b120 represents an audio encoding mode. A set of the bits b111, b110, b109, and b108 represents a quantization bit number Q1 of a channel group "1". A set of the bits b107, b106, b105, and b104 represents a quantization bit number Q2 of a channel group "2". A set of the bits b103, b102, b101, and b100 represents a sampling frequency fs1 of the channel group "1". A set of the bits b99, b98, b97, and b96 represents a sampling frequency fs2 of the channel group "2". A set of the bits b95, b94, and b93 represents a multiple channel type. A set of the bits b92, b91, b90, b89, and b88 represents channel assignment. The other bits form reserved areas.

The audio encoding mode represented by the bits b127, b126, b125, b124, b123, b122, b121, and b120 in FIG. 49 can be selected from among a linear PCM audio encoding mode, a Dolby digital encoding mode, an MPEG-2 encoding mode without any extension, an MPEG-2 encoding mode with an extension, a DTS encoding mode, and an SDDS encoding mode. Specifically, a bit sequence of "00000000" is assigned to the linear PCM audio encoding mode. A bit sequence of "00000001" is assigned to the Dolby digital encoding mode. A bit sequence of "00000010" is assigned to the MPEG-2 encoding mode without any extension. A bit sequence of "00000011" is assigned to the MPEG-2 encoding mode with an extension. A bit sequence of "00000100" is assigned to the DTS encoding mode. A bit sequence of "00000101" is assigned to the SDDS encoding mode.

Normally, the bits b127, b126, b125, b124, b123, b122, b121, and b120 in FIG. 49 are set to "00000000" representing the linear PCM audio encoding mode.

The quantization bit number Q1 of the channel group "1" which is represented by the bits b111, b110, b109, and b108 in FIG. 49 can be changed among 16 bits, 20 bits, and 24 bits. Specifically, a bit sequence of "0000" is assigned to 16 bits. A bit sequence of "0001" is assigned to 20 bits. A bit sequence of "0010" is assigned to 24 bits.

The quantization bit number Q2 of the channel group "2" which is represented by the bits b107, b106, b105, and b104 in FIG. 49 can be changed among 16 bits, 20 bits, and 24 bits. Specifically, a bit sequence of "0000" is assigned to 16 bits. A bit sequence of "0001" is assigned to 20 bits. A bit sequence of "0010" is assigned to 24 bits.

The sampling frequency fs1 of the channel group "1" which is represented by the bits b103, b102, b101, and b100 in FIG. 49 can be changed among 48 kHz, 96 kHz, 192 kHz, 44.1 kHz, 88.2 kHz, and 176.4 kHz. Specifically, a bit sequence of "0000" is assigned to 48 kHz. A bit sequence of "0001" is assigned to 96 kHz. A bit sequence of "0010" is assigned to 192 kHz. A bit sequence of "1000" is assigned to 44.1 kHz. A bit sequence of "1001" is assigned to 88.2 kHz. A bit sequence of "1010" is assigned to 176.4 kHz.

The sampling frequency fs2 of the channel group "2" which is represented by the bits b99, b98, b97, and b96 in FIG. 49 can be changed among 48 kHz, 96 kHz, 192 kHz, 44.1 kHz, 88.2 kHz, and 176.4 kHz. Specifically, a bit sequence of "0000" is assigned to 48 kHz. A bit sequence of "0001" is assigned to 96 kHz. A bit sequence of "0010" is assigned to 192 kHz. A bit sequence of "1000" is assigned to 44.1 kHz. A bit sequence of "1001" is assigned to 88.2 kHz. A bit sequence of "1010" is assigned to 176.4 kHz.

Normally, the bits b95, b94, and b93 in FIG. 49 are set to "000" representing that the multiple channel type agrees with a type "1".

The channel assignment represented by the bits b92, b91, b90, b89, and b88 in FIG. 49 can be changed among 21 different types shown in FIG. 50. A bit sequence of "00000" is assigned to a first type of the channel assignment in which a first channel ACH0 forms a monaural channel C(mono), and second and later channels ACH1, ACH2, ACH3, ACH4, and ACH5 are unused. According to the first type of the channel assignment, the monaural channel C(mono) is in the group "1". Thus, the channel number in the group "1" is equal to one while the channel number in the group "2" is equal to zero. A bit sequence of "00001" is assigned to a second type of the channel assignment in which the first and second channels ACH0 and ACH1 form a left channel L and a right channel R respectively, and the third and later channels ACH2, ACH3, ACH4, and ACH5 are unused. According to the second type of the channel assignment, the left channel L and the right channel R are in the group "1". Thus, the channel number in the group "1" is equal to two while the channel number in the group "2" is equal to zero. A bit sequence of "00010" is assigned to a third type of the channel assignment in which the first, second, and third channels ACH0, ACH1, and ACH2 form a left front channel Lf, a right front channel Rf, and a surround channel S respectively, and the fourth and later channels ACH3, ACH4, and ACH5 are unused. According to the third type of the bit assignment, the left front channel Lf and the right front channel Rf are in the group "1" while the surround channel S is in the group "2". Thus, the channel number in the group "1" is equal to two while the channel number in the group "2" is equal to one. A bit sequence of "00011" is assigned to a fourth type of the channel assignment in which the first, second, third, and fourth channels ACH0, ACH1, ACH2, and ACH3 form a left front channel Lf, a right front channel Rf, a left surround channel Ls, and a right surround channel Rs respectively, and the fifth and sixth channels ACH4 and ACH5 are unused. According to the fourth type of the channel assignment, the left front channel Lf and the right front channel Rf are in the group "1" while the left surround channel Ls and the right surround channel Rs are in the group "2". Thus, the channel number in the group "1" is equal to two while the channel number in the group "2" is also equal to two. A bit sequence of "00100" is assigned to a fifth type of the channel assignment in which the first, second, and third channels ACH0, ACH1, and ACH2 form a left front channel Lf, a right front channel Rf, and a low frequency effect channel LFE respectively, and the fourth and later channels ACH3, ACH4, and ACH5 are unused. According to the fifth type of the channel assignment, the left front channel Lf and the right front channel Rf are in the group "1" while the low frequency effect channel LFE is in the group "2". Thus, the channel number in the group "1" is equal to two while the channel number in the group "2" is equal to one. A bit sequence of "00101" is assigned to a sixth type of the channel assignment in which the first, second, third, and fourth channels ACH0, ACH1, ACH2, and ACH3 form a left front channel Lf, a right front channel Rf, a low frequency effect channel LFE, and a surround channel S respectively, and the fifth and sixth channels ACH4 and ACH5 are unused. According to the sixth type of the channel assignment, the left front channel Lf and the right front channel Rf are in the group "1" while the low frequency effect channel LFE and the surround channel S are in the group "2". Thus, the channel number in the group "1" is equal to two while the channel number in the group "2" is also equal to two. A bit sequence of "00110" is assigned to a seventh type of the channel assignment in which the first, second, third, fourth, and fifth channels ACH0, ACH1, ACH2, ACH3, and ACH4 form a left front channel Lf, a right front channel Rf, a low frequency effect channel LFE, a left surround channel Ls, and a right surround channel Rs respectively, and the sixth channel ACH5 is unused. According to the seventh type of the channel assignment, the left front channel Lf and the right front channel Rf are in the group "1" while the low frequency effect channel LFE, the left surround channel Ls, and the right surround channel Rs are in the group "2". Thus, the channel number in the group "1" is equal to two while the channel number in the group "2" is equal to three. A bit sequence of "00111" is assigned to an eighth type of the channel assignment in which the first, second, and third channels ACH0, ACH1, and ACH2 form a left front channel Lf, a right front channel Rf, and a center channel C respectively, and the fourth and later channels ACH3, ACH4, and ACH5 are unused. According to the eighth type of the channel assignment, the left front channel Lf and the right front channel Rf are in the group "1" while the center channel C is in the group "2". Thus, the channel number in the group "1" is equal to two while the channel number in the group "2" is equal to one. A bit sequence of "01000" is assigned to a ninth type of the channel assignment in which the first, second, third, and fourth channels ACH0, ACH1, ACH2, and ACH3 form a left front channel Lf, a right front channel Rf, a center channel C, and a surround channel S respectively, and the fifth and sixth channels ACH4 and ACH5 are unused. According to the ninth type of the channel assignment, the left front channel Lf and the right front channel Rf are in the group "1" while the center channel C and the surround channel S are in the group "2". Thus, the channel number in the group "1" is equal to two while the channel number in the group "2" is also equal to two. A bit sequence of "01001" is assigned to a tenth type of the channel assignment in which the first, second, third, fourth, and fifth channels ACH0, ACH1, ACH2, ACH3, and ACH4 form a left front channel Lf, a right front channel Rf, a center channel C, a left surround channel Ls, and a right surround channel Rs respectively, and the sixth channel ACH5 is unused. According to the tenth type of the channel assignment, the left front channel Lf and the right front channel Rf are in the group "1" while the center channel C, the left surround channel Ls, and the right surround channel Rs are in the group "2". Thus, the channel number in the group "1" is equal to two while the channel number in the group "2" is equal to three. A bit sequence of "01010" is assigned to an eleventh type of the channel assignment in which the first, second, third, and fourth channels ACH0, ACH1, ACH2, and ACH3 form a left front channel Lf, a right front channel Rf, a center channel C, and a low frequency effect channel LFE respectively, and the fifth and sixth channels ACH4 and ACH5 are unused. According to the eleventh type of the channel assignment, the left front channel Lf and the right front channel Rf are in the group "1" while the center channel C and the low frequency effect channel LFE are in the group "2". Thus, the channel number in the group "1" is equal to two while the channel number in the group "2" is also equal to two. A bit sequence of "01011" is assigned to a twelfth type of the channel assignment in which the first, second, third, fourth, and fifth channels ACH0, ACH1, ACH2, ACH3, and ACH4 form a left front channel Lf, a right front channel Rf, a center channel C, a low frequency effect channel LFE, and a surround channel S respectively, and the sixth channel ACH5 is unused. According to the twelfth type of the channel assignment, the left front channel Lf and the right front channel Rf are in the group "1" while the center channel C, the low frequency effect channel LFE, and the surround channel S are in the group "2". Thus, the channel number in the group "1" is equal to two while the channel number in the group "2" is equal to three. A bit sequence of "01100" is assigned to a thirteenth type of the channel assignment in which the first, second, third, fourth, fifth, and sixth channels ACH0, ACH1, ACH2, ACH3, ACH4, and ACH5 form a left front channel Lf, a right front channel Rf, a center channel C, a low frequency effect channel LFE, a left surround signal Ls, and a right surround channel Rs respectively. According to the thirteenth type of the channel assignment, the left front channel Lf and the right front channel Rf are in the group "1" while the center channel C, the low frequency effect channel LFE, the left surround signal Ls, and the right surround channel Rs are in the group "2". Thus, the channel number in the group "1" is equal to two while the channel number in the group "2" is equal to four. A bit sequence of "01101" is assigned to a fourteenth type of the channel assignment in which the first, second, third, and fourth channels ACH0, ACH1, ACH2, and ACH3 form a left front channel Lf, a right front channel Rf, a center channel C, and a surround channel S respectively, and the fifth and sixth channels ACH4 and ACH5 are unused. According to the fourteenth type of the channel assignment, the left front channel Lf, the right front channel Rf, and the center channel C are in the group "1" while the surround channel S is in the group "2". Thus, the channel number in the group "1" is equal to three while the channel number in the group "2" is equal to one. A bit sequence of "01110" is assigned to a fifteenth type of the channel assignment in which the first, second, third, fourth, and fifth channels ACH0, ACH1, ACH2, ACH3, and ACH4 form a left front channel Lf, a right front channel Rf, a center channel C, a left surround channel Ls, and a right surround channel Rs respectively, and the sixth channel ACH5 is unused. According to the fifteenth type of the channel assignment, the left front channel Lf, the right front channel Rf, and the center channel C are in the group "1" while the left surround channel Ls and the right surround channel Rs are in the group "2". Thus, the channel number in the group "1" is equal to three while the channel number in the group "2" is equal to two. A bit sequence of "01111" is assigned to a sixteenth type of the channel assignment in which the first, second, third, and fourth channels ACH0, ACH1, ACH2, and ACH3 form a left front channel Lf, a right front channel Rf, a center channel C, and a low frequency effect channel LFE respectively, and the fifth and sixth channels ACH4 and ACH5 are unused. According to the sixteenth type of the channel assignment, the left front channel Lf, the right front channel Rf, and the center channel C are in the group "1" while the low frequency effect channel LFE is in the group "2". Thus, the channel number in the group "1" is equal to three while the channel number in the group "2" is equal to one. A bit sequence of "10000" is assigned to a seventeenth type of the channel assignment in which the first, second, third, fourth, and fifth channels ACH0, ACH1, ACH2, ACH3, and ACH4 form a left front channel Lf, a right front channel Rf, a center channel C, a low frequency effect channel LFE, and a surround channel S respectively, and the sixth channel ACH5 is unused. According to the seventeenth type of the channel assignment, the left front channel Lf, the right front channel Rf, and the center channel C are in the group "1" while the low frequency effect channel LFE and the surround channel S are in the group "2". Thus, the channel number in the group "1" is equal to three while the channel number in the group "2" is equal to two. A bit sequence of "10001" is assigned to an eighteenth type of the channel assignment in which the first, second, third, fourth, fifth, and sixth channels ACH0, ACH1, ACH2, ACH3, ACH4, and ACH5 form a left front channel Lf, a right front channel Rf, a center channel C, a low frequency effect channel LFE, a left surround signal Ls, and a right surround channel Rs respectively. According to the eighteenth type of the channel assignment, the left front channel Lf, the right front channel Rf, and the center channel C are in the group "1" while the low frequency effect channel LFE, the left surround signal Ls, and the right surround channel Rs are in the group "2". Thus, the channel number in the group "1" is equal to three while the channel number in the group "2" is also equal to three. A bit sequence of "10010" is assigned to a nineteenth type of the channel assignment in which the first, second, third, fourth, and fifth channels ACH0, ACH1, ACH2, ACH3, and ACH4 form a left front channel Lf, a right front channel Rf, a left surround channel Ls, a right surround channel Rs, and a low frequency effect channel LFE respectively, and the sixth channel ACH5 is unused. According to the nineteenth type of the channel assignment, the left front channel Lf, the right front channel Rf, the left surround channel Ls, and the right surround channel Rs are in the group "1" while the low frequency effect channel LFE is in the group "2". Thus, the channel number in the group "1" is equal to four while the channel number in the group "2" is equal to one. A bit sequence of "10011" is assigned to a twentieth type of the channel assignment in which the first, second, third, fourth, and fifth channels ACH0, ACH1, ACH2, ACH3, and ACH4 form a left front channel Lf, a right front channel Rf, a left surround channel Ls, a right surround channel Rs, and a center channel C respectively, and the sixth channel ACH5 is unused. According to the twentieth type of the channel assignment, the left front channel Lf, the right front channel Rf, the left surround channel Ls, and the right surround channel Rs are in the group "1" while the center channel C is in the group "2". Thus, the channel number in the group "1" is equal to four while the channel number in the group "2" is equal to one. A bit sequence of "10100" is assigned to a twenty-first type of the channel assignment in which the first, second, third, fourth, fifth, and sixth channels ACH0, ACH1, ACH2, ACH3, ACH4, and ACH5 form a left front channel Lf, a right front channel Rf, a left surround channel Ls, a right surround channel Rs, a center channel C, and a low frequency effect channel LFE respectively. According to the twenty-first type of the channel assignment, the left front channel Lf, the right front channel Rf, the left surround channel Ls, and the right surround channel Rs are in the group "1" while the center channel C and the low frequency effect channel C are in the group "2". Thus, the channel number in the group "1" is equal to four while the channel number in the group "2" is equal to two.

As previously indicated, one of the 128-byte AOTT AOB attribute AOTT-AOB-ATR and the 128-byte AOTT VOB audio stream attribute AOTT-VOB-AST-ATR is used, being located in the area having the relative byte positions RBP256-RBP383 in the audio title set information management table ATSI-MAT of FIG. 48. When the related audio title set does not have an audio only title audio object set AOIT-AOBS, the AOT VOB audio stream attribute AOTT-VOB-AST-ATR is used.

As shown in FIG. 51, the audio-only-title video-object audio-stream attribute AOTT-VOB-AST-ATR contains a sequence of 16 bytes, that is, 128 bits b127, b126, b125, . . . , b1, b0. A set of the bits b127, b126, b125, b124, b123, b122, b121, and b120 represents an audio encoding mode. A set of the bits b111, b110, b109, and b108 represents a quantization bit number Q. A set of the bits b103, b102, b101, and b100 represents a sampling frequency "fs". A set of the bits b95, b94, and b93 represents a multiple channel type. A set of the bits b92, b91, b90, b89, and b88 represents channel assignment. A set of the bits b87, b86, and b85 represents a decoding audio stream number. A set of the bits b79 and b78 represents information of MPEG audio quantization/dynamic range control (DRC). A set of the bits b75, b74, b73, and b72 represents a compressed audio channel number. The other bits form reserved areas.

The audio encoding mode represented by the bits b127, b126, b125, b124, b123, b122, b121, and b120 in FIG. 51 can be selected from among a linear PCM audio encoding mode, a Dolby digital encoding mode, an MPEG-2 encoding mode without any extension, an MPEG-2 encoding mode with an extension, a DTS encoding mode, and an SDDS encoding mode. Specifically, a bit sequence of "00000000" is assigned to the linear PCM audio encoding mode. A bit sequence of "00000001" is assigned to the Dolby digital encoding mode. A bit sequence of "00000010" is assigned to the MPEG-2 encoding mode without any extension. A bit sequence of "00000011" is assigned to the MPEG-2 encoding mode with an extension. A bit sequence of "00000100" is assigned to the DTS encoding mode. A bit sequence of "00000101" is assigned to the SDDS encoding mode.

Normally, the bits b127, b126, b125, b124, b123, b122, b121, and b120 in FIG. 51 are set to "00000000" representing the linear PCM audio encoding mode.

The quantization bit number Q which is represented by the bits b111, b110, b109, and b108 in FIG. 51 can be changed among 16 bits, 20 bits, and 24 bits. Specifically, a bit sequence of "0000" is assigned to 16 bits. A bit sequence of "0001" is assigned to 20 bits. A bit sequence of "0010" is assigned to 24 bits.

The sampling frequency "fs" which is represented by the bits b103, b102, b101, and b100 in FIG. 51 can be changed among 48 kHz, 96 kHz, 192 kHz, 44.1 kHz, 88.2 kHz, and 176.4 kHz. Specifically, a bit sequence of "0000" is assigned to 48 kHz. A bit sequence of "0001" is assigned to 96 kHz. A bit sequence of "0010" is assigned to 192 kHz. A bit sequence of "1000" is assigned to 44.1 kHz. A bit sequence of "1001" is assigned to 88.2 kHz. A bit sequence of "1010" is assigned to 176.4 kHz.

Normally, the bits b95, b94, and b93 in FIG. 51 are set to "000" representing that the multiple channel type agrees with a type "1".

The channel assignment represented by the bits b92, b91, b90, b89, and b88 in FIG. 51 is similar to that represented by the bits b92, b91, b90, b89, and b88 in FIG. 49, and can be changed among 21 different types shown in FIG. 50.

The decoding audio stream number represented by the bits b87, b86, and b85 in FIG. 51 is set to "0" or "1".

The DRC information represented by the bits b79 and b78 in FIG. 51 indicates either the presence of DRC data in an MPEG audio stream or the absence of DRC data from an MPEG audio stream. Specifically, a bit sequence of "00" is assigned to the absence of DRC data from the MPEG audio stream. A bit sequence of "01" is assigned to the presence of DRC data in the MPEG audio stream.

The compressed audio channel number represented by the bits b75, b74, b73, and b72 in FIG. 51 can be changed among "1", "2", "3", "4", "5", "6", "7", and "8". Specifically, a bit sequence "0000" is assigned to a channel number of "1". A bit sequence "0001" is assigned to a channel number of "2". A bit sequence "0010" is assigned to a channel number of "3". A bit sequence "0011" is assigned to a channel number of "4". A bit sequence "0100" is assigned to a channel number of "5". A bit sequence "0101" is assigned to a channel number of "6". A bit sequence "0110" is assigned to a channel number of "7". A bit sequence "0111" is assigned to a channel number of "8".

FIG. 52 shows the details of the 288-byte area for the multiple channel audio data down mix coefficients ATS-DM-COEFT#0-#15 in FIG. 48. The coefficients ATS-DM-COEFT#0-#15 are designed for down mix of multiple channel audio data into two channels. As shown in FIG. 52, the 288-byte area is divided into sixteen 18-byte sub areas. The first sub area is assigned to the coefficient ATS-DM-COEFT#0 for a table number of "0". The second sub area is assigned to the coefficient ATS-DM-COEFT#1 for a table number of "1". The third sub area is assigned to the coefficient ATS-DM-COEFT#2 for a table number of "2". The fourth sub area is assigned to the coefficient ATS-DM-COEFT#3 for a table number of "3". The fifth sub area is assigned to the coefficient ATS-DM-COEFT#4 for a table number of "4". The sixth sub area is assigned to the coefficient ATS-DM-COEFT#5 for a table number of "5". The seventh sub area is assigned to the coefficient ATS-DM-COEFT#6 for a table number of "6". The eighth sub area is assigned to the coefficient ATS-DM-COEFT#7 for a table number of "7". The ninth sub area is assigned to the coefficient ATS-DM-COEFT#8 for a table number of "8". The tenth sub area is assigned to the coefficient ATS-DM-COEFT#9 for a table number of "9". The eleventh sub area is assigned to the coefficient ATS-DM-COEFT#10 for a table number of "10". The twelfth sub area is assigned to the coefficient ATS-DM-COEFT#11 for a table number of "11". The thirteenth sub area is assigned to the coefficient ATS-DM-COEFT#12 for a table number of "12". The fourteenth sub area is assigned to the coefficient ATS-DM-COEFT#13 for a table number of "13". The fifteenth sub area is assigned to the coefficient ATS-DM-COEFT#14 for a table number of "14". The sixteenth sub area is assigned to the coefficient ATS-DM-COEFT#15 for a table number of "15".

Figures 53, 54:
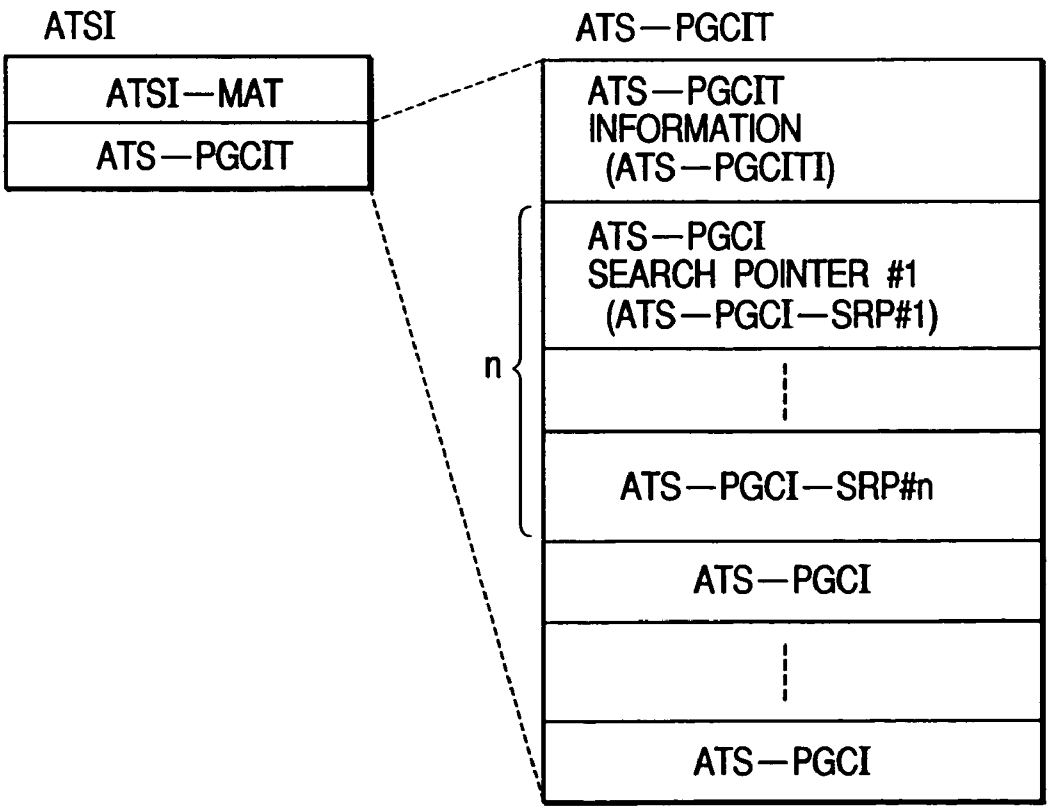
FIG. 53 is a diagram of the structure of an ATS-SPCT-ATR area.
FIG. 54 is a diagram of the structure of an ATS-PGCIT area.

FIG. 53 shows the details of the 2-byte AOTT AOBS still-picture data attribute ATS-SPCT-ATR in FIG. 48. As shown in FIG. 53, the 2-byte AOTT AOBS still-picture data attribute ATS-SPCT-ATR has a sequence of bits b15, b14, b13, . . . , b1, b0. A set of the bits b15 and b14 represents a video compression mode. A set of the bits b13 and b12 represents a television system. A set of the bits b11 and b10 represents an aspect ratio. A set of the bits b9 and b8 represents a display mode. A set of the bits b7 and b6 is reserved. A set of the bits b5, b4, and b3 represents a source picture resolution. A set of the bits b2, b1, and b0 is reserved.

The video compression mode represented by the bits b15 and b14 in FIG. 53 can be changed between an MPEG-1 type and an MPEG-2 type. Specifically, a bit sequence of "00" is assigned to the MPEG-1 type. A bit sequence of "01" is assigned to the MPEG-2 type.

The television system represented by the bits b13 and b12 in FIG. 53 can be changed between a 525/60 type and a 625/60 type. Specifically, a bit sequence of "00" is assigned to the 525/60 type. A bit sequence of "01" is assigned to the 625/60 type.

The aspect ratio represented by the bits b11 and b10 in FIG. 53 can be changed between a 4:3 type and a 16:9 type. Specifically, a bit sequence of "00" is assigned to the 4:3 type. A bit sequence of "11" is assigned to the 16:9 type.

The display mode represented by the bits b9 and b8 in FIG. 53 can be changed between a first type allowing only a letter box and a second type corresponding to no mention. Specifically, a bit sequence of "10" is assigned to the first type. A bit sequence of "11" is assigned to the second type.

The source picture resolution represented by the bits b5, b4, and b3 in FIG. 53 can be changed between a 720-by-480 type and a 720-by-576 type which correspond to the 525/60 television system and the 625/60 television system respectively. Specifically, a bit sequence of "000" is assigned to the 720-by-480 type. A bit sequence of "001" is assigned to the 720-by-576 type.

FIG. 54 shows the details of the audio title set program chain information table ATS-PGCIT in FIG. 32. As shown in FIG. 54, the audio title set program chain information table ATS-PGCIT has a sequence of audio title set PGCI table information ATS-PGCITI, audio title set PGCI search pointers ATS-PGCI-SRP#1-#n, and audio title set program chain information pieces ATS-PGCI.

As shown in FIG. 55, the audio title set PGCI table information ATS-PGCIT has 8 bytes. Specifically, the audio title set PGCI table information ATS-PGCIT has a sequence of a 2-byte area representing the audio title set PGCI search pointer (ATS-PGCI-SRP) number, a 2-byte reserved area, and a 4-byte area representing an ATS-PGCIT end address.

As shown in FIG. 56, each of the audio title set PGCI search pointers ATS-PGCI-SRP#1-#n has 8 bytes. Specifically, each of the audio title set PGCI search pointers ATS-PGCI-SRP#1-#n has a sequence of a 4-byte area representing an ATS-PGC category ATS-PGC-CAT, and a 4-byte area representing ATS-PGCI end address.

FIG. 57 shows the details of the ATS-PGC category ATS-PGC-CAT in FIG. 56. As shown in FIG. 57, the ATS-PGC category ATS-PGC-CAT has a sequence of 32 bits b31, b30, b29, . . . , b1, b0. The bit b31 represents an entry type. A set of the bits b30, b29, b28, b27, b26, b25, and b24 represents an ATS audio title number ATS-TTN. A set of the bits b23 and b22 represents a block mode. A set of the bits b21 and b20 represents a block type. A set of the bits b19, b18, b17, and b16 represents an audio channel number. A set of the bits b15, b14, b13, b12, b11, b10, b9, and b8 represents an audio encoding mode. A set of the bits b7, b6, b5, b4, b3, b2, b1, and b0 is reserved.

The entry type represented by the bit b31 in FIG. 57 can be changed between a first state not corresponding to an entry PGC and a second type corresponding to an entry PGC. Specifically, a bit of "0" is assigned to the first state. A bit of "1" is assigned to the second state.

The audio title number ATS-TTN represented by the bits b30, b29, b28, b27, b26, b25, and b24 in FIG. 57 can be changed in the range of "1" to "99".

The block mode represented by the bits b23 and b22 in FIG. 57 can be changed among a first type not corresponding to an ATS-PGC in an ATS-PGC block, a second type corresponding to a first ATS-PGC in an ATS-PGC block, and a third type corresponding to a final ATS-PGC in an ATS-PGC block. Specifically, a bit sequence of "00" is assigned to the first type. A bit sequence of "01" is assigned to the second type. A bit sequence of "11" is assigned to the third type.

The block type represented by the bits b21 and b20 FIG. 57 can be changed among a first state not corresponding to a part of the related block, a second state corresponding to a differential block of an audio encoding mode only, a third state corresponding to a differential block of an audio channel only, and a fourth state corresponding to a differential block of both an audio encoding mode and an audio channel. Specifically, a bit sequence of "00" is assigned to the first state. A bit sequence of "01" is assigned to the second state. A bit sequence of "10" is assigned to the third state. A bit sequence of "11" is assigned to the fourth state.

The audio channel number represented by the bits b19, b18, b17, and b16 in FIG. 57 can be changed between a first type indicating two channels or less and a second type indicating three or more channels.

Figures 58, 59:
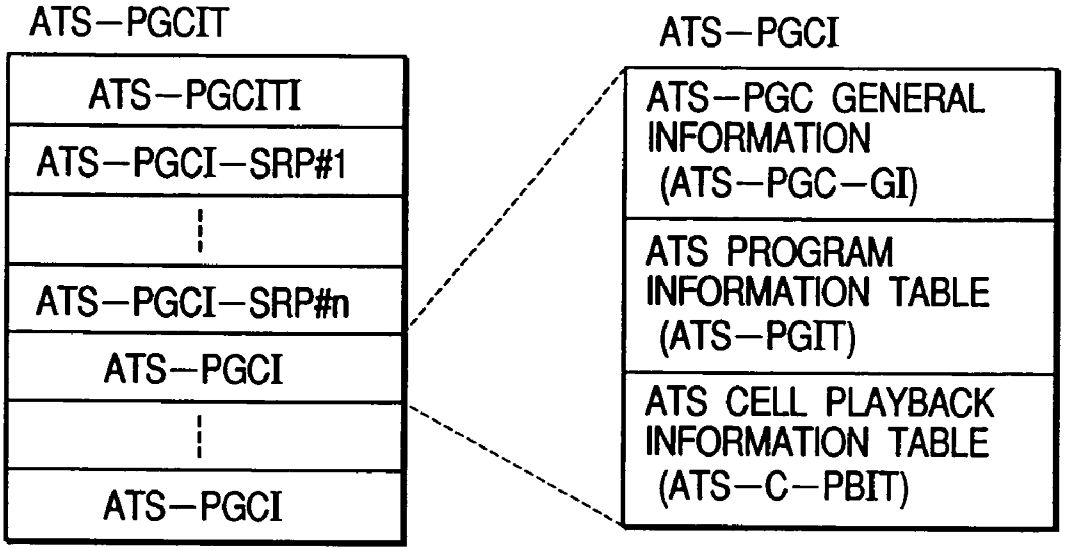
FIG. 58 is a diagram of the structure of an ATS-PGCI area.
FIG. 59 is a diagram of the structure of an ATS-PGC-GI area.

FIG. 58 shows the details of each of the audio title set program chain information pieces ATS-PGCI in FIG. 54. As shown in FIG. 58, each of the audio title set program chain information pieces ATS-PGCI has a sequence of ATS-PGC general information ATS-PGC-GI, an ATS program information table ATS-PGIT, and an ATS cell playback information table ATS-C-PBIT.

As shown in FIG. 59, the ATS-PGC general information ATS-PGC-GI has 16 bytes. The ATS-PGC general information ATS-PGC-GI has a sequence of a 4-byte area representing ATS-PGC contents ATS-PGC-CNT, a 4-byte area representing an ATS-PGC playback time ATS-PGC-PB-TM, a 2-byte reserved area, a 2-byte area representing an ATS-PGIT start address, a 2-byte area representing an ATS-C-PBIT start address, and a 2-byte reserved area.

Figure 60:
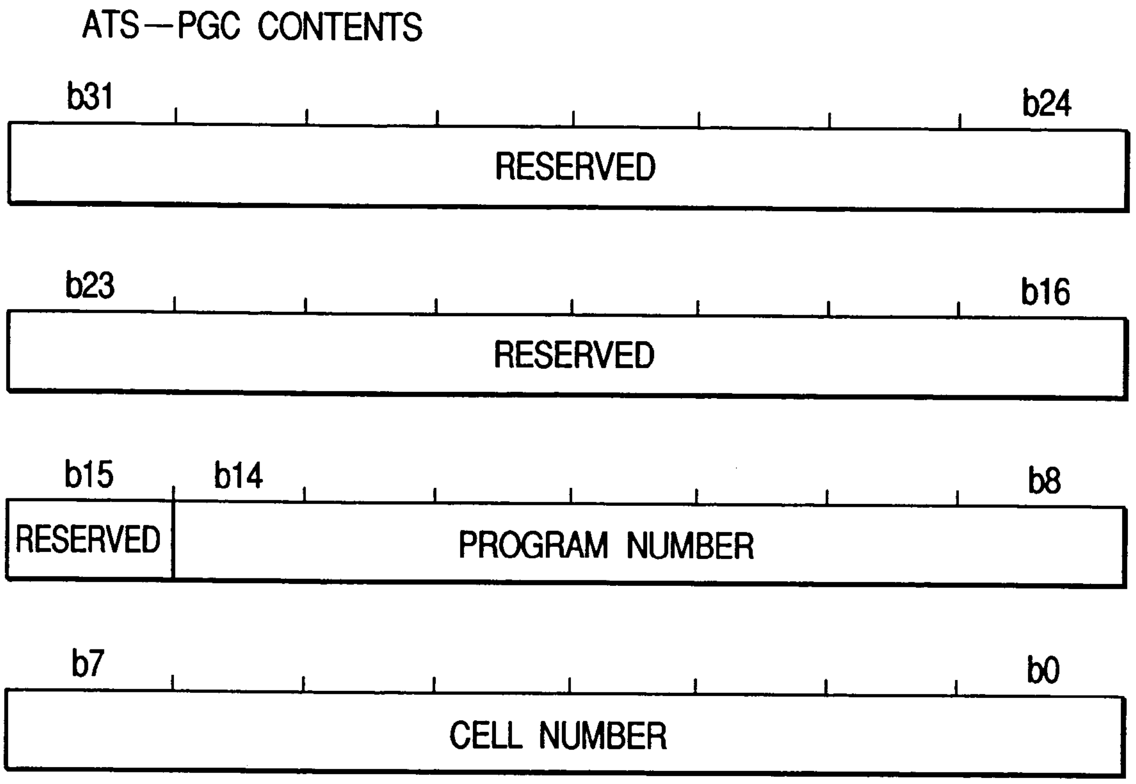
FIG. 60 is a diagram of the structure of ATS-PGC contents.

FIG. 60 shows the details of the ATS-PGC contents ATS-PGC-CNT in FIG. 59. As shown in FIG. 60, the ATS-PGC contents ATS-PGC-CNT has a sequence of 32 bits b31, b30, b29, . . . , b1, b0. A set of the bits b31, b30, b29, . . . , b16, and b15 is reserved. A set of the bits b14, b13, b12, b11, b10, b9, and b8 represents a program number (a tune number or a movement number) which can be changed in the range of "1" to "99". A set of the bits b7, b6, b5, b4, b3, b2, b1, and b0 represents a cell number which can be changed in the range of "1" to "255".

Figure 61:
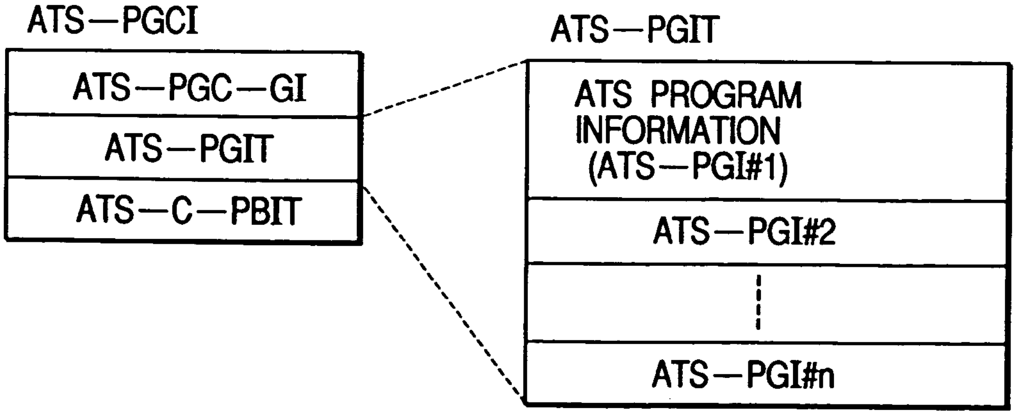
FIG. 61 is a diagram of the structure of an ATS-PGIT area.

FIG. 61 shows the details of the ATS program information table ATS-PGIT in FIG. 58. As shown in FIG. 61, the ATS program information table ATS-PGIT has a sequence of ATS program information pieces ATS-PGI#1-#n.

As shown in FIG. 62, each of the ATS program information pieces ATS-PGI#1-#n has 20 bytes. Specifically, each of the ATS program information pieces ATS-PGI#1-#n has a sequence of a 4-byte area representing ATS-PG contents ATS-PG-CNT, a 1-byte area representing an ATS-PG entry cell number, a 1-byte reserved area, a 4-byte area representing a first ATS-PG audio cell start presentation time FAC-S-PTM, a 4-byte area representing an ATS-PG playback time, a 4-byte area representing an ATS-PG pause time, a 1-byte area assigned to copyright management information CMI, and a 1-byte reserved area. The 1-byte area for copyright management information CMI may be used as a reserved area.

FIG. 63 shows the details of the ATS-PG contents ATS-PG-CNT in FIG. 62. As shown in FIG. 63, the ATS-PG contents ATS-PG-CNT has a sequence of 32 bits b31, b30, b29, . . . , b1, b0. The bit b31 represents the relation R/A between the present PG and the preceding PG. The bit b30 represents an STC discontinuity flag STC-F. A set of the bits b29, b28, and b27 represents an attribute number ATRN. A set of the bits b26, b25, and b24 represents bit shift data for the channel group "2". A set of the bits b23 and b22 is reserved. The bit b21 represents a down mix mode D-M. The bit 20 represents the effectiveness of down mix coefficients. A set of the bits b19, b18, and b17 represents a down mix coefficient table number DM-COEFTN. The bits b15, b14, b13, . . . , b1, and b0 represent RTI flags F15, F14, F13, . . . , F1, and F0 respectively.

Figures 64, 65, 66:
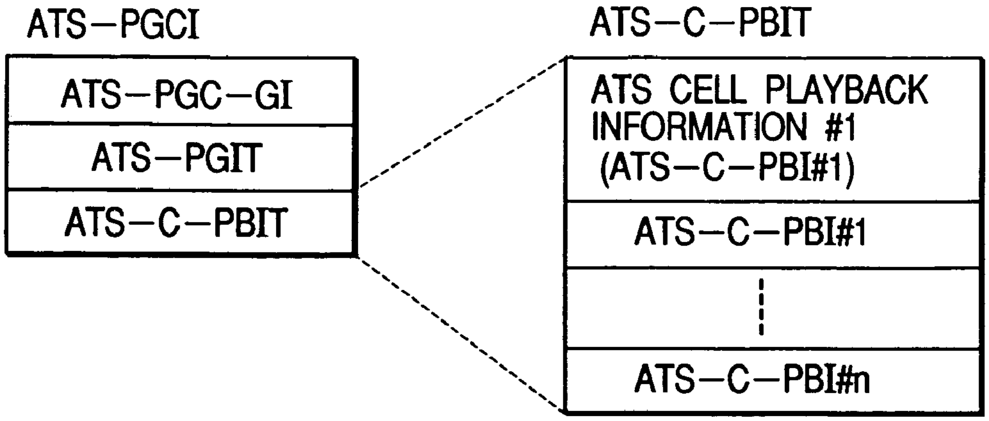
FIG. 64 is a diagram of the structure of an ATS-C-PBIT area.
FIG. 65 is a diagram of the structure of an ATS-C-PBI area.
FIG. 66 is a diagram of the structure of an ATS-C-TY area.

FIG. 64 shows the details of the ATS cell playback information table ATS-C-PBIT in FIG. 58. As shown in FIG. 64, the ATS cell playback information table ATS-C-PBIT has a sequence of ATS cell playback information pieces ATS-C-PBI#1-#n.

As shown in FIG. 65, each of the ATS cell playback information pieces ATS-C-PBI#1-#n has 12 bytes. Specifically, each of the ATS cell playback information pieces ATS-C-PBI#1-#n has a sequence of a 1-byte area representing an ATS-C index number, a 1-byte area representing an ATS-C type ATS-C-TY, a 2-byte reserved area, a 4-byte area representing an ATS-C start address, and a 4-byte area representing an ATS-C end address.

FIG. 66 shows the details of the ATS-C type ATS-C-TY in FIG. 65. As shown in FIG. 66, the ATS-C type ATS-C-TY has a sequence of eight bits b7, b6, b5, b4, b3, b2, b1, and b0. A set of the bits b7 and b6 represents an ATS cell composition ATS-C-COMP. A set of the bits b5 and b4 is reserved. A set of the bits b3, b2, b1, and b0 represents an ATS cell usage ATS-C-Usage.

The ATS cell composition ATS-C-COMP represented by the bits b7 and b6 in FIG. 66 can be changed among a first type corresponding to an audio cell composed of audio data only, a second type corresponding to an audio cell composed of both audio data and real-time information, a third type corresponding to a silence cell composed of only audio data for silence, and a fourth type corresponding to a picture cell composed of still-picture data only. A bit sequence of "00" is assigned to the first type. A bit sequence of "01" is assigned to the second type. A bit sequence of "10" is assigned to the third type. A bit sequence of "11" is assigned to the fourth type.

The ATS cell usage ATS-C-Usage represented by the bits b3, b2, b1, and b0 in FIG. 66 can be changed between a first type corresponding to no mention and a second type corresponding to a spot light part. A bit sequence of "0000" is assigned to the first type. A bit sequence of "0001" is assigned to the second type.

Figure 67:
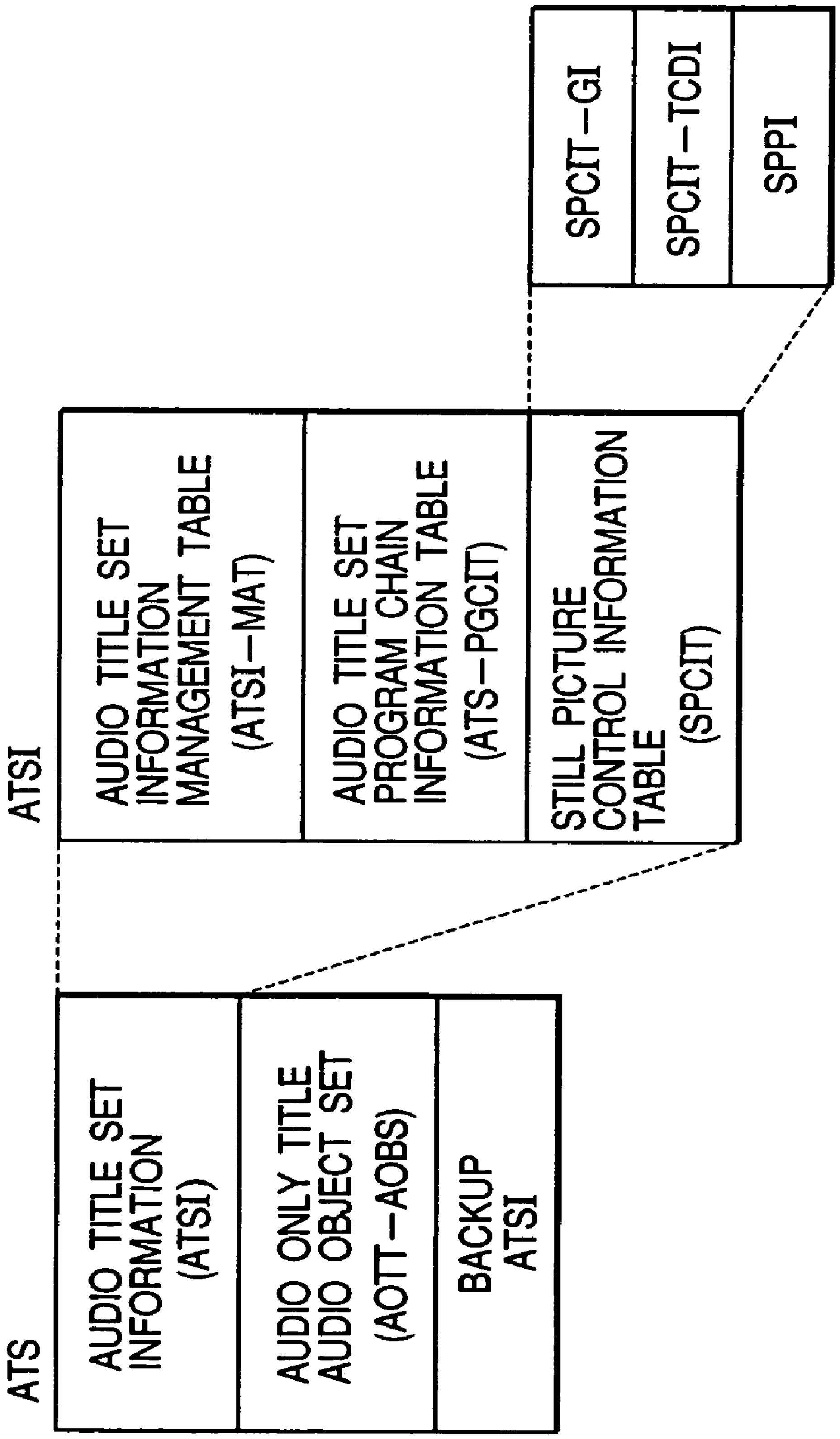
FIG. 67 is a diagram of the structure of an ATSI area.

The audio title set information ATSI in FIG. 32 may be replaced by audio title set information ATSI in FIG. 67. The audio title set information ATSI in FIG. 67 has a sequence of an audio title set information management table ATSI-MAT, an audio title set program chain information table ATS-PGCIT, and a still-picture control information table SPCIT. The still-picture control information table SPCIT has a sequence of SPCIT general information SPCIT-GI, SPCIT time control data information SPCIT-TCDI, and still-picture page control command information SPPI.

Eighth Embodiment

Figure 68:
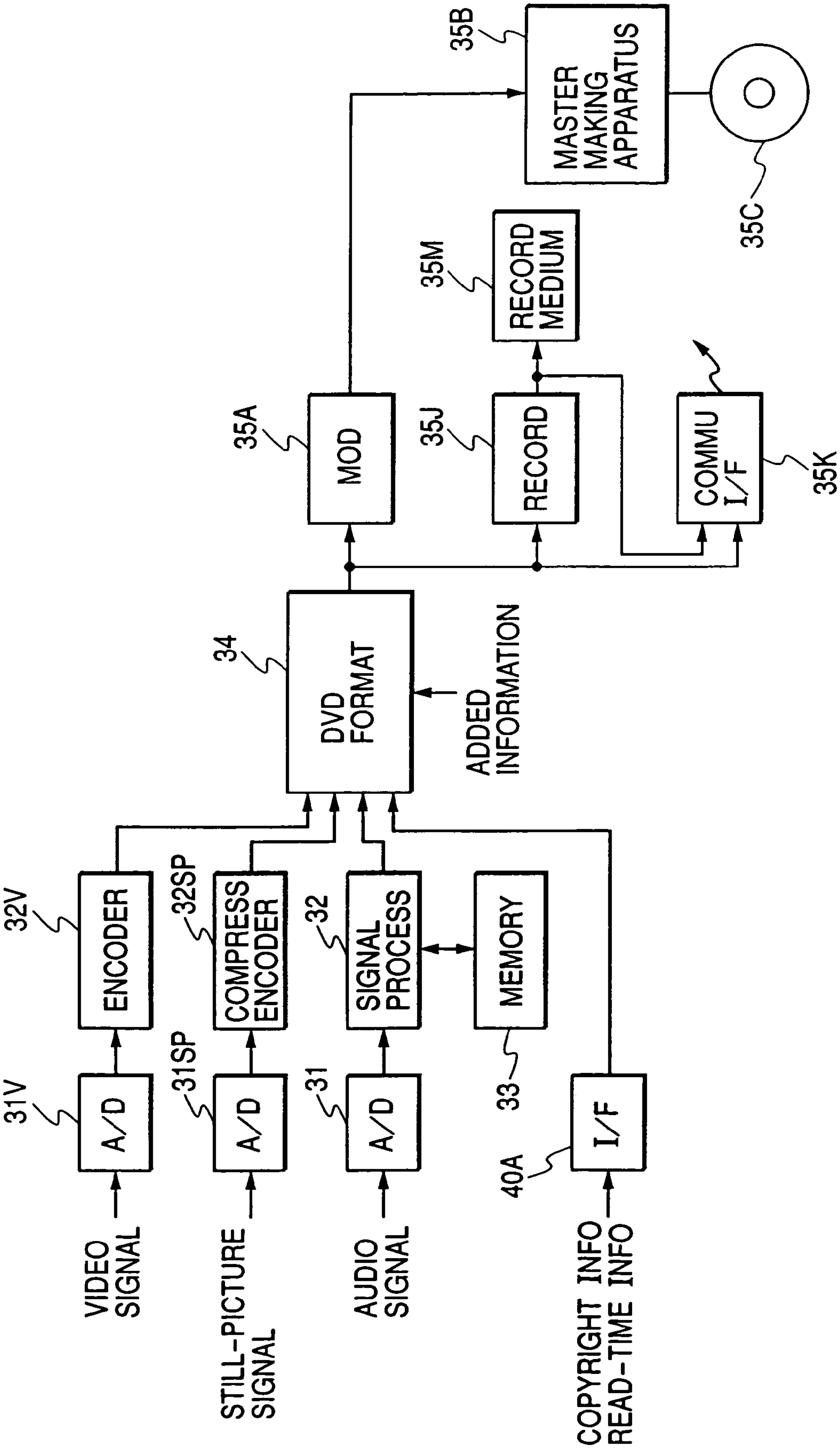
FIG. 68 is a block diagram of an audio-signal encoding apparatus according to an eighth embodiment of this invention.

FIG. 68 shows an audio-signal encoding apparatus according to an eighth embodiment of this invention. The apparatus of FIG. 68 includes analog-to-digital (A/D) converters 31, 31V, and 31SP, a signal processing circuit 32, a video encoder 32V, a compressive encoder 32SP, a memory 33, a DVD formatting section 34, and an interface 40A.

An analog video signal is applied to the A/D converter 31V. The A/D converter 31V is followed by the video encoder 32V. The video encoder 32V is followed by the DVD formatting section 34.

An analog audio signal is applied to the A/D converter 31. In general, the analog audio signal has multiple channels including, for example, front and rear channels. The analog audio signal may be of the monaural type. The A/D converter 31 is followed by the signal processing circuit 32. The memory 33 is connected to the signal processing circuit 32. The signal processing circuit 32 and the memory 33 cooperate to implement desired signal processing. The memory 33 may be incorporated in the signal processing circuit 32 similarly to a conventional design. The signal processing circuit 32 is followed by the DVD formatting section 34.

An analog still-picture signal is applied to the A/D converter 31SP. The A/D converter 31SP is followed by the compressive encoder 32SP. The compressive encoder 32SP is followed by the DVD formatting section 34.

Copyright information and real-time text information (real-time information) are applied to the interface 40A. The interface 40A is followed by the DVD formatting section 34.

The DVD formatting section 34 is successively followed by a modulation circuit 35A and a master making apparatus 35B.

The A/D converter 31 samples the analog audio signal at a given sampling frequency "fs" (for example, 192 kHz), and changes every sample of the analog audio signal into a corresponding digital sample. Thus, the A/D converter 31 changes the analog audio signal into a corresponding digital audio signal (for example, a PCM audio signal) with a given quantization bit number (for example, 24 bits). In other words, the A/D converter 31 quantizes the analog audio signal into the corresponding digital audio signal. The quantization implemented by the A/D converter 31 may vary from channel to channel. For example, the A/D converter 31 quantizes front-channel components of the analog audio signal at a first predetermined sampling frequency and a first predetermined quantization bit number. The A/D converter 31 quantizes rear-channel components of the analog audio signal at a second predetermined sampling frequency and a second predetermined bit number which are equal to or different from the first predetermined sampling frequency and the first predetermined quantization bit number respectively. The A/D converter 31 outputs the digital audio signal to the signal processing circuit 32.

Operation of the signal processing circuit 32 can be changed between first and second modes which correspond to the absence and the presence of thinning (or decimation) respectively.

During operation of the signal processing circuit 32 in the first mode (the absence of thinning or decimation), the digital audio signal is transmitted from the A/D converter 31 to the DVD formatting section 34 without being processed.

During operation of the signal processing circuit 32 in the second mode (the presence of thinning or decimation), the digital audio signal is compressed by the signal processing circuit 32. The signal compression implemented by the signal processing circuit 32 is based on a decimating process or a bit shifting process. The compression-resultant digital audio signal is fed from the signal processing circuit 32 to the DVD formatting section 34. Preferably, audio data of channels in a group "2" is compressed by the signal processing circuit 32.

The A/D converter 31V changes the analog video signal into a corresponding digital video signal for a menu picture which corresponds to an audio manager menu AMGM. The A/D converter 31V outputs the digital video signal to the video encoder 32V. The video encoder 32V changes the digital video signal into an MPEG-format video signal. The video encoder 32V outputs the MPEG-format video signal to the DVD formatting section 34.

The A/D converter 31SP changes the analog still-picture signal into a corresponding digital still-picture signal. The A/D converter 31SP outputs the digital still-picture signal to the compressive encoder 32SP. The compressive encoder 32SP changes the digital still-picture signal into an MPEG-format still-picture signal. The compressive encoder 32SP outputs the MPEG-format still-picture signal to the DVD formatting section 34.

The copyright information and the real-time text information are transmitted to the DVD formatting section 34 via the interface 40A.

The DVD formatting section 34 receives character information, disc identifier information, and control data from suitable devices (not shown). The control data represents display time information, sampling-frequency information, quantization-bit-number information, thinning information (decimating information), and other information to be added. The DVD formatting section 34 packs the digital audio signal, the MPEG-format video signal, the MPEG-format still-picture signal, the copyright information, the real-time text information, the character information, the disc identifier information, and the control data into a composite signal of the DVD-Audio format in the embodiment of FIGS. 32-67.

The DVD formatting section 34 outputs the composite signal of the DVD-Audio format to the modulation circuit 35A. The modulation circuit 35A subjects the composite signal of the DVD-Audio format to given modulation (for example, EFM modulation) suited to a DVD-Audio. The modulation circuit 35A outputs the modulation-resultant signal to the master making apparatus 35B. The apparatus 35B makes a master disc 35C in response to the output signal of the modulation circuit 35A. The maser disc 35C stores the output signal of the modulation circuit 35A. DVD-Audios are made by a DVD making apparatus (not shown) on the basis of the master disc 35C.

A recording and reproducing apparatus 35J may follow the DVD formatting section 34. The recording and reproducing apparatus 35J receives the composite signal of the DVD-Audio format from the DVD formatting section 34. The recording and reproducing apparatus 35J records the composite signal of the DVD-Audio format on a suitable recording medium 35M. The recording and reproducing apparatus 35J reproduces the composite signal of the DVD-Audio format from the recording medium 35M. The recording and reproducing apparatus 35J outputs the reproduced composite signal of the DVD-Audio format.

A communication interface 35K may be connected to the DVD formatting section 34 and the recording and reproducing apparatus 35J. The communication interface 35K receives the composite signal of the DVD-Audio format from the DVD formatting section 34 or the recording and reproducing apparatus 35J. The communication interface 35K transmits the composite signal of the DVD-Audio format to a communication line (including a radio communication line).

The audio-signal encoding apparatus of FIG. 68 may be formed by a computer-based apparatus which operates in accordance with a computer program stored in an internal memory. In this case, a recording medium may be prepared which stores the control program. The internal memory of the computer-based apparatus is loaded with the computer program from the recording medium, and then the computer-based apparatus is started to implement a desired encoding process in accordance with the computer program.

The audio-signal encoding apparatus of FIG. 68 can also be used in providing DVD-Audios in later embodiments of this invention.

Ninth Embodiment

Figure 69:
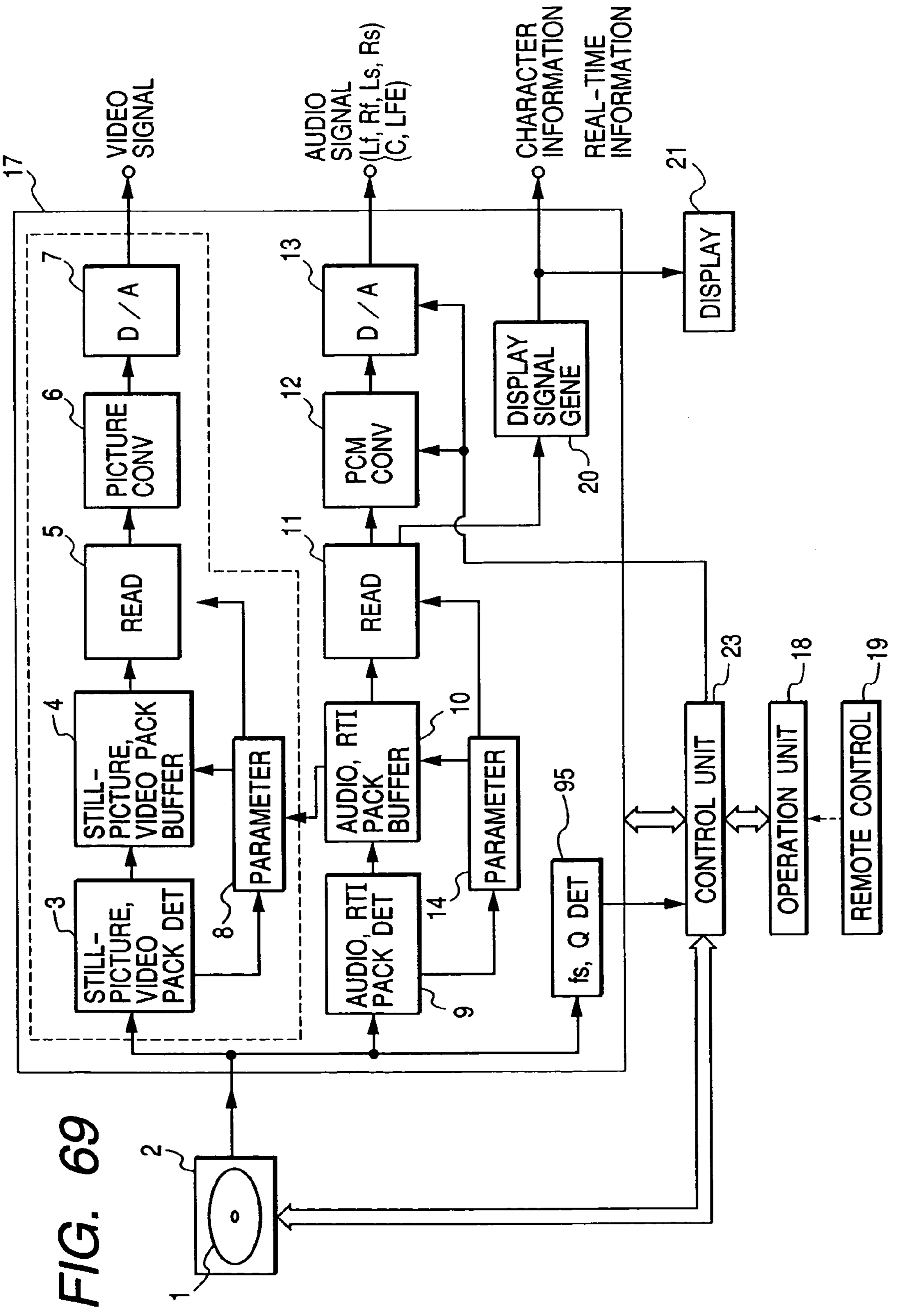
FIG. 69 is a block diagram of a DVD-Audio player including an audio-signal decoding apparatus according to a ninth embodiment of this invention.

FIG. 69 shows a DVD-Audio player including an audio-signal decoding apparatus according to a ninth embodiment of this invention. The player in FIG. 69 is designed for a DVD-Audio in the embodiment of FIGS. 32-67. The player in FIG. 69 can also be used for playback of information from DVD-Audios in later embodiments of this invention.

The player in FIG. 69 operates on a DVD-Audio 1. The player in FIG. 69 includes an operation unit 18 and a remote control unit 19. The remote control unit 19 can communicate with the operation unit 18 by wireless. The operation unit 18 is connected to a control unit 23. The control unit 23 includes a CPU. The control unit 23 is connected to a drive unit 2 and a reproduced signal processing unit 17. The drive unit 2 is connected to the reproduced signal processing unit 17.

The CPU 23 operates in accordance with a control program stored in an internal ROM. When the user actuates the operation unit 18 or the remote control unit 19 to request tune selection, playback, fast feed, or stop, the CPU 23 controls the drive unit 2 and the reproduced signal processing unit 17 to implement the requested operation mode.

During playback, the drive unit 2 reads out a signal from the DVD-Audio 1. The drive unit 2 includes a demodulator which subjects the readout signal to given demodulation (for example, EFM demodulation). The drive unit 2 outputs the demodulation-resultant signal to the reproduced signal processing unit 17 as a reproduced signal.

The reproduced signal processing circuit 17 includes a video and still-picture pack detector 3 which receives the reproduced signal from the drive unit 2. The video and still-picture pack detector 3 detects video packs V and still-picture packs SPCT in the reproduced signal. The video and still-picture pack detector 3 generates control parameters in response to the detected video packs V and the detected still-picture packs SPCT. The video and still-picture pack detector 3 sets the control parameters in a parameter unit (a parameter memory) 8. The video and still-picture pack detector 3 sequentially writes the video packs V and the still-picture packs SPCT into a video and still-picture pack buffer 4.

The reproduced signal processing circuit 17 includes a reading unit 5 connected to the video and still-picture pack buffer 4. The reading unit 5 reads out user data and still-picture data from the video packs V and the still-picture packs SPCT in the video and still-picture pack buffer 4 in an order determined by SCR information (see FIG. 14) in each of the video packs V and the still-picture packs SPCT. The reading unit 5 outputs a stream of the user data and the still-picture data to a picture converter 6. The picture converter 6 changes the user and still-picture data stream into a corresponding digital video signal. The picture converter 6 outputs the digital video signal to a digital-to-analog (D/A) converter 7. The D/A converter 7 changes the digital video signal into a corresponding analog video signal. The D/A converter 7 outputs the analog video signal to an external device (not shown).

The reproduced signal processing circuit 17 includes an audio and RTI pack detector 9 which receives the reproduced signal from the drive unit 2. The audio and RTI pack detector 9 detects audio packs A and real-time information packs RTI in the reproduced signal. The audio and RTI pack detector 9 generates control parameters in response to the detected audio packs A and the detected real-time information packs RTI. The audio and RTI pack detector 9 sets the control parameters in a parameter unit (a parameter memory) 14. The audio and RTI pack detector 9 sequentially writes the audio packs A and the real-time information packs RTI into an audio and RTI pack buffer 10.

The reproduced signal processing circuit 17 includes a reading unit 11 connected to the audio pack buffer 10. The reading unit 11 reads out user data (audio data) from the audio packs A in the audio and RTI pack buffer 10 in an order determined by SCR information (see FIG. 14) in each of the audio packs A. The reading unit 11 outputs a stream of the user data (the audio data) to a PCM converter 12. The PCM converter 12 changes the user data stream (the audio data stream) into a corresponding digital audio signal by a PCM decoding process. The PCM converter 12 outputs the digital audio signal to a digital-to-analog (D/A) converter 13. The D/A converter 13 changes the digital audio signal into a corresponding analog audio signal. The analog audio signal has, for example, a left front channel Lf, a right front channel Rf, a left surround channel Ls, a right surround channel Rs, a center channel C, and a low frequency effect channel LFE. The D/A converter 13 outputs the analog audio signal to an external device (not shown).

In addition, the reading unit 11 reads out real-time information (audio character display information or ACD information) from the real-time information packs RTI in the audio and RTI pack buffer 10 in an order determined by ISCR information in each of the real-time information packs RTI. The reading unit 11 outputs the real-time information to a display signal generator 20. The display signal generator 20 converts the real-time information into a corresponding display signal. The display signal generator 20 outputs the display signal to a display device 21. The display device 21 indicates the display signal. The display signal generator 20 may output the display signal to an external device (not shown).

The reproduced signal processing unit 17 includes a detector 95 which receives the reproduced signal from the drive unit 2. The detector 95 extracts information of sampling frequencies "fs" (fs1 and fs2) and information of quantization bit numbers Q (Q1 and Q2) from the reproduced signal. The detector 95 feeds the information of the sampling frequencies "fs" (fs1 and fs2) and the information of the quantization bit numbers Q (Q1 and Q2) to the CPU 23. The CPU 23 controls the PCM converter 12 and the D/A converter 13 in response to the information of the sampling frequencies "fs" (fs1 and fs2) and the information of the quantization bit numbers Q (Q1 and Q2). Accordingly, conditions of the inverse quantization (the signal decoding) implemented by the PCM converter 12 and the D/A converter 13 depend on the information of the sampling frequencies "fs" (fs1 and fs2) and the information of the quantization bit numbers Q (Q1 and Q2). Thus, the inverse quantization can be on a channel by channel basis or a channel-group by channel-group basis.

The audio-signal decoding apparatus in FIG. 69 may be modified to have a read/write memory which stores the control program for the CPU 23. A recording medium may be prepared which stores the control program for the CPU 23. In this case, the read/write memory in the audio-signal decoding apparatus is loaded with the control program from the recording medium, and then the CPU 23 in the audio-signal decoding apparatus is started to implement a desired encoding process in accordance with the control program.

Tenth Embodiment

Figure 70:
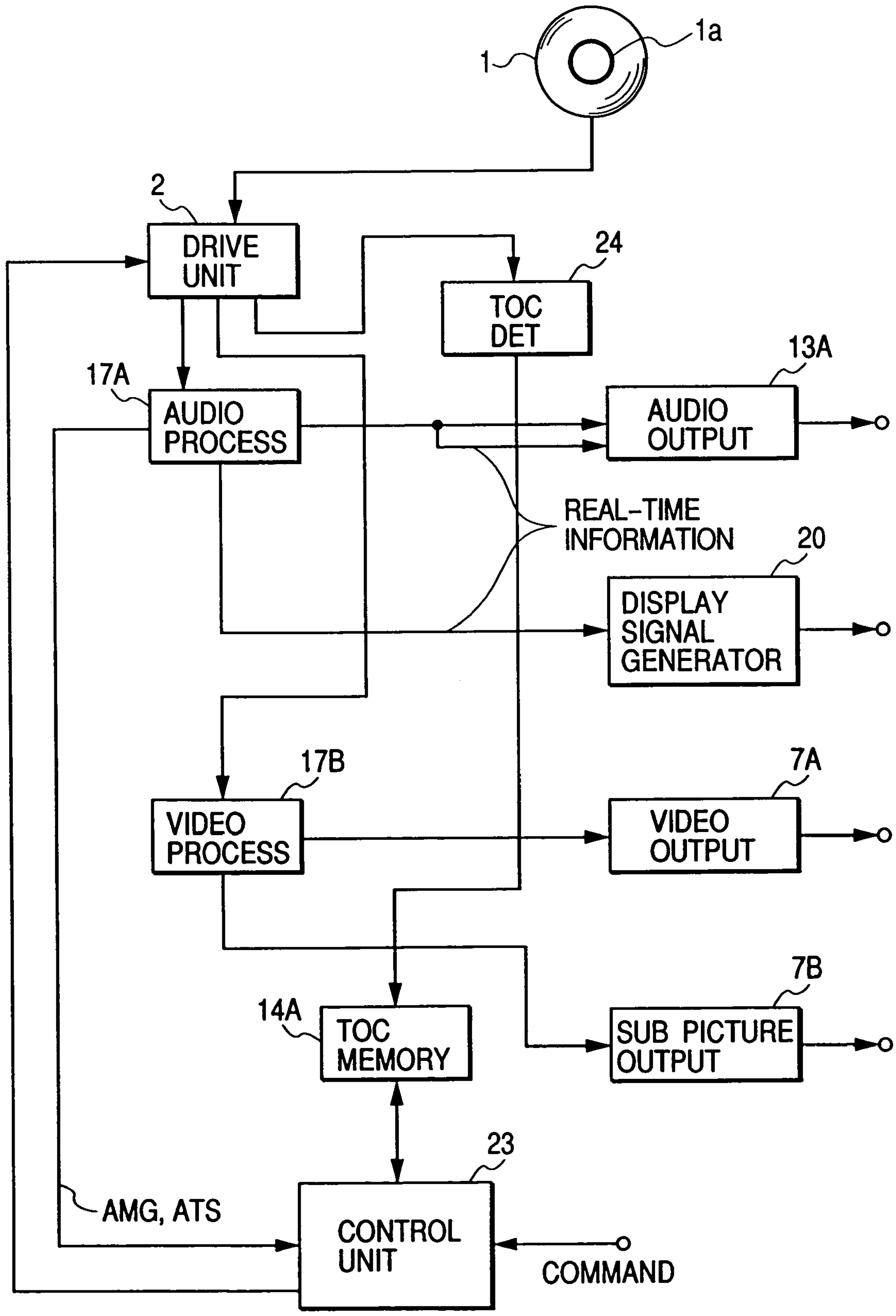
FIG. 70 is an operation flow diagram of a DVD-Audio player including an audio-signal decoding apparatus according to a tenth embodiment of this invention.

FIG. 70 shows a DVD-Audio player including an audio-signal decoding apparatus according to a tenth embodiment of this invention. The player in FIG. 70 is basically similar to the player in FIG. 69.

The player in FIG. 70 operates on a DVD-Audio 1 which has a TOC area 1*a* loaded with TOC information. The TOC area 1*a* may be included in the lead-in area of the DVD-Audio 1. The player in FIG. 70 includes a control unit 23 connected to an operation unit (not shown). The control unit 23 includes a CPU. A remote control unit (not shown) can communicate with the operation unit by wireless. The control unit 23 is connected to a drive unit 2.

The drive unit 2 is connected to a TOC detector 24, an audio processing block 17A, and a video processing block 17B. The TOC detector 24 is connected to a memory 14A. The memory 14A is connected to the control unit 23. The audio processing block 17A is connected to the control unit 23. The audio processing block 17A is connected to an audio output block 13A and a display signal generator 20. The video processing block 17B is connected to a video output block 7A and a sub picture output block 7B.

When the DVD-Audio 1 is set in position within the player of FIG. 70, the drive unit 2 reads out a signal from the TOC area 1*a* of the DVD-Audio 1. The drive unit 2 outputs the readout signal to the TOC detector 24. The TOC detector 24 detects TOC information in the readout signal. The TOC detector 24 stores the detected TOC information into the memory 14A.

When the user actuates the operation unit or the remote control unit to select a desired tune, the control unit 23 refers to the TOC information in the memory 14A and controls the drive unit 2 in response to the TOC information to start playback of the desired tune from its head.

During playback, the drive unit 2 reads out a signal from the DVD-Audio 1. The drive unit 2 outputs the readout signal to the audio processing block 17A and the video processing block 17B as a reproduced signal. The audio processing block 17A separates audio data from the reproduced signal. The audio processing block 17A feeds the audio data to the audio output device 13A. The audio output device 13A converts the audio data into a corresponding audio signal. The audio output device 13A feeds the audio signal to an external device (not shown). In addition, the audio processing block 17A separates real-time information (audio character display information) from the reproduced signal. The audio processing block 17A feeds the real-time information to the display signal generator 20. The audio processing block 17A may feed the real-time information to the audio output block 13A. The display signal generator 20 converts the real-time information into a corresponding display signal. The display signal generator 20 feeds the display signal to an external device (not shown). Furthermore, the audio processing block 17A separates an audio manager AMG and audio title sets ATS from the reproduced signal. The audio processing block 17A feeds the audio manager AMG and the audio title sets ATS to the control unit 23.

During playback, the video processing block 17B separates video data and still-picture data from the reproduced signal. The video processing block 17B feeds the video data and the still-picture data to the video output block 7A. The video output block 7A converts the video data and the still-picture data into a corresponding video signal. The video output device 7A feeds the video signal to an external device (not shown). In addition, the video processing block 17B separates sub picture information from the reproduced signal. The video processing block 17B feeds the sub picture information to the sub picture output block 7B. The sub picture output block 7B converts the sub picture information into a corresponding sub picture signal. The sub picture output block 7B feeds the sub picture signal to an external device (not shown).

The operation of the player in FIG. 70 will be further explained below. During playback, the DVD-Audio 1 is accessed while data is read out therefrom. The readout data is separated into a video signal, a still-picture signal, an audio signal, a copyright information signal, a real-time text information signal, a character information signal, and a disc identifier information signal. The video signal is decoded into a decoding-resultant video signal. The still-picture signal is decoded into a decoding-resultant still picture signal. The audio signal is decoded into a decoding-resultant audio signal. The copyright information signal is decoded into a decoding-resultant copyright information signal. The real-time text information signal is decoded into a decoding-resultant real-time text information signal. The character information signal is decoded into a decoding-resultant character information signal. The disc identifier information signal is decoded into a decoding-resultant disc identifier information signal. The decoding-resultant video signal, the decoding-resultant still picture signal, the decoding-resultant audio signal, the decoding-resultant copyright information signal, the decoding-resultant real-time text information signal, the decoding-resultant character information signal, and the decoding-resultant disc identifier information signal are subjected to a synchronously reproducing process to recover original information signals in a proper timing relation.

The reproducing process on the decoding-resultant still-picture signal can be changed among the following three types 1), 2), and 3).

1) When the still-picture signal is provided, the reproducing process on the audio signal is interrupted and an audio muting process is implemented.
2) When the still-picture signal is provided, the reproducing process on the still-picture signal is implemented together with the reproducing process on the audio signal in response to a time control signal. This type of the reproducing process is referred to as "slide shows".
3) When the still-picture signal is provided, the reproducing process on the still-picture signal is implemented on a page change basis in response to a page change command given by a user. In this case, the reproducing process on the audio signal is continued as it is. This type of the reproducing process is referred to as "browsable pictures".

Generally, the time control signal which has been mentioned regarding the above-indicated type 2) is placed in the SPCIT time control data information SPCIT-TCDI (see FIG. 67). The page change command which has been mentioned regarding the above-indicated type 3) is placed in the still-picture page control command information SPPI (see FIG. 67).

It should be noted that side information for still-picture page control may be contained in the still-picture data in a still-picture pack SPCT (see FIG. 47). Alternatively, side information for still-picture page control may be contained in the real-time data in a real-time information pack RTI (see FIG. 46).

Eleventh Embodiment

Figure 71:
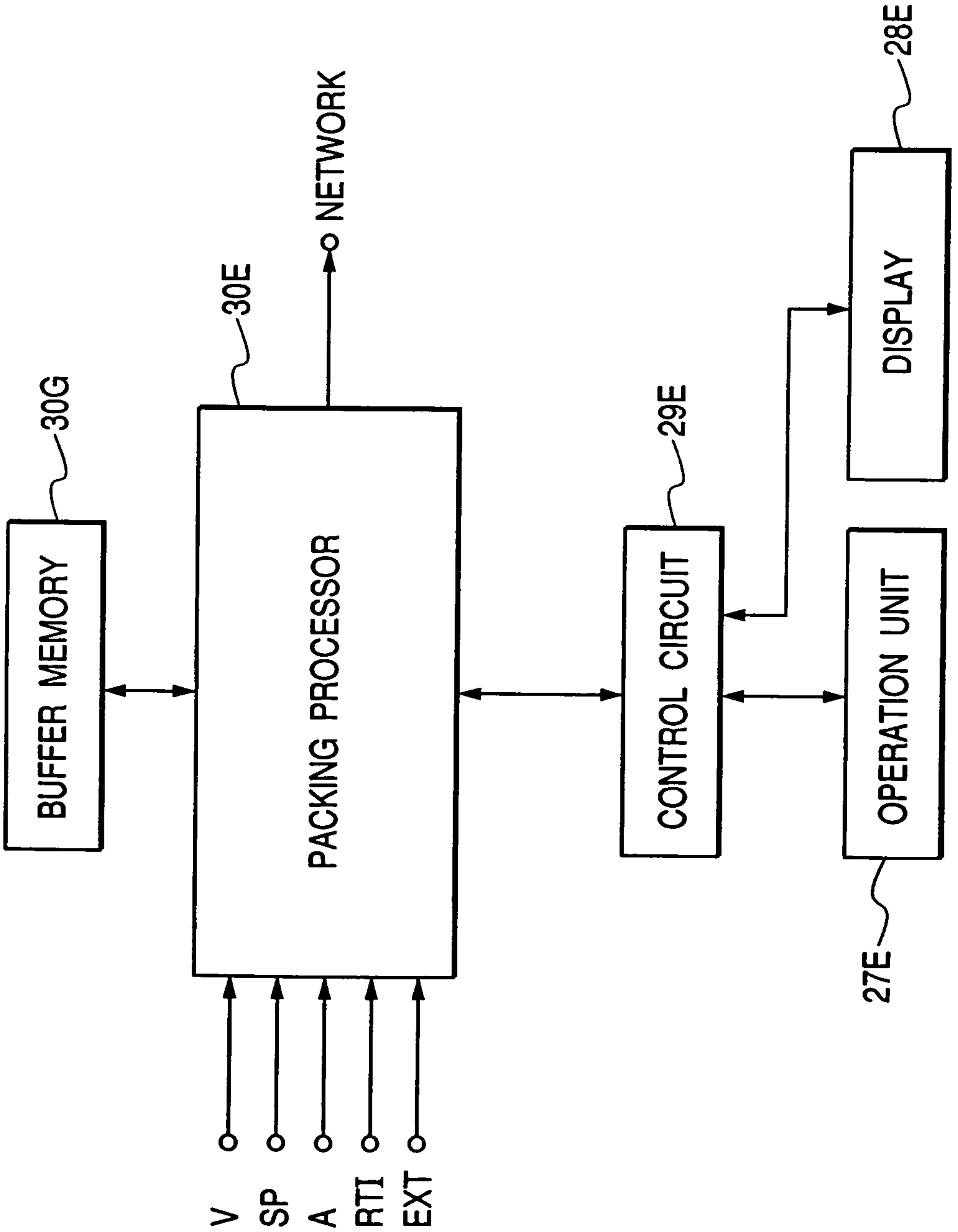
FIG. 71 is a block diagram of a packing apparatus according to an eleventh embodiment of this invention.

FIG. 71 shows a packing apparatus according to an eleventh embodiment of this invention. The packing apparatus of FIG. 71 includes a packing processor 30E, a buffer memory 30G, a control circuit 29E, an operation unit 27E, and a display device 28E. The packing processor 30E is connected to the buffer memory 30G and the control circuit 29E. The packing processor 30E is connected to a network via an interface (not shown). The control circuit 29E is connected to the operation unit 27E and the display device 28E.

The packing processor 30E receives a video signal "V", a still-picture signal "SP", an audio signal "A", a real-time information signal "RTI", and a disc identifier signal "EX". The packing processor 30E processes the video signal "V", the still-picture signal "SP", the audio signal "A", the real-time information signal "RTI", and the disc identifier signal "EXT" into a processing-resultant signal under the control by the control circuit 29E. The packing processor 30E outputs the processing-resultant signal to, for example, a transmission line, a communication network, or a signal recording apparatus.

Figure 72:
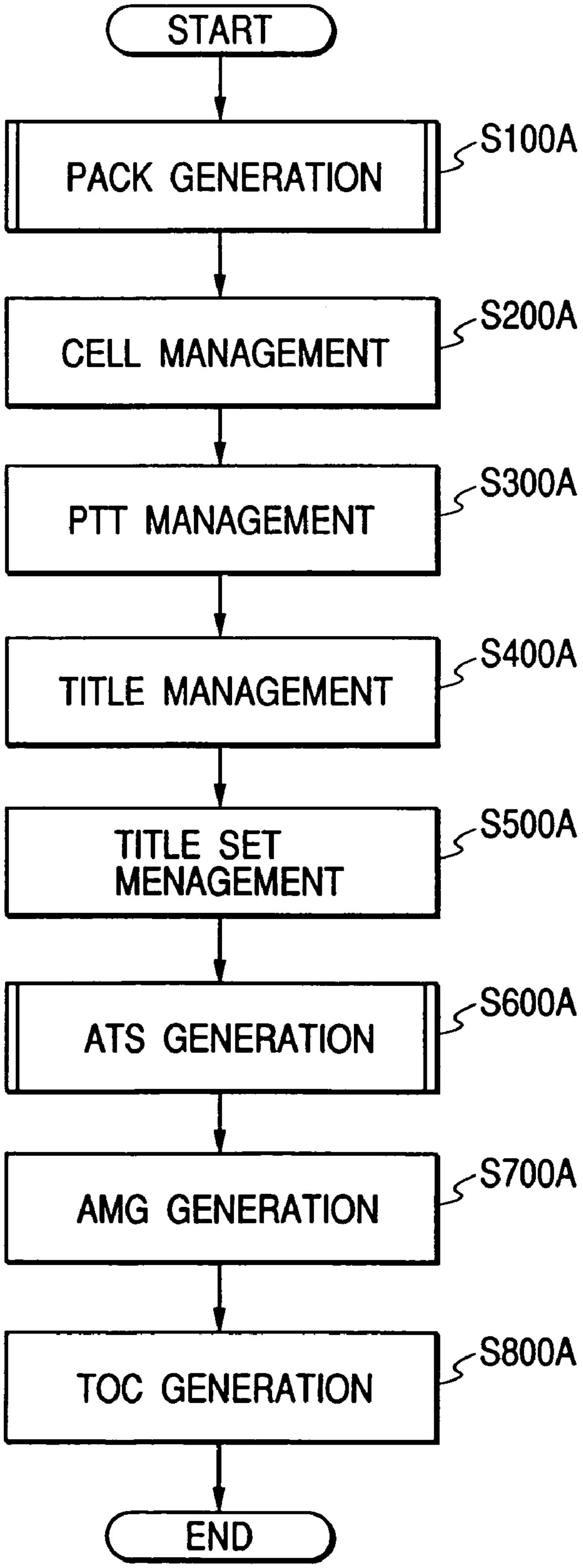
FIG. 72 is a flowchart of a first segment of a control program for a control circuit in FIG. 71.

The control circuit 29E includes a CPU which operates in accordance with a control program stored in an internal ROM. FIG. 72 is a flowchart of a segment of the control program for the control circuit 29E.

As shown in FIG. 72, a first block S100A of the program segment generates audio packs, video packs, still-picture packs, and a real-time text in response to the video signal "V", the still-picture signal "SP", the audio signal "A", the real-time information signal "RTI", and the disc identifier signal "EXI".

A step S200A following the block S100A manages cells ATS-C. A step S300A subsequent to the step S200A manages parts of titles PTT. A step S400A following the step S300A manages audio-only-title audio-objects AOTT-AOB. A step S500A subsequent to the step S400A manages an audio-only-title audio-object-set AOTT-AOBS.

A block S600A following the step S500A generates audio title sets ATS. A step S700A subsequent to the block S600A generates an audio manager AMG. A step S800A following the step S700A generates TOC information. After the step S800A, the execution of the program segment ends.

Figure 73:
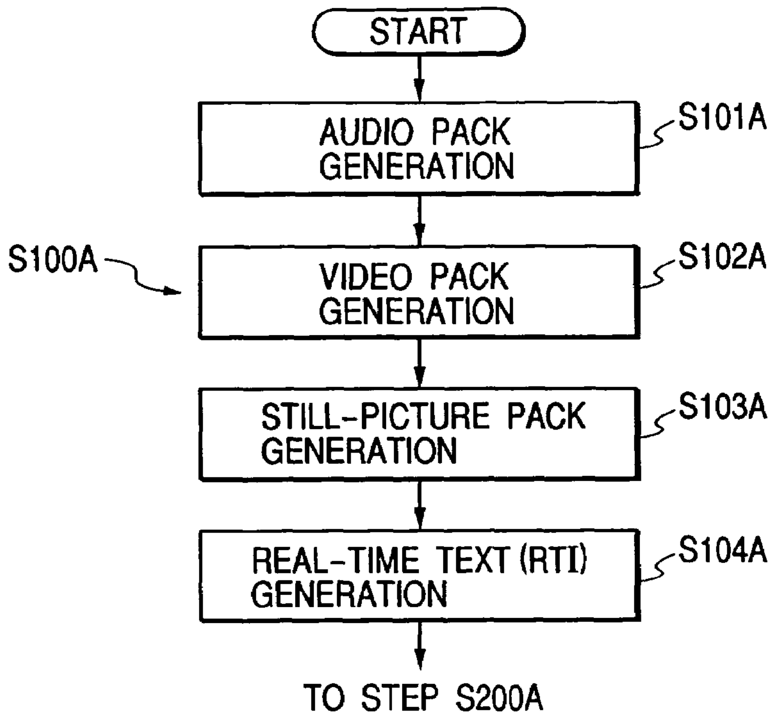
FIG. 73 is a flowchart of the details of a first block in FIG. 72.

FIG. 73 shows the details of the block S100A in FIG. 72. As shown in FIG. 73, the block S100A includes a step S101A which generates the audio packs. A step S102A following the step S101A generates the video packs. A step S103A subsequent to the step S102A generates the still-picture packs. A step S104A following the step S103A generates the real-time text (RTI). The step S104 may also generate the disc identifier signal (EXT). The step S104A is followed by the step S200A in FIG. 72.

Figure 74:
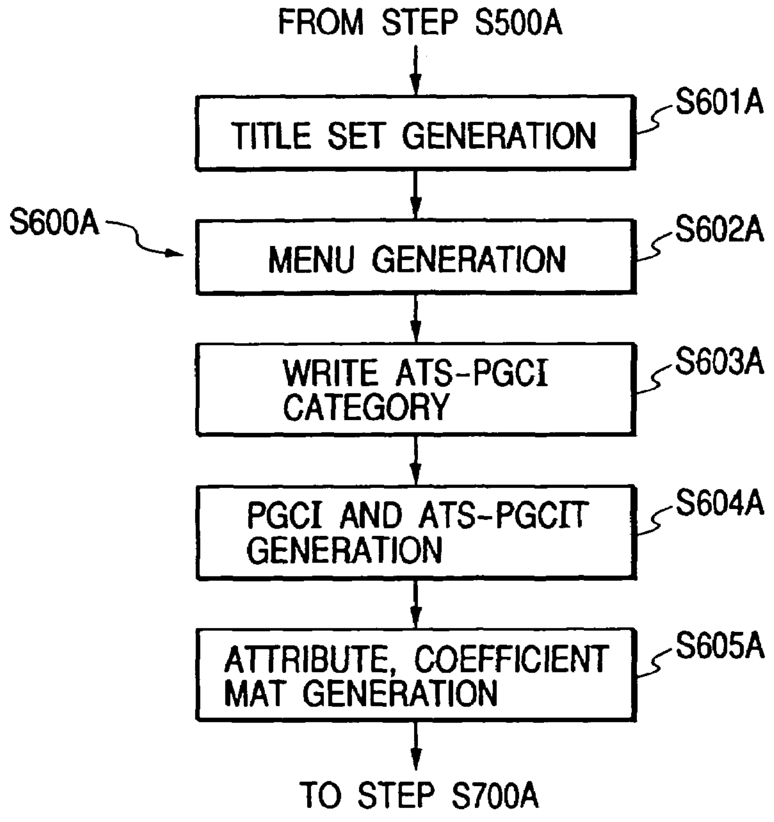
FIG. 74 is a flowchart of the details of a second block in FIG. 72.

FIG. 74 shows the details of the block S600A in FIG. 72. As shown in FIG. 74, the block S600A includes a step S601A following the step S500A in FIG. 72. The step S601A generates title sets. A step S602A subsequent to the step S601A generates a menu. A step S603A following the step S602A writes an ATS-PGCI category. A step S604A subsequent to the step S603A generates a program information table PGIT having PG contents including bit-shift information. The step S604A generates program chain information PGCI, and a program chain information table ATS-PGCIT. A step S605A following the step S604A generates attribute and coefficient management tables MAT, and thereby generates ATS information ATSI. The step S605A is followed by the step S700A in FIG. 72.

Figure 75:
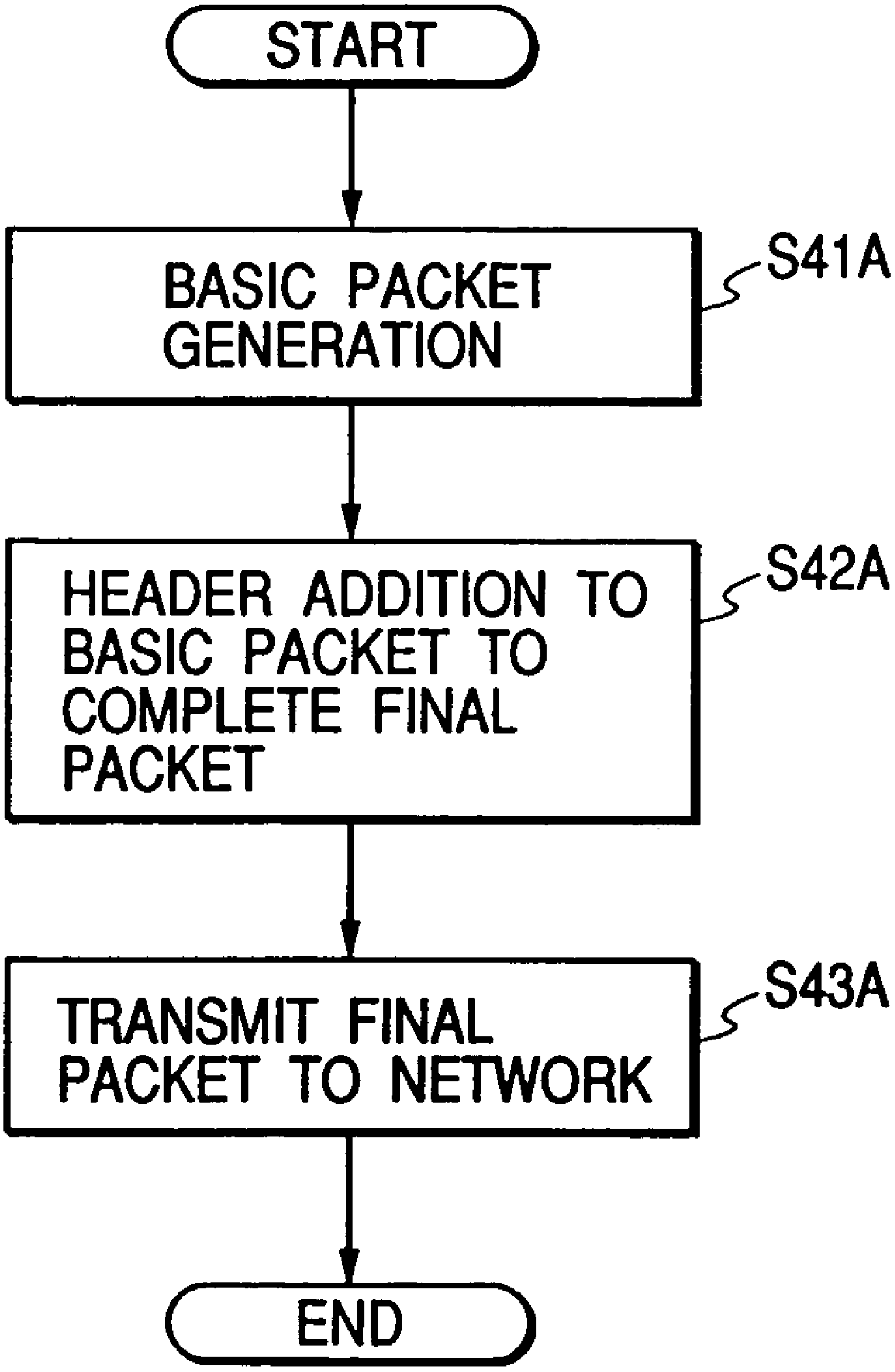
FIG. 75 is a flowchart of a second segment of the control program for the control circuit in FIG. 71.

FIG. 75 is a flowchart of another segment of the control program for the control circuit 29E. The program segment in FIG. 75 is designed to handle digital audio data which has been formatted according to the program segment in FIG. 72. As shown in FIG. 75, a first step S41A of the program segment divides the audio data into basic packets each having a predetermined number of bits. A step S42A following the step S41A adds headers to the starting ends of the basic packets to change the basic packets to final packets respectively. Generally, the added headers include destination addresses. A step S43A subsequent to the step S42A sequentially transmits the final packets to the network.

The packing apparatus in FIG. 71 may be modified to have a read/write memory which stores the control program for the CPU in the control circuit 29E. A recording medium may be prepared which stores the control program for the CPU in the control circuit 29E. In this case, the read/write memory in the packing apparatus is loaded with the control program from the recording medium, and then the CPU in the control circuit 29E is started to implement a desired packing process in accordance with the control program.

Twelfth Embodiment

Figure 76:
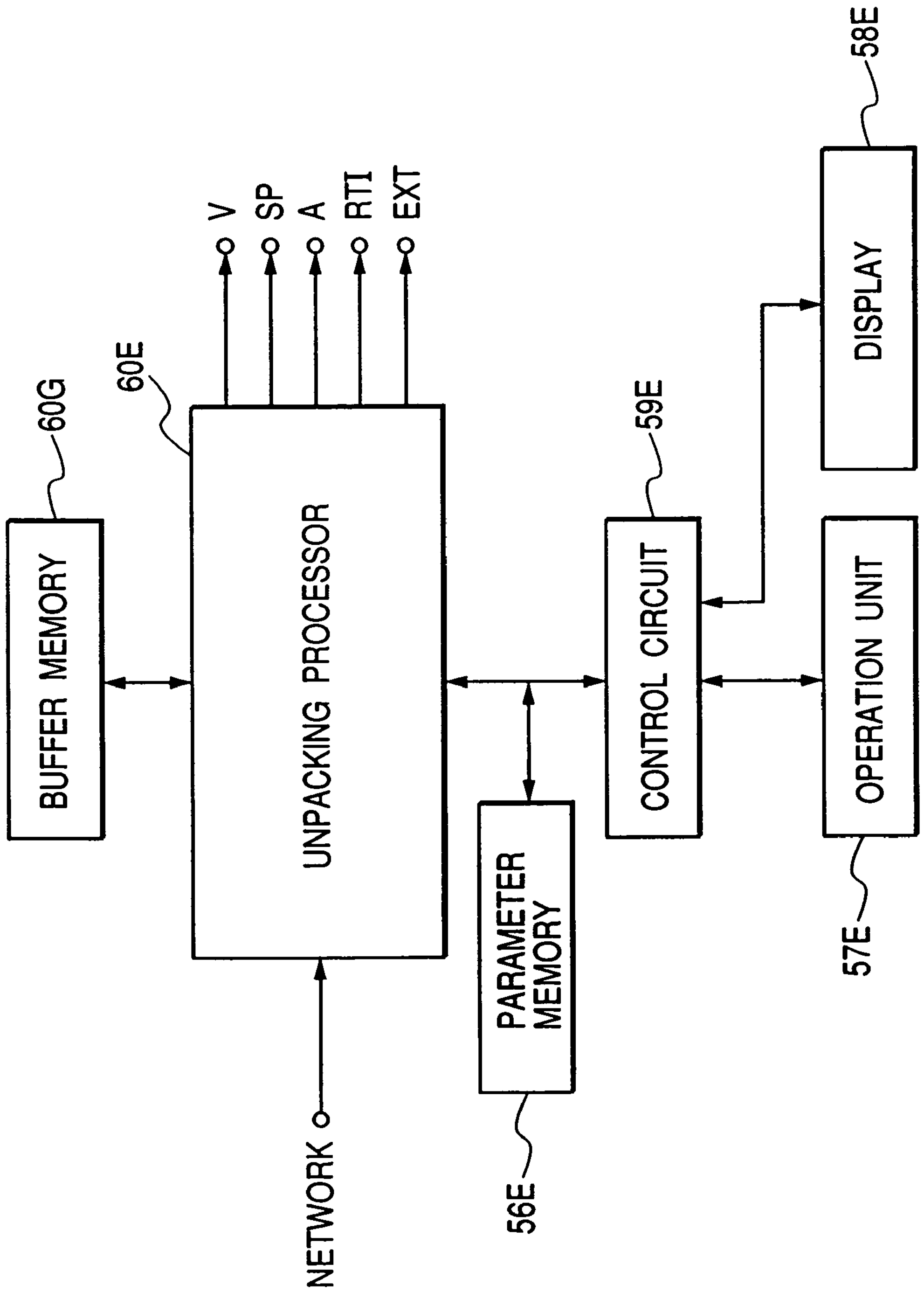
FIG. 76 is a block diagram of an unpacking apparatus according to a twelfth embodiment of this invention.

FIG. 76 shows an unpacking apparatus according to a twelfth embodiment of this invention. The unpacking apparatus of FIG. 76 includes an unpacking processor 60E, a buffer memory 60G, a control circuit 59E, an operation unit 57E, a display device 58E, and a parameter memory 56E. The unpacking processor 60E is connected to a network via an interface (not shown). The unpacking processor 60E is connected to the buffer memory 60G, the parameter memory 56E, and the control circuit 59E. The control circuit 59E is connected to the parameter memory 56E, the operation unit 57E, and the display device 58E.

The unpacking processor 60E receives a stream of packets from the network. The unpacking processor 60E decomposes the packet stream into a video signal "V", a still-picture signal "SP", an audio signal "A", a real-time information signal "RTI", and a disc identifier signal "EXT" under the control by the control circuit 59E. The unpacking processor 60E outputs the video signal "V", the still-picture signal "SP", the audio signal "A", the real-time information signal "RTI", and the disc identifier signal "EXIT".

Figure 77:
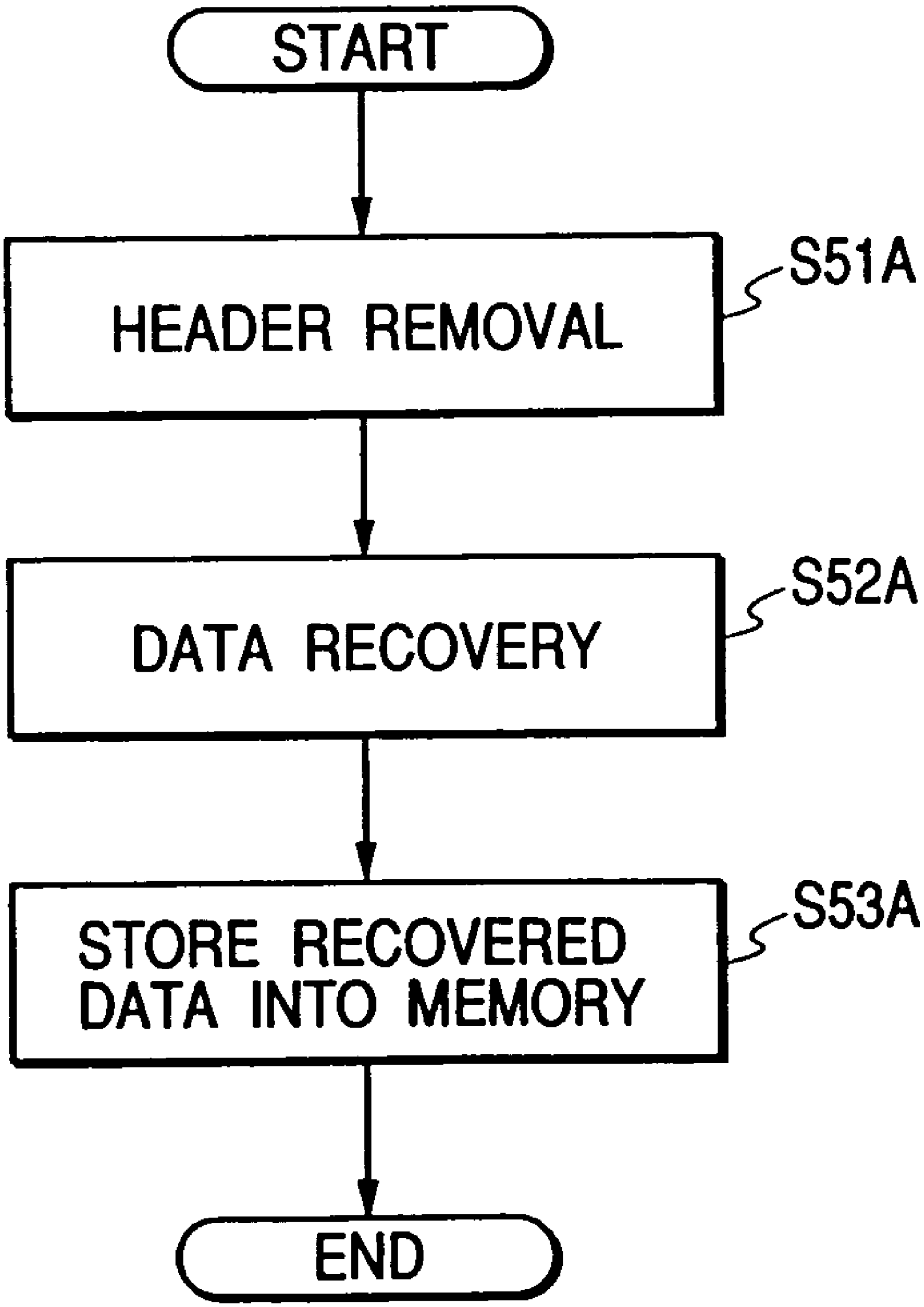
FIG. 77 is a flowchart of a first segment of a control program for a control circuit in FIG. 76.

The control circuit 59E includes a CPU which operates in accordance with a control program stored in an internal ROM. FIG. 77 is a flowchart of a segment of the control program for the control circuit 59E.

As shown in FIG. 77, a first step S51A of the program segment removes headers from received packets. A step S52A following the step S51A recovers original data from the header-less packets. A step S53A subsequent to the step S52A stores the recovered original data into the buffer memory 60G.

Figure 78:
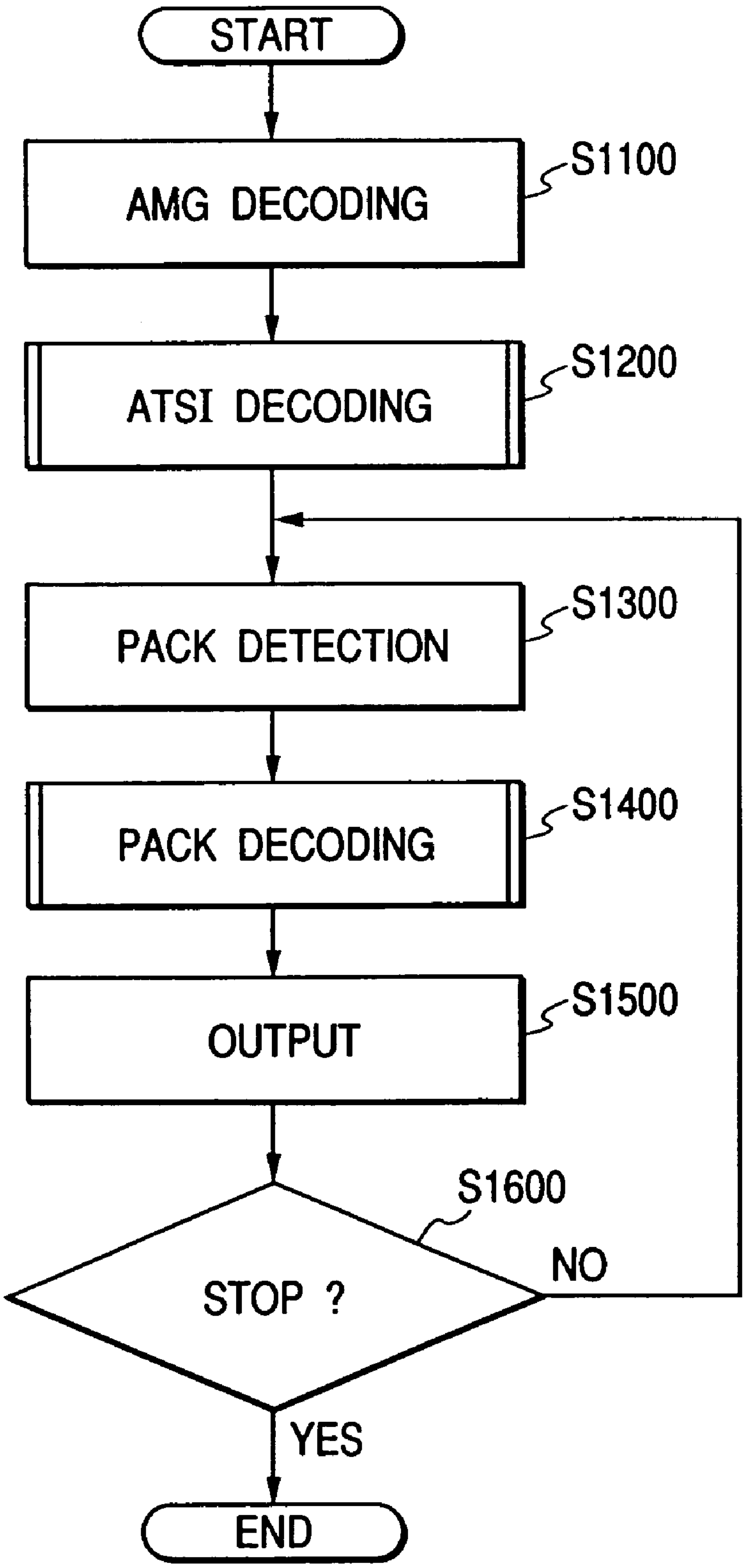
FIG. 78 is a flowchart of a second segment of the control program for the control circuit in FIG. 76.

FIG. 78 is a flowchart of another segment of the control program for the control circuit 59E. The program segment in FIG. 78 is designed to process the recovered original data in the buffer memory 60G. As shown in FIG. 78, a first step S1100 of the program segment decodes an audio manager AMG to detect audio title sets ATS.

A block S1200 following the step S100 decodes ATS information of a desired audio title set ATS. After the block S1200, the program advances to a step S1300.

The step S1300 detects packs. A block S1400 following the step S1300 decodes the packs into an audio signal, a video signal, a still-picture signal, a real-time text signal, and a disc identifier signal. A step S1500 subsequent to the block S1400 outputs the audio signal, the video signal, the still-picture signal, the real-time text signal, and the disc identifier signal.

A step S1600 following the step S1500 decides whether or not a command to stop playback is present. When the command to stop playback is present, the program exits from the step S1600 and then the execution of the program segment ends. Otherwise, the program returns from the step S1600 to the step S1300.

Figure 79:
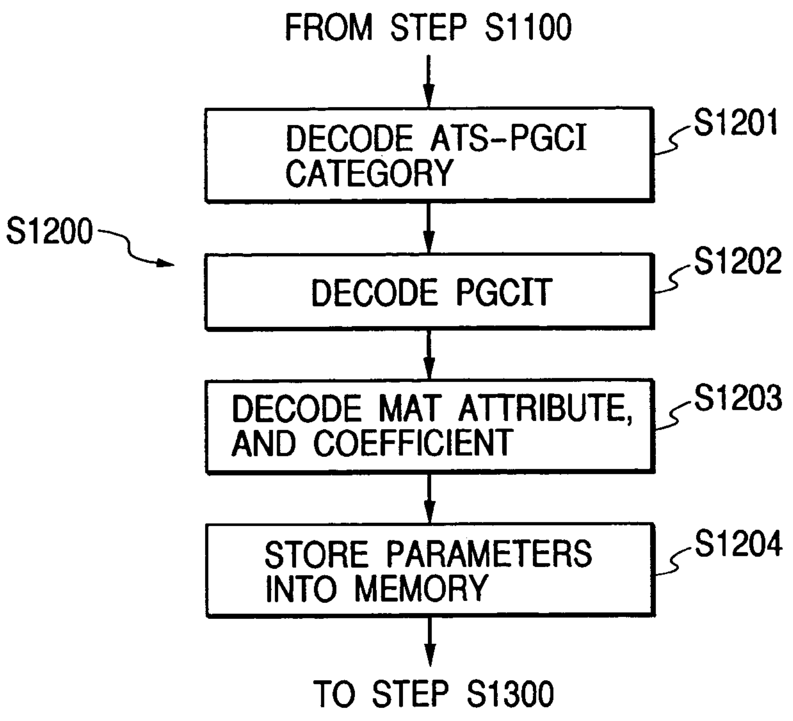
FIG. 79 is a flowchart of the details of a first block in FIG. 78.

FIG. 79 shows the details of the block S1200 in FIG. 78. As shown in FIG. 79, the block S1200 includes a step S1201 which follows the step S100 in FIG. 78. The step S1201 decodes an ATS-PGCI category. A step S1202 following the step S1201 decodes a program information table PGIT having PG contents including bit-shift information. A step S1203 subsequent to the step S1202 decodes attribute and coefficient management tables MAT. A step S1204 following the step S1203 stores information of the decoding-resultant parameters into the parameter memory 56E. The step S1204 is followed by the step S1300 in FIG. 78.

Figure 80:
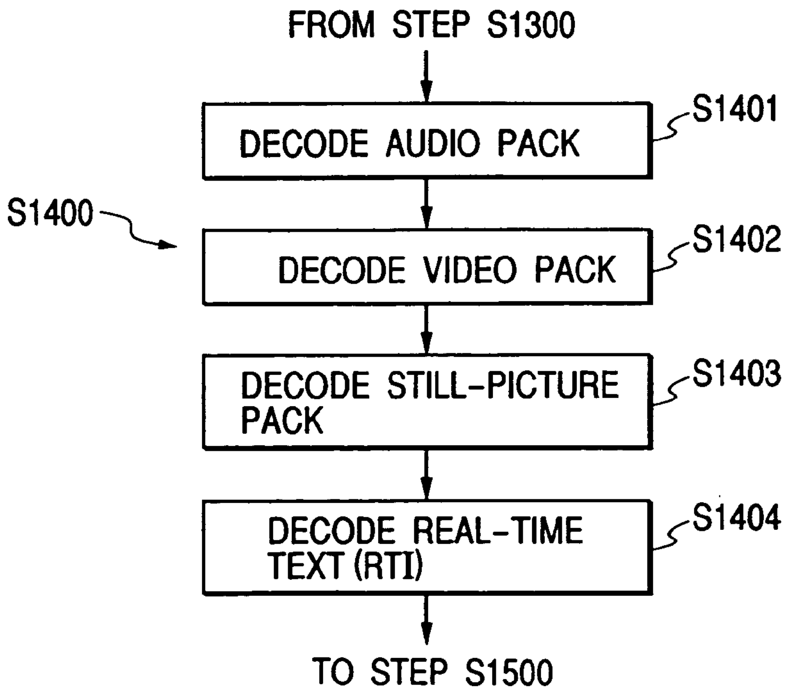
FIG. 80 is a flowchart of the details of a second block in FIG. 78.

FIG. 80 shows the details of the block S1400 in FIG. 78. As shown in FIG. 80, the block S1400 includes a step S1401 which follows the step S1300 in FIG. 78. The step S1401 decodes the audio packs into the audio signal. A step S1402 following the step S1401 decodes the video packs into the video signal. A step S1403 subsequent to the step S1402 decodes the still-picture packs into the still-picture signal. A step S1404 following the step S1403 decodes the real-time text (RTI) into the real-time text signal. The step S1404 may also decode the disc identifier (EXT) into the disc identifier signal. The step S1404 is followed by the step S1500 in FIG. 78.

The unpacking apparatus in FIG. 76 may be modified to have a read/write memory which stores the control program for the CPU in the control circuit 59E. A recording medium may be prepared which stores the control program for the CPU in the control circuit 59E. In this case, the read/write memory in the unpacking apparatus is loaded with the control program from the recording medium, and then the CPU in the control circuit 59E is started to implement a desired unpacking process in accordance with the control program.

Thirteenth Embodiment

A thirteenth embodiment of this invention is based on the seventh embodiment thereof. According to the thirteenth embodiment of this invention, a still picture set SPS or an audio still video set ASVS in FIG. 32 is designed as follows.

Figures 81, 82:
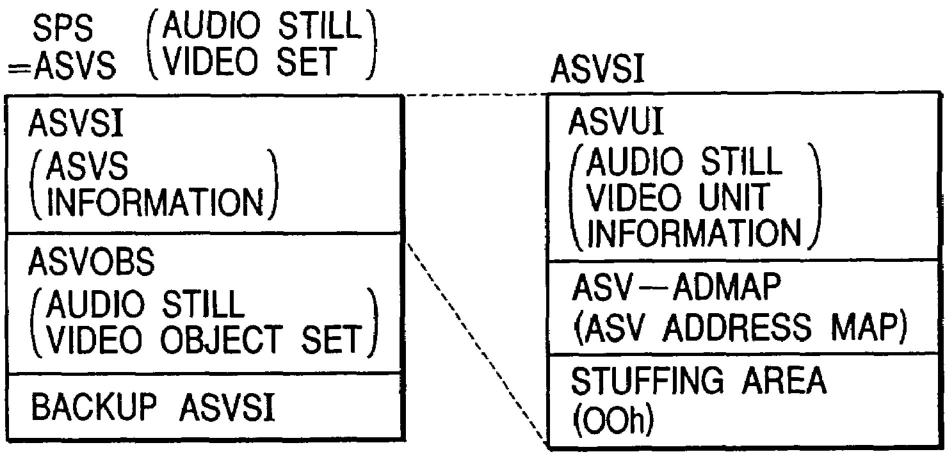
FIG. 81 is a diagram of the structure of an ASVSI area.
FIG. 82 is a diagram of the structure of an ASVUI area.

With reference to FIG. 81, the audio still video set ASVS (the still picture set SPS) has a sequence of audio still video set (ASVS) information ASVSI, an audio still video object set ASVOBS (a still picture object set SPOBS), and backup audio still video set information ASVSI. The audio still video set information ASVSI has a sequence of audio still video unit information ASVSI, an audio still video address map ASVADMAP, and a stuffing area "ooh".

FIG. 82 shows the details of the audio still video unit information ASVUI in FIG. 81. The audio still video unit information ASVUI has 888 bytes. As shown in FIG. 82, the audio still video unit information ASVUI has a sequence of a 12-byte ASVS identifier ASVS-ID, a 2-byte ASVU number, a 2-byte reserved area, a 4-byte ASVOBS start address, a 4-byte ASVOBS end address, a 2-by-4-byte area for ASVU attributes #0-#3, a 4-by-16-byte area for ASVOBS sub picture pallets #0-#15, and an 8-by-99-byte area for ASVU general information pieces ASVU#1-#99.

Figure 83:
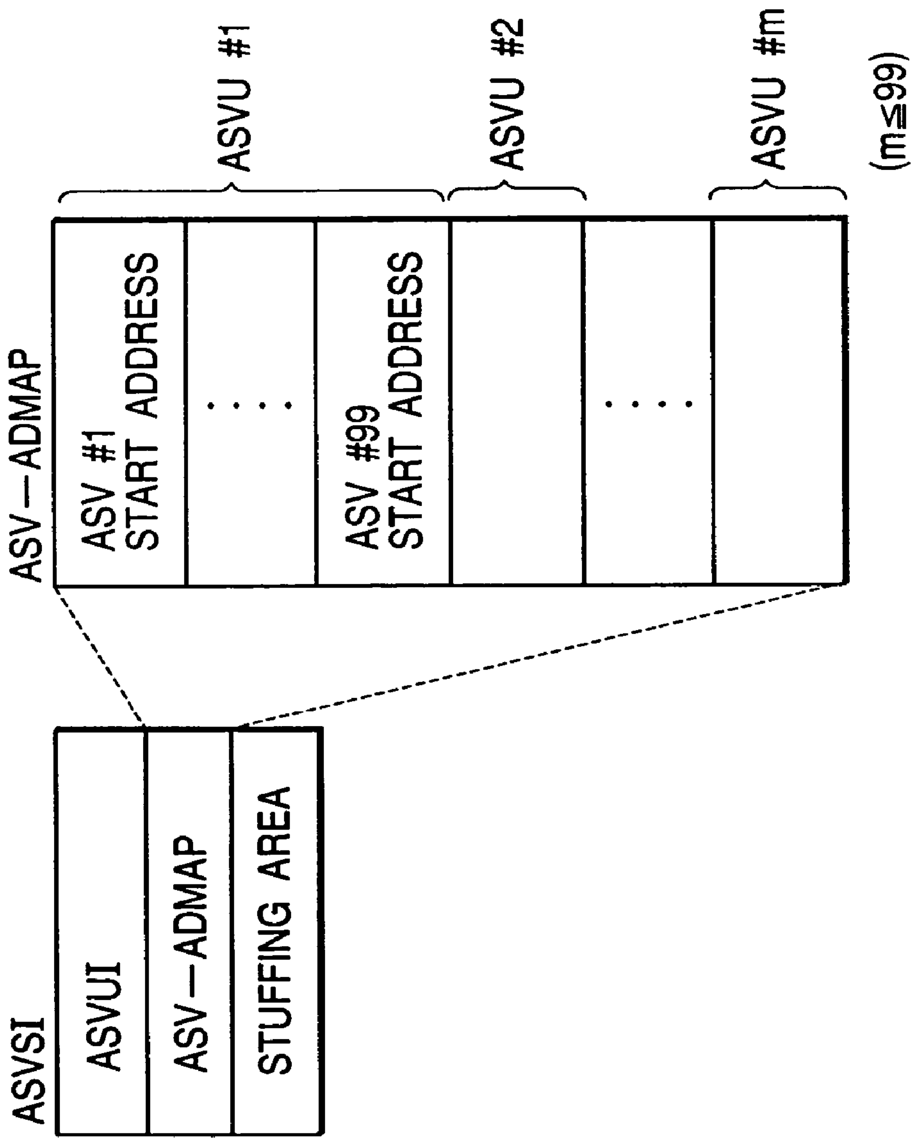
FIG. 83 is a diagram of the structure of an ASV-ADMAP area.

As shown in FIG. 83, the audio still video address map ASV-ADMAP (see FIG. 81) has a sequence of "m" audio still video units ASVU#1-#m. The audio still video units ASVU#1-#m include start addresses respectively.

Figure 84:
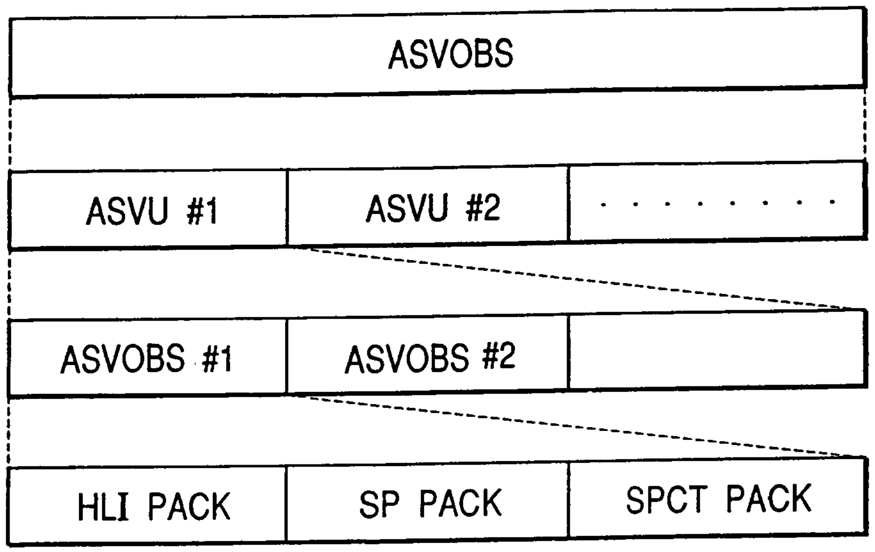
FIG. 84 is a diagram of the structure of an ASVOBS area.

As shown in FIG. 84, the audio still video object set ASVOBS (see FIG. 81) has a sequence of audio still video units ASVU#1, ASVU#2, . . . . Each of the audio still video units ASVU#1, ASVU#2, . . . is formed by a sequence of audio still video objects ASVOB#1, ASVOB#2, . . . . Each of the audio still video objects ASVOB#1, ASVOB#2, . . . corresponds to presentation data for one audio still video (ASV). Generally, each of the audio still video objects ASVOB#1, ASVOB#2, . . . includes highlight (HLT) information, sub picture (SP) data, and still picture (SPCT) data. Specifically, each of the audio still video objects ASVOB#1, ASVOB#2, . . . has a sequence of an HLI pack loaded with highlight information, an SP pack loaded with sub picture data, and a SPCT pack loaded with still picture data.

Only one still picture data piece may be placed in one audio still video object ASVOB. Only one highlight information piece may be placed in one audio still video object ASVOB. Generally, a highlight information piece is used to operate a button for a still picture. One, two, or three sub picture data pieces may be placed in one audio still video object ASVOB. In this case, the number of sub picture data pieces in one audio still video object ASVOB depends on a still picture mode. Generally, sub picture data pieces are used to indicate buttons for still pictures.

Figure 85:
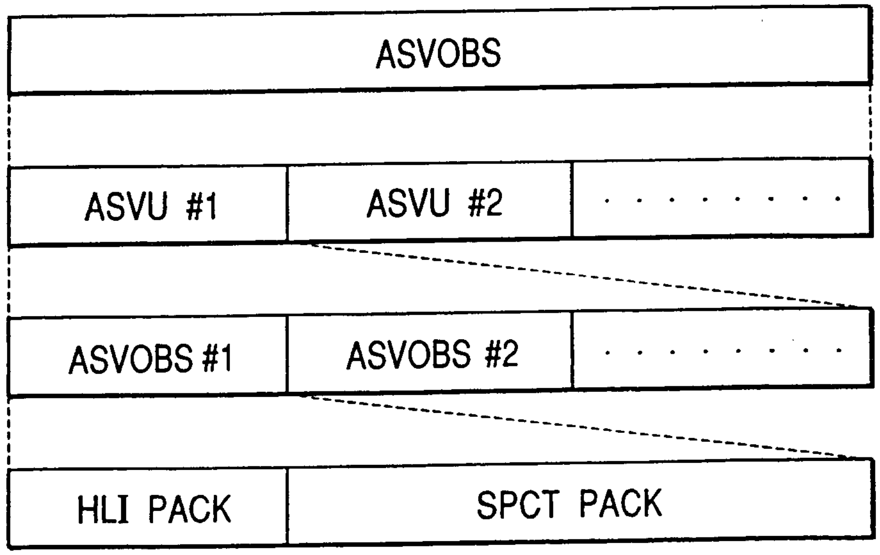
FIG. 85 is a diagram of the structure of an ASVOBS area.

The audio still video object set ASVOBS in FIG. 84 may be modified into a version of FIG. 85. In the audio still video object set ASVOBS of FIG. 85, each of audio still video objects ASVOB#1, ASVOB#2, . . . has a sequence of an HLI pack and a SPCT pack loaded with still picture data. The HLI pack is formed by an empty pack, and does not have highlight information. Accordingly, in the audio still video object set ASVOBS of FIG. 85, each of the audio still video objects ASVOB#1, ASVOB#2, . . . substantially has only a SPCT pack.

Figure 86:
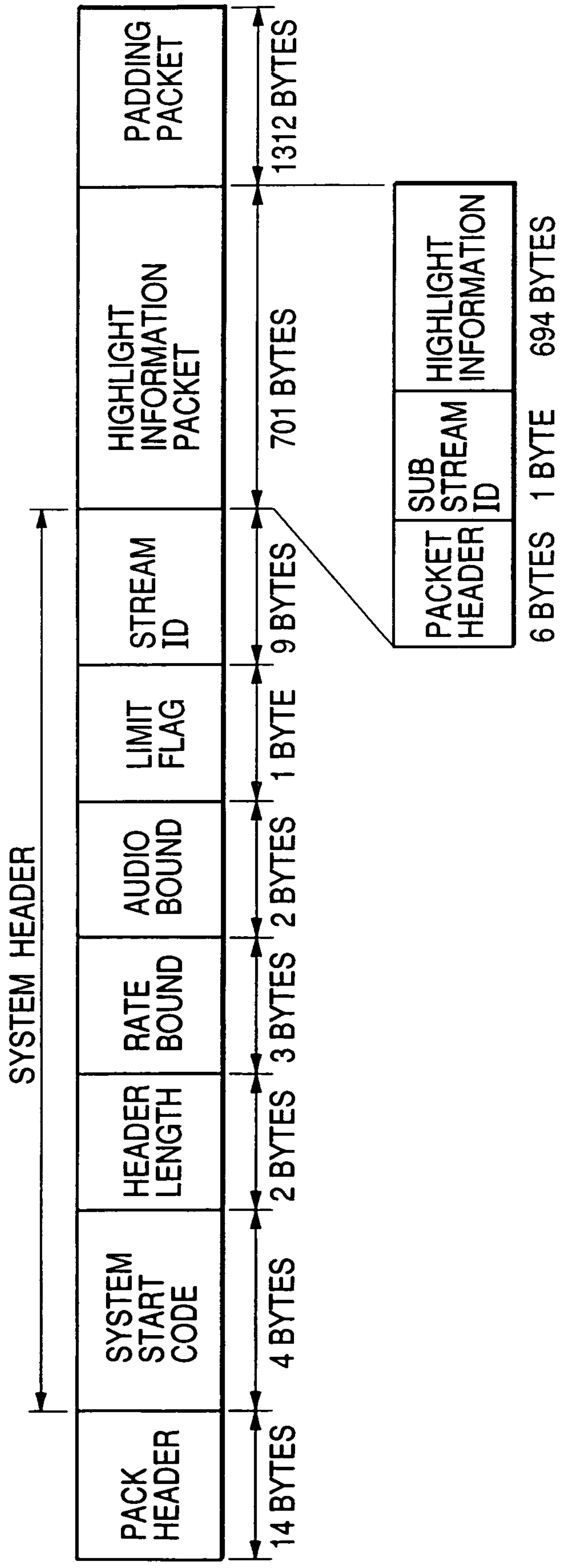
FIG. 86 is a diagram of the structure of a highlight information pack.

As shown in FIG. 86, a highlight (HLI) pack has a sequence of a 14-byte pack header, a system header, a highlight information packet, and a 1312-byte padding packet. The system header has a sequence of a 4-byte system start code, 2-byte header length information, 3-byte rate bound information, 2-byte audio bound information, a 1-byte limitation flag, and 9-byte stream ID (identification) information. The highlight information packet has a sequence of a 6-byte packet header, a 1-byte sub stream ID (identification) information, and 694-byte highlight information (ASV-HLI).

Figure 87:
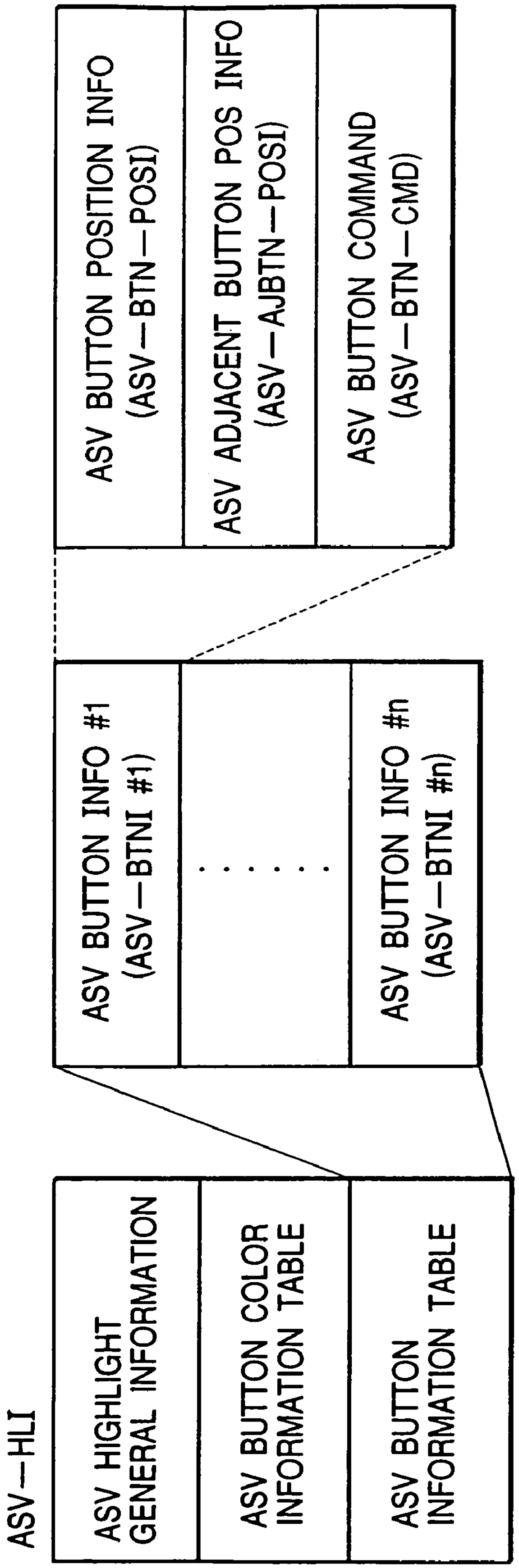
FIG. 87 is a diagram of the structure of an ASV button information table.

As shown in FIG. 87, the highlight information (ASV-HLI) includes 22-byte ASV highlight general information, an 8-by-3-byte button color information table, and an 18-by-36-byte ASV button information table. The ASV button information table has ASV button information pieces ASV-BTNI#1-#n. Each of the ASV button information pieces ASV-BTNI#1-#n includes ASV button position information ASV-BTN-POSI, ASV adjacent button position information ASV-AJBTN-POSI, and an ASV button command ASV-BTN-CMD. The ASV button command ASV-BTN-CMD is a picture control command. The ASV button command ASV-BTN-CMD includes a navigation command in connection with operation of a related button.

Figure 88:
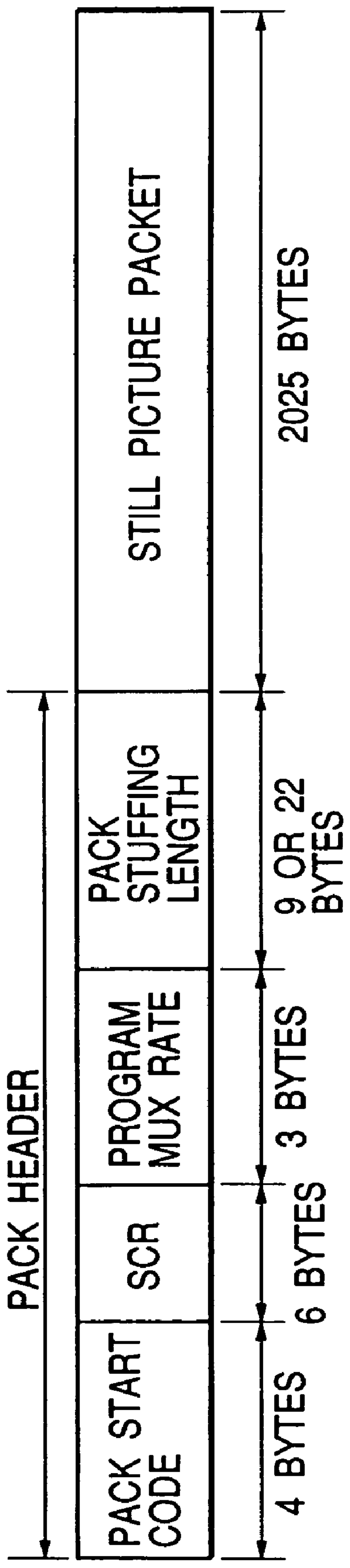
FIG. 88 is a diagram of the structure of a still-picture pack.

As shown in FIG. 88, a still-picture (SPCT) pack has a pack header and a 2025-byte still-picture packet. The pack header is followed by the still-picture packet. The pack header has a sequence of a 4-byte pack start code, 6-byte SCR (system clock reference) information, 3-byte mux rate information, 9-byte or 22-byte information of a pack stuffing length.

As shown in FIG. 89, the still-picture packet has a sequence of a packet header and still-picture data. A first 9-byte area or a starting 9-byte area of the packet header is loaded with a mandatory SPCT packet information piece. Only in the case where the still-picture packet in question is first one related to a still picture, the 9-byte SPCT packet information piece is followed by 5+5-byte SPCT packet information pieces. Only in the case where the still-picture packet in question is first one related to an audio still video object ASVOB, the 9-byte SPCT packet information piece or the 5+5-byte SPCT packet information pieces are followed by a 3-byte SPCT packet information piece.

Figure 90:
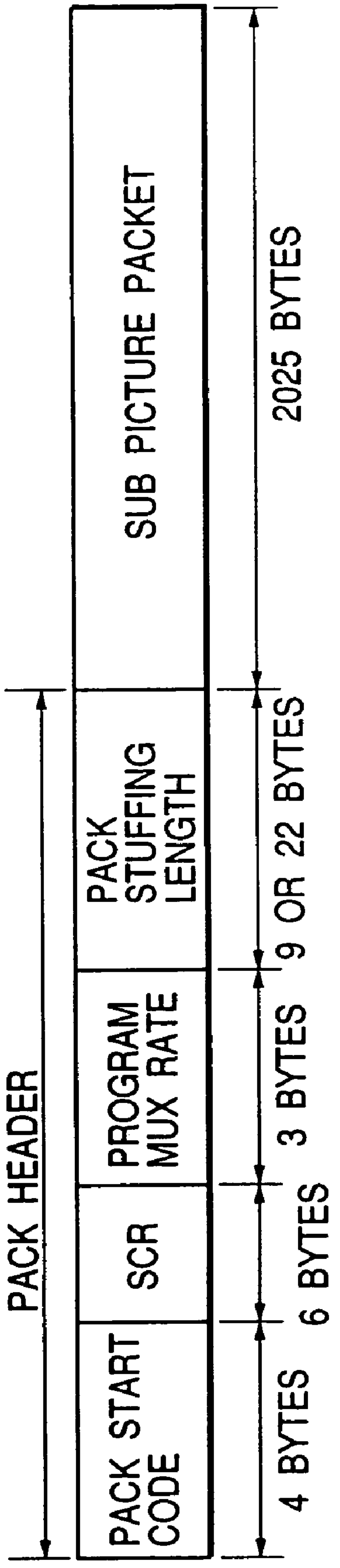
FIG. 90 is a diagram of the structure of a sub-picture pack.

As shown in FIG. 90, a sub picture (SP) pack has a pack header and a 2025-byte sub-picture packet. The pack header is followed by the sub-picture packet. The pack header has a sequence of a 4-byte pack start code, 6-byte SCR (system clock reference) information, 3-byte mux rate information, 9-byte or 22-byte information of a pack stuffing length.

As shown in FIG. 91, the sub-picture packet has a sequence of a packet header and sub-picture data. A first 9-byte area or a starting 9-byte area of the packet header is loaded with a mandatory SP packet information piece. Only in the case where the sub-picture packet in question is first one in an SP unit, the 9-byte SP packet information piece is followed by a 5-byte SP packet information piece. Only in the case where the sub-picture packet in question is first one related to an audio still video object ASVOB, the 9-byte SP packet information piece or the 5-byte SP packet information pieces is followed by a 3-byte SP packet information piece.

Figure 92:
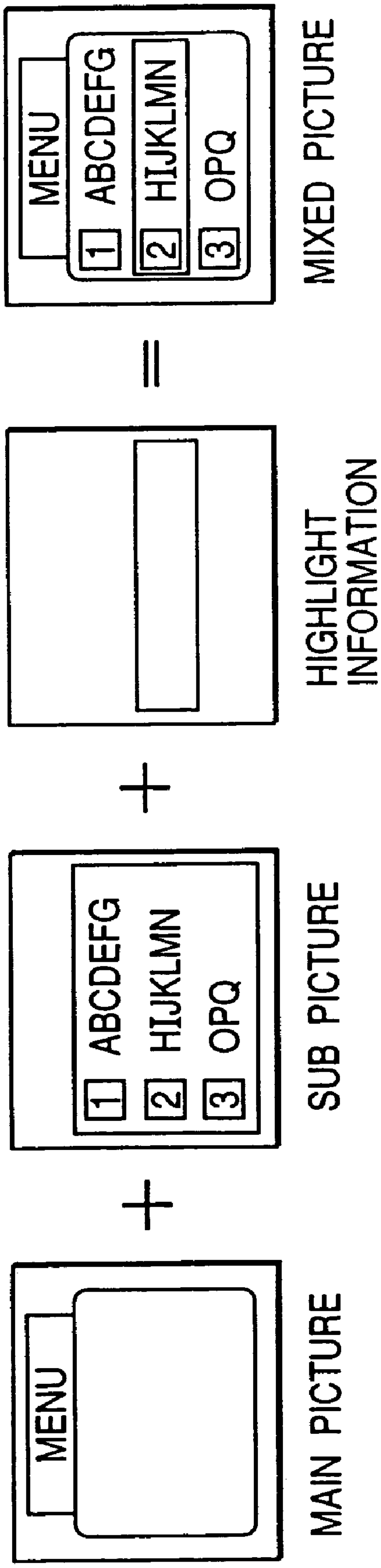
FIG. 92 is a diagram of a process of combining a main picture, a sub picture, and highlight information into a mixed picture.

With reference to FIG. 92, a main picture, a sub picture, and highlight information are combined into a mixed picture which is indicated on a display.

Fourteenth Embodiment

A fourteenth embodiment of this invention is similar to the embodiment of FIGS. 32-67 except for design changes indicated later.

Figure 93:
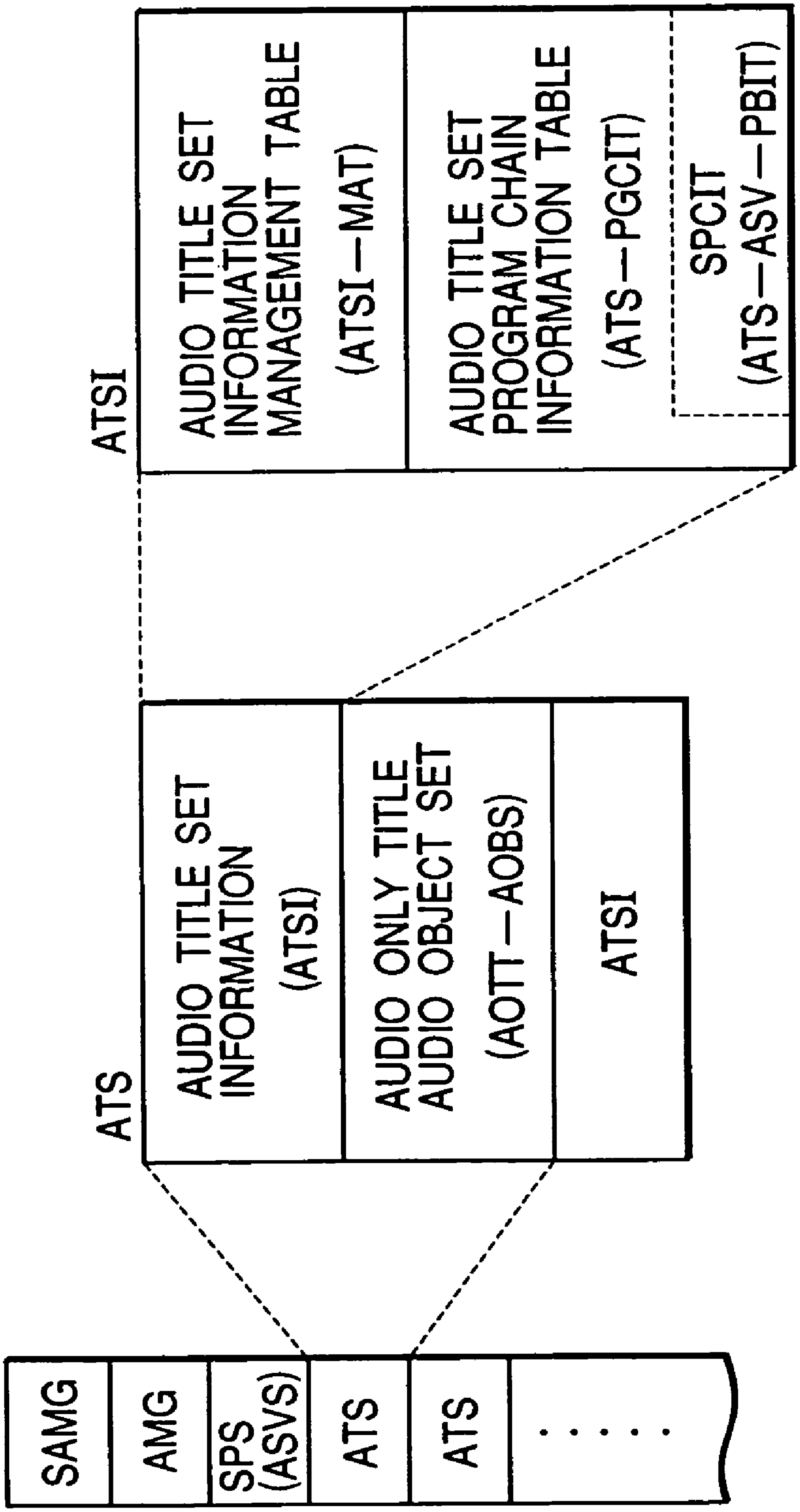
FIG. 93 is a diagram of the structure of an ATS area.

FIG. 93 shows the structure of data recorded on a DVD-Audio according to the fourteenth embodiment of this invention. The data structure in FIG. 93 includes a sequence of a structure of simple audio manager (a structure-of-simple audio manager) SAMG, an audio manager AMG, a still picture set SPS (an audio still video set ASVS), and plural audio title sets ATS.

Each audio title set ATS has a sequence of audio title set (ATS) information ATSI, an audio only title audio object set AOTT-AOBS, and backup audio title set information ATSI. The audio title set information ATSI has a sequence of an audio title set information management table ATSI-MAT, and an audio title set program chain information table ATS-PGCIT. As shown in FIG. 93, a still-picture control information table SPCIT is provided in the audio title set program chain information table ATS-PGCIT. The still-picture control information table SPCIT is also referred to as the ATS audio still video playback information ATS-ASV-PBIT.

Figure 94:
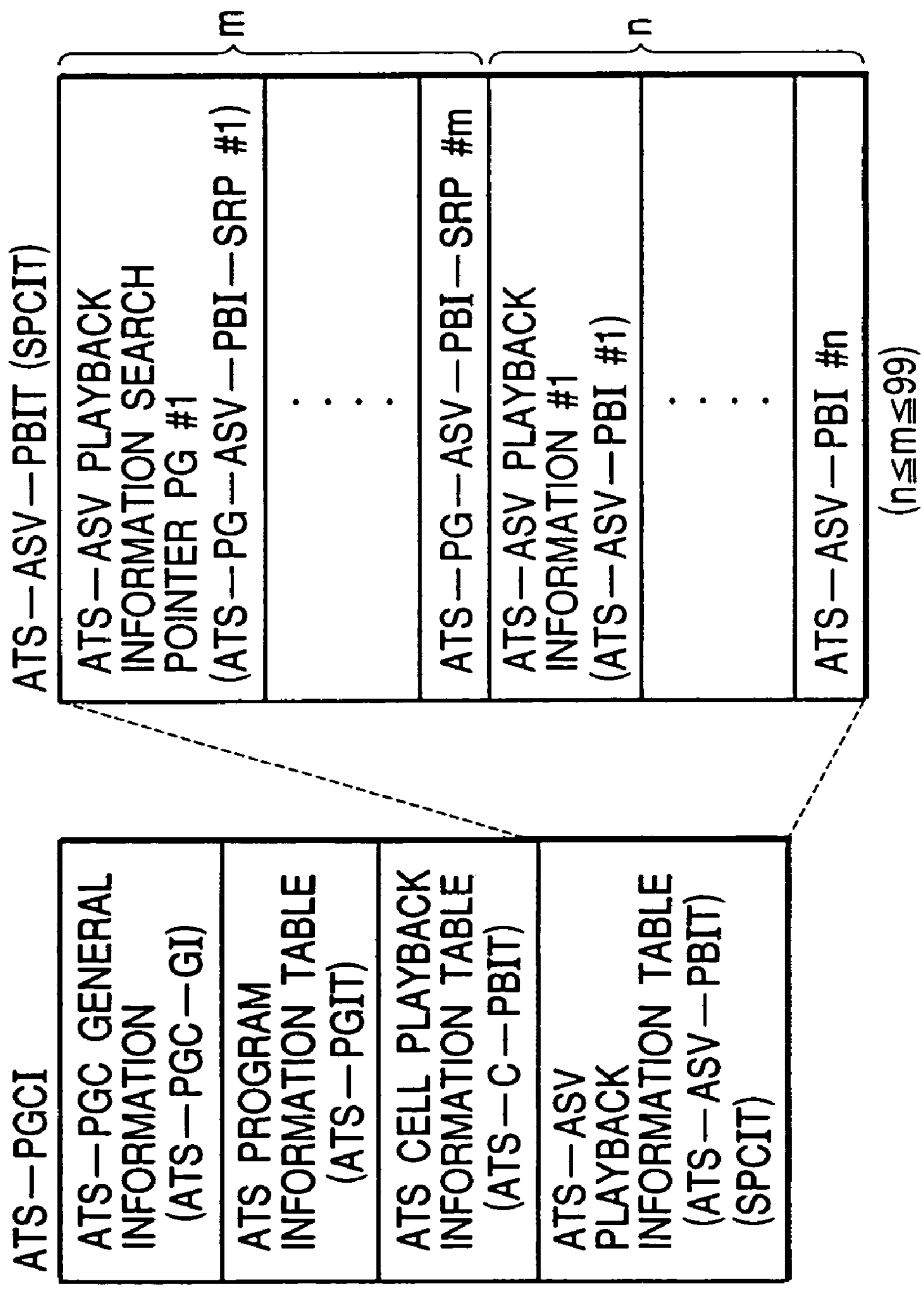
FIG. 94 is a diagram of the structure of an ATS-ASV-PBIT area.

FIG. 94 shows the details of the ATS audio still video playback information ATS-ASV-PBIT in FIG. 93. As shown in FIG. 94, the ATS audio still video playback information ATS-ASV-PBIT has a sequence of ATS-ASV playback information search pointers ATS-PG-PBI-SRP#1-#m, and ATS-ASV playback information pieces ATS-ASV-PBI#1-#n. Here, "n" and "m" denote given natural numbers equal to or smaller than 99, and the number "n" is equal to or smaller than the number "m".

As shown in FIG. 95, each of the ATS-ASV playback information search pointers ATS-PG-PBI-SRP#1-#m (see FIG. 94) has 6 bytes. Specifically, each of the ATS-ASV playback information search pointers ATS-PG-PBI-SRP#1-#m has a sequence of a 1-byte area representing an ASVU number, a 1-byte area representing a ASV display mode (ASV-DMOD), a 2-byte area representing an ATS-ASV-PBI start address, and a 2-byte area representing an ATS-ASV-PBI end address. The ASVU number is in the range of "1" to "99".

FIG. 96 shows the details of the ASV display mode (ASV-DMOD) in FIG. 95. As shown in FIG. 96, the ASV display mode (ASV-DMOD) has a sequence of eight bits b7, b6, b5, b4, b3, b2, b1, and b0. A set of the bits b7, b6, b5, and b4 is reserved. A set of the bits b3 and b2 represents a display timing mode. A set of the bits b1 and b0 represents a display order mode.

The display timing mode represented by the bits b3 and b2 in FIG. 96 can be changed between a first type corresponding to "slide shows" and a second type corresponding to "browsable pictures". A bit sequence of "00" is assigned to the first type. A bit sequence of "01" is assigned to the second type.

The display order mode represented by the bits b1 and b0 in FIG. 96 can be changed among a first type corresponding to "sequential", a second type corresponding to "random", and a third type corresponding to "shuffle". A bit sequence of "00" is assigned to the first type. A bit sequence of "01" is assigned to the second type. A bit sequence of "11" is assigned to the third type.

As shown in FIG. 97, each of the ATS-ASV playback information pieces ATS-ASV-PBI#1-#n (see FIG. 94) includes "k" 10-byte ASV display lists #1 -#k where "k" denotes a predetermined natural number in the range of "1" to "99".

Figure 98:
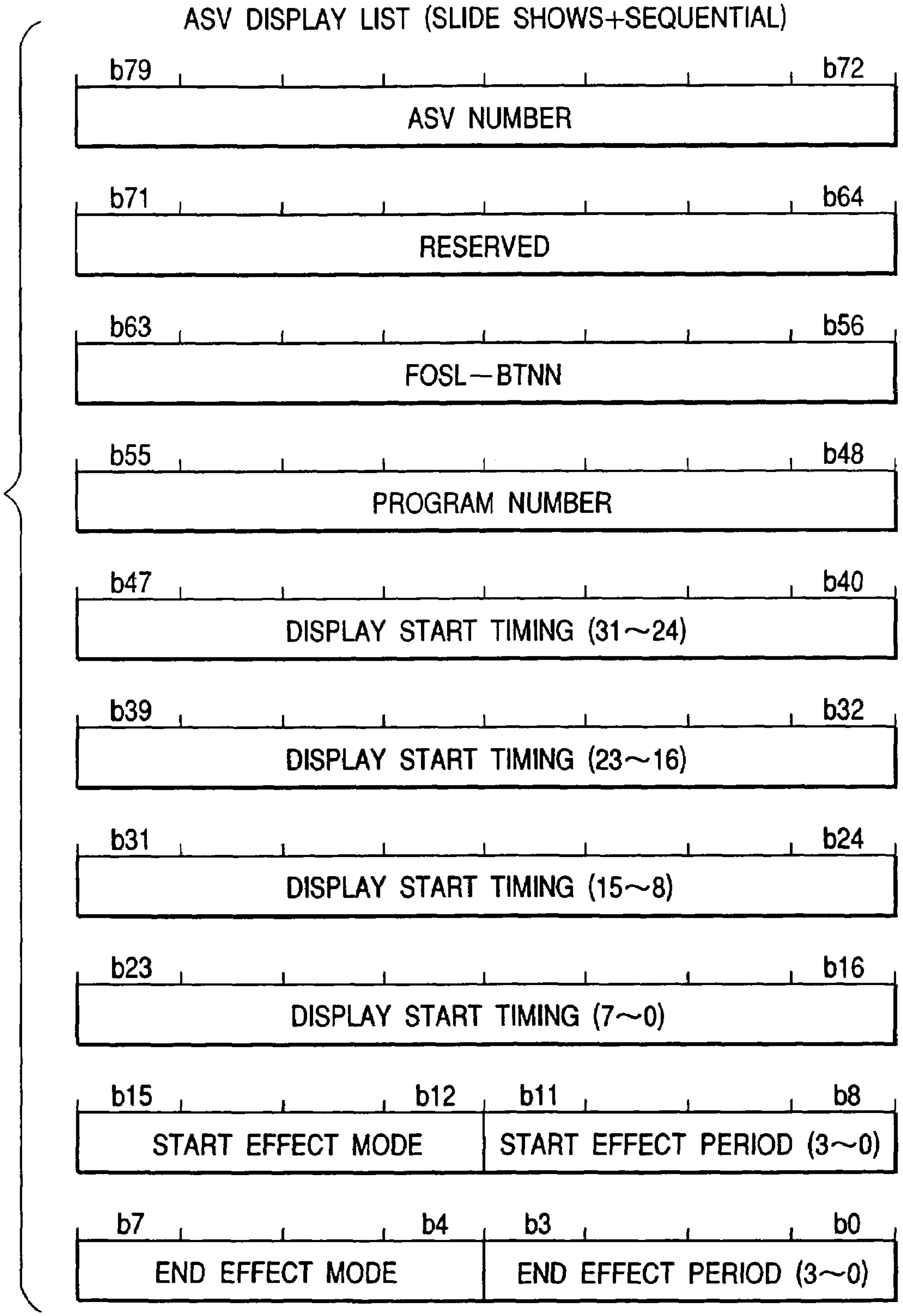
FIG. 98 is a diagram of the structure of an ASV display list.

FIG. 98 shows an example of the contents of one ASV display list in FIG. 97 which occurs in the case where the display timing mode in FIG. 96 corresponds to "slide shows" and the display order mode in FIG. 96 corresponds to "sequential". As shown in FIG. 98, the ASV display list has a sequence of 10 bytes, that is, 80 bits b79, b78, b77, . . . , b1, b0. A set of the bits b79, b78, b77, b76, b75, b74, b73, and b72 represents an ASV number. A set of the bits b71, b70, b69, b68, b67, b66, b65, and b64 is reserved. A set of the bits b63, b62, b61, b60, b59, b58, b57, and b56 represents a button number (FOSL-BTNN), that is, an identification number of a button which is forcedly selected at an ASV start. A set of the bits b55, b54, b53, b52, b51, b50, b49, and b48 represents a program number, that is, an identification number of a program which is played back at the ASV start. A set of the bits b47, b46, b45, . . . , b17, and b16 represents a display start timing which is in the range between "31" and "0". A set of the bits b15, b14, b13, and b12 represents a start effect mode. A set of the bits b11, b10, b9, and b8 represents a start effect time period which is in the range between "3" and "0". A set of the bits b7, b6, b5, and b4 represents an end effect mode. A set of the bits b3, b2, b1, and b0 represents an end effect time interval which is in the range between "3" and "0".

The display start timing represented by the bits b47, b46, b45, . . . , b17, and b16 in FIG. 98 is variable in the range between "31" and "0". This timing range corresponds to a normal time range of 31-0/90000 second.

The start effect mode represented by the bits b15, b14, b13, and b12 in FIG. 98 can be selected from among "cut in", "fade in", "dissolve", "wipe from top", "wipe from bottom", "wipe from left", "wipe from right", "wipe diagonal left", and "wipe diagonal right". Specifically, a bit sequence "0000" is assigned to "cut in". A bit sequence "0001" is assigned to "fade in". A bit sequence "0010" is assigned to "dissolve". A bit sequence "0011" is assigned to "wipe from top". A bit sequence "0100" is assigned to "wipe from bottom". A bit sequence "0101" is assigned to "wipe from left". A bit sequence "0110" is assigned to "wipe from right". A bit sequence "011" is assigned to "wipe diagonal left". A bit sequence "1000" is assigned to "wipe diagonal right".

The end effect mode represented by the bits b7, b6, b5, and b4 in FIG. 98 can be selected from among "cut out", "fade out", "dissolve", "wipe from top", "wipe from bottom", "wipe from left", "wipe from right", "wipe diagonal left", and "wipe diagonal right". Specifically, a bit sequence "0000" is assigned to "cut out". A bit sequence "0001" is assigned to "fade out". A bit sequence "0010" is assigned to "dissolve". A bit sequence "0011" is assigned to "wipe from top". A bit sequence "0100" is assigned to "wipe from bottom". A bit sequence "0101" is assigned to "wipe from left". A bit sequence "0110" is assigned to "wipe from right". A bit sequence "0111" is assigned to "wipe diagonal left". A bit sequence "1000" is assigned to "wipe diagonal right".

FIG. 99 shows an example of the contents of one ASV display list in FIG. 97 which occurs in the case where the display timing mode in FIG. 96 corresponds to "slide shows" and the display order mode in FIG. 96 corresponds to "random" or "shuffle". The ASV display list in FIG. 99 is similar to the ASV display list in FIG. 98 except that a set of the bits b79, b78, b77, b76, b75, b74, b73, and b72 is reserved.

Figure 100:
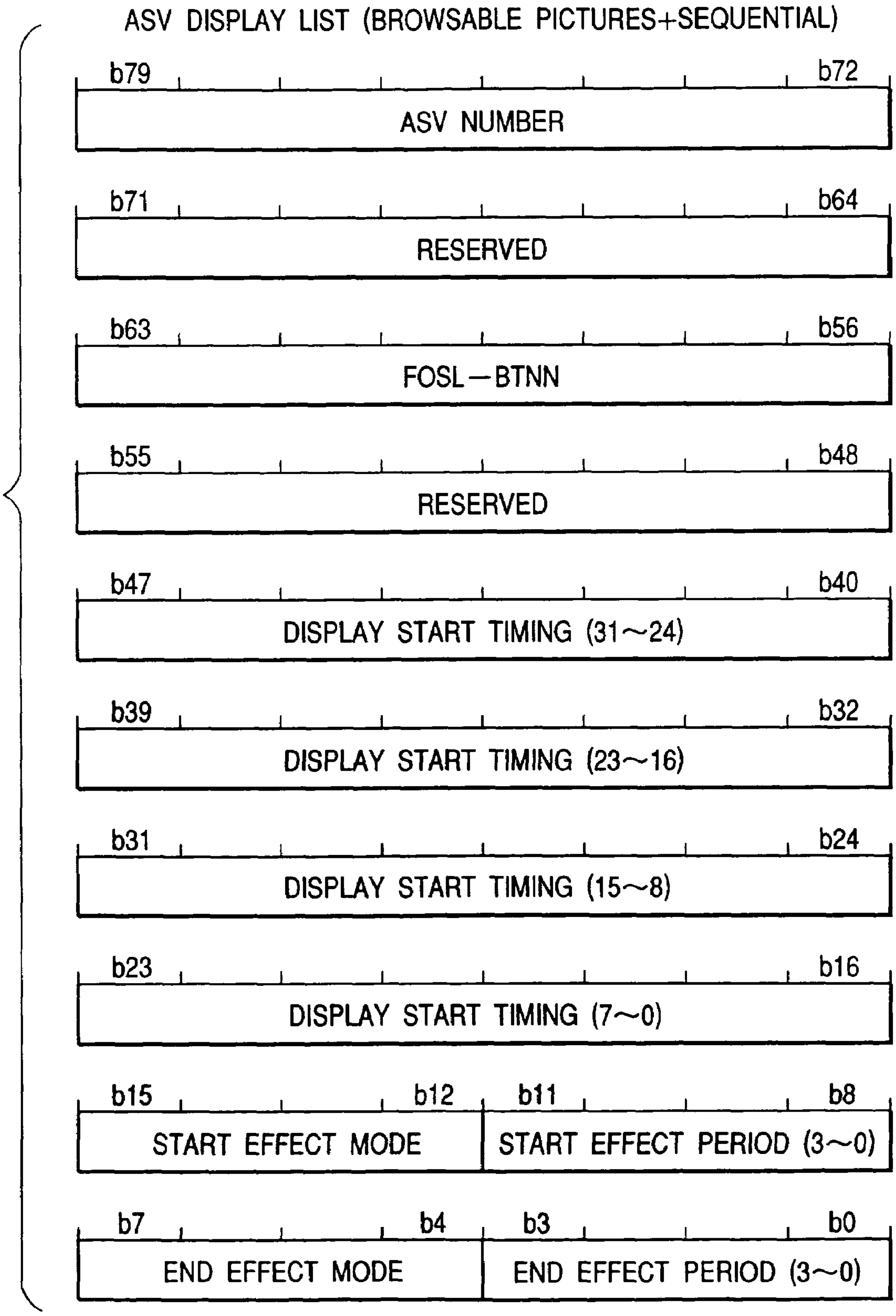
FIG. 100 is a diagram of the structure of an ASV display list.

FIG. 100 shows an example of the contents of one ASV display list in FIG. 97 which occurs in the case where the display timing mode in FIG. 96 corresponds to "browsable pictures" and the display order mode in FIG. 96 corresponds to "sequential". The ASV display list in FIG. 100 is similar to the ASV display list in FIG. 98 except that a set of the bits b55, b54, b53, b52, b51, b50, b49, and b48 is reserved.

Figure 101:
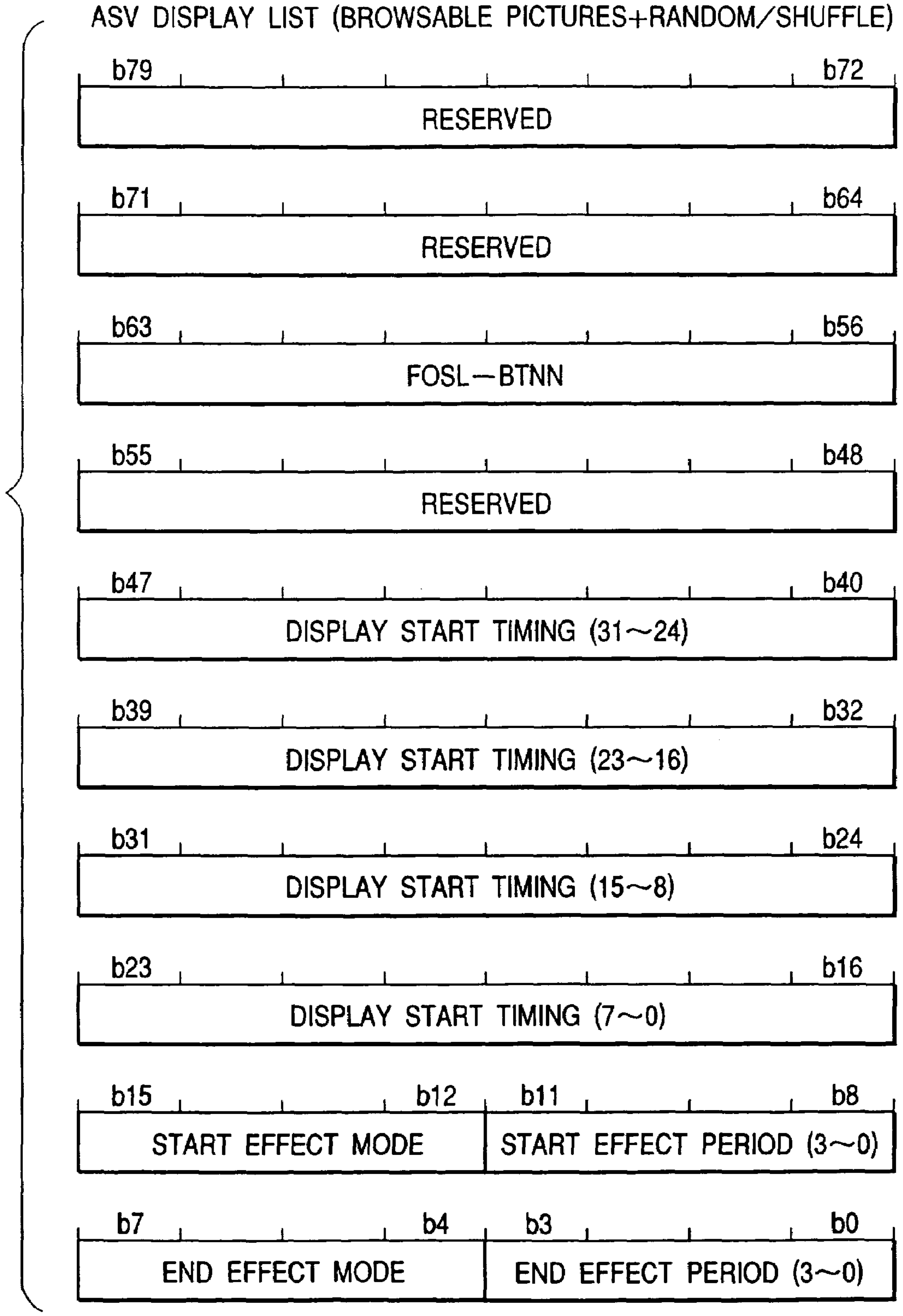
FIG. 101 is a diagram of the structure of an ASV display list.

FIG. 101 shows an example of the contents of one ASV display list in FIG. 97 which occurs in the case where the display timing mode in FIG. 96 corresponds to "browsable pictures" and the display order mode in FIG. 96 corresponds to "random" or "shuffle". The ASV display list in FIG. 101 is similar to the ASV display list in FIG. 98 except that a set of the bits b79, b78, b77, b76, b75, b74, b73, and b72, and also a set of the bits b55, b54, b53, b52, b51, b50, b49, and b48 are reserved.

What is claimed is:

1. An audio signal encoding apparatus comprising:

first means for converting an analog audio signal into corresponding audio data of a digital form; and second means for generating second data of a data structure in response to the audio data generated by the first means;

wherein the data structure comprises:

an audio title set (ATS) including audio packs containing audio data; and a still-picture set (SPS) including a still-picture pack containing still-picture data relating to the audio data;

the still-picture set (SPS) including still-picture object set (ASVOBS) having at least one still-picture unit (ASVU) and further including still-picture set information (ASVSI) having start address map (ASV-ADMAP) for still-picture data for respective still-picture unit (ASVU) for reproducing a still-picture unit (ASVU) basis;

the still-picture unit (ASVU) including at least one still-picture object (ASVOB), the still-picture object (ASVOB) having a still-picture pack; and the audio title set (ATS) including audio title set information (ATSI) containing playback information (SPCIT) for playback control of the still-picture data in the still-picture set (SPS).

2. An apparatus for decoding a signal recorded on a recording medium comprising:

first means for decoding audio title set information (ATSI) into playback information (SPCIT) for playback control of still-picture data, the audio title set information (ATSI) being in an audio title set (ATS) recorded on the recording medium;

second means for decoding audio packs in the audio title set (ATS) recorded on the recording medium into audio data;

third means for decoding start address map (ASV-ADMAP) for still-picture data for a still-picture unit (ASVU) in still-picture set information (ASVSI), the still-picture set information (ASVSI) being in a still-picture set (SPS) recorded on the recording medium, and a still-picture object set (ASVOBS) being in the still-picture set (SPS) recorded on the recording medium into start address data for still-picture data and still-picture data, respectively; and fourth means for controlling and outputting the still-picture data generated by the third means in response to the playback information (SPCIT) generated by the first means and the start address data for still-picture data generated by the third means.

3. A method of transmitting an audio signal, comprising the steps of:

converting an analog audio signal into corresponding audio data of a digital form;

generating second data of a data structure in response to the audio data;

packetizing the second data into a packet signal; and transmitting the packet signal via a communication line;

wherein the data structure comprises:

an audio title set (ATS) including audio packs containing audio data; and a still-picture stet (SPS) including a still-picture pack containing still-picture data relating to the audio data;

the still-picture set (SPS) including still-picture object set (ASVOBS) having at least one still-picture unit (ASVU) and further including still-picture set information (ASVSI) having start address map (ASV-ADMAP) for still-picture data for respective still-picture unit (ASVU) for reproducing a still-picture unit (ASVU) basis;

the still-picture unit (ASVU) including at least one still-picture object (ASVOB), the still-picture object (ASVOB) having a still-picture pack; and the audio title set (ATS) including audio title set information (ATSI) containing playback information (SPCIT) for playback control of the still-picture data in the still-picture set (SPS).

* * * * *